(12) United States Patent
Barker

(10) Patent No.: US 8,672,389 B2
(45) Date of Patent: *Mar. 18, 2014

(54) RETRACTABLE TOP FOR AN OPEN VEHICLE

(75) Inventor: Dennis G. Barker, Golden, CO (US)

(73) Assignee: Ingenious Designs, LLC, Wixom, MI (US)

( * ) Notice: Subject to any disclaimer, the term of this patent is extended or adjusted under 35 U.S.C. 154(b) by 243 days.

This patent is subject to a terminal disclaimer.

(21) Appl. No.: 13/021,611

(22) Filed: Feb. 4, 2011

(65) Prior Publication Data

US 2012/0200111 A1    Aug. 9, 2012

(51) Int. Cl.
B60J 7/00    (2006.01)

(52) U.S. Cl.
USPC .......................................... 296/122; 296/121

(58) Field of Classification Search
USPC ............ 296/107.01, 108, 109, 111, 114, 116, 296/118, 121, 122, 107.09, 107.12, 107.16, 296/107.11
See application file for complete search history.

(56) References Cited

U.S. PATENT DOCUMENTS

| | | | |
|---|---|---|---|
| 3,312,499 A | 4/1967 | Podwys | |
| 3,411,821 A | 11/1968 | Adamski | |
| 5,673,959 A | 10/1997 | Padlo | |
| 6,295,713 B1 | 10/2001 | Hilliard et al. | |
| 6,409,248 B1 * | 6/2002 | Bores | 296/122 |
| 6,439,643 B2 | 8/2002 | Barker | |
| 7,469,954 B2 * | 12/2008 | Fallis et al. | 296/107.09 |
| 2002/0106260 A1 | 8/2002 | Schenk | |
| 2010/0026039 A1 | 2/2010 | Froschle | |

OTHER PUBLICATIONS

International Search Report in PCT Application No. PCT/US2012/023650 dated May 10, 2012, 3 pages.

* cited by examiner

Primary Examiner — Joseph Pape
(74) Attorney, Agent, or Firm — Patton Boggs LLP

(57) ABSTRACT

In one embodiment of a retractable top for a vehicle having an open top, including a left and a right rear roll bar projecting vertically from the rear floor above the height of the vertical walls, the roll bars projecting forward to join a transverse roll bar and forming a roll cage, the retractable top includes support members attached to two of the three horizontal sides. The retractable top includes linkage arms attached to the support members configured to move from a retracted position to an extended position, linkage arms including a bow arm that has a first tapered interconnection aperture, the first tapered interconnection aperture shaped to receive a first connector and recess the first connector such that an end of the first connector is flush with a first surface of the bow arm. The retractable top includes an enclosure material oriented to cover the open top when extended.

19 Claims, 49 Drawing Sheets

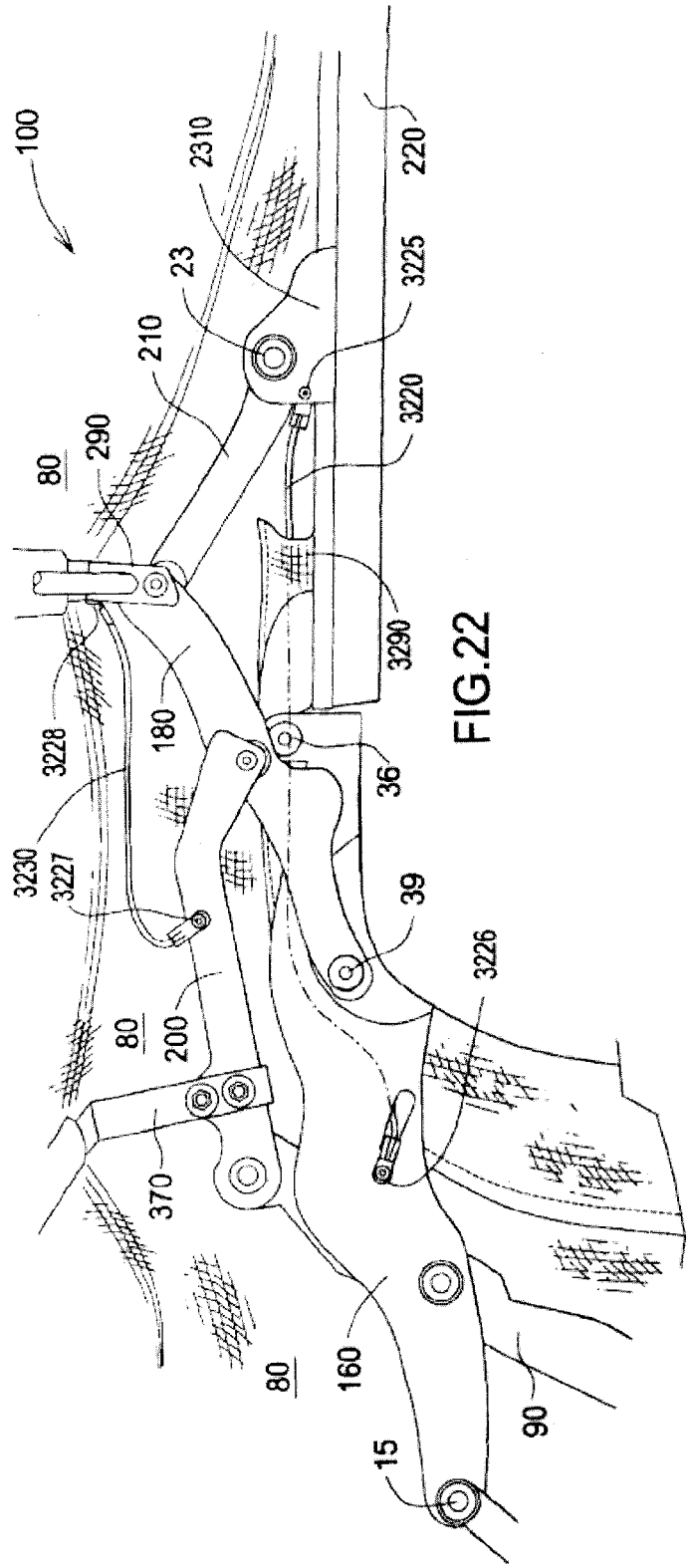
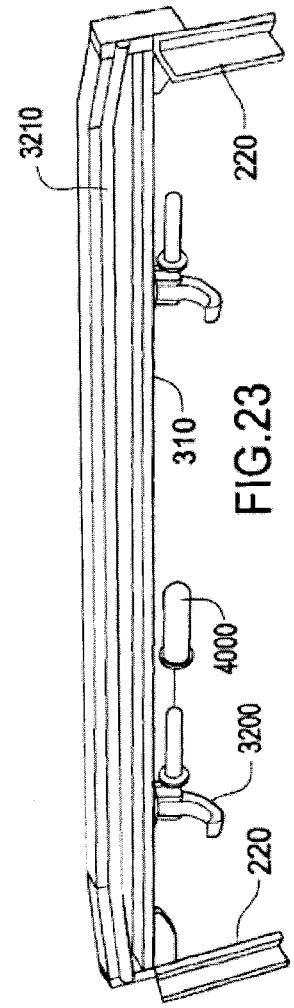

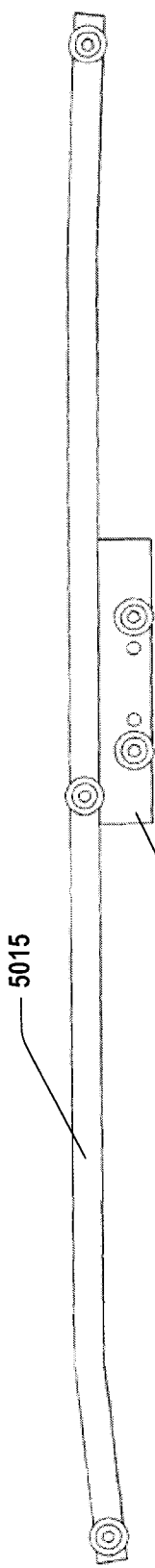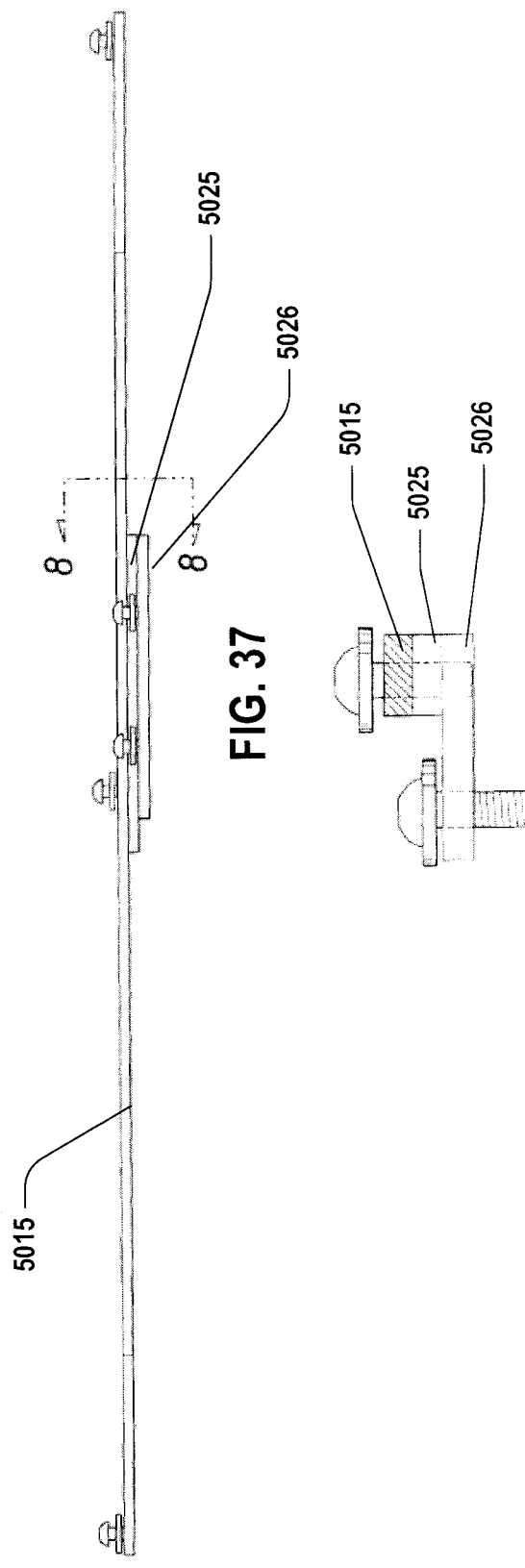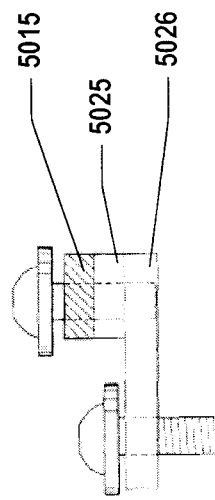

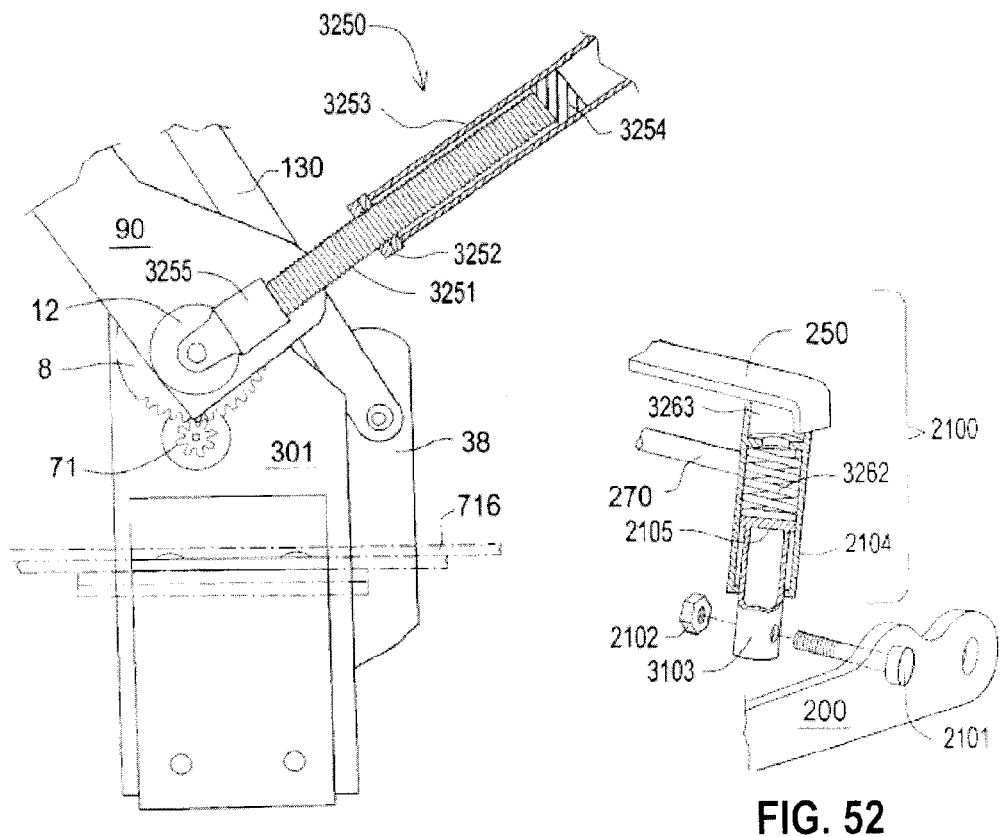
FIG. 51
FIG. 52
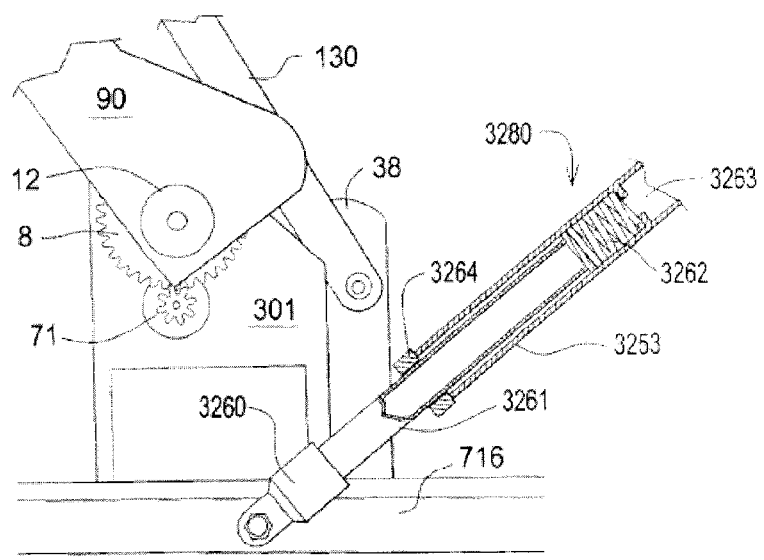
FIG. 53

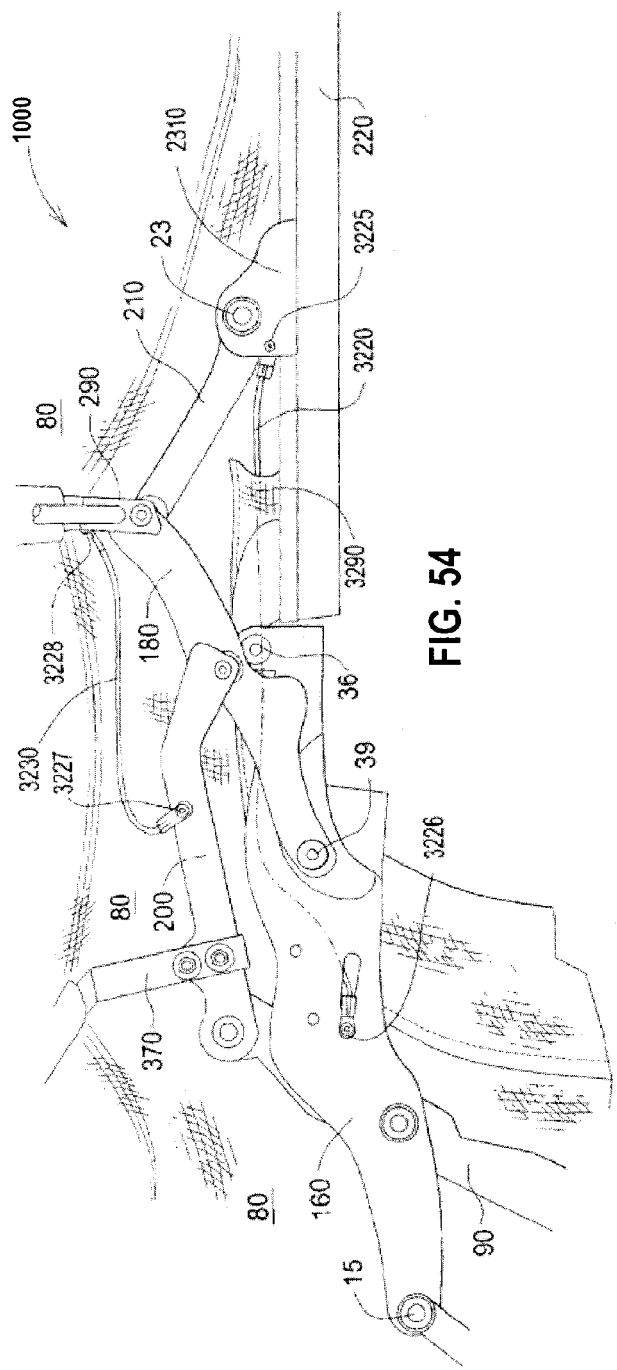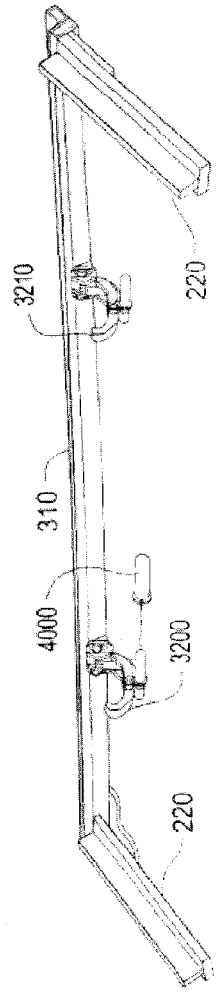

8,672,389 B2

RETRACTABLE TOP FOR AN OPEN VEHICLE

FIELD

The retractable top for an open vehicle relates to a convertible top for modern Jeeps® or other vehicles with a passenger compartment and an open rear compartment.

BACKGROUND

Retractable tops for Jeeps® exist in the art; however, current designs are somewhat limited and do not fit current Jeeps and other vehicles. No design exists that accommodates a left and a right roll bar that connects from a side panel forward to the central roof roll bar, referred to as a roll cage. The new roll cage configuration of more modern Jeeps provides less space as compared to previous Jeeps for the mounting of a retractable top. Jeep does not currently make a retractable top and its designs are not made to accommodate one.

SUMMARY

In one embodiment, the top accommodates a pair of right angle roll bars, which extend to the rear of the floor of the open rear compartment and extend straight upward from the floor on the left and right rear sections of the vehicle, and then go forward to the central roof roll bar, referred to as a roll cage. Models 1989-2010 T-J, K-J, Y-J Jeep Wranglers® and 1976-1988 C-J7 Jeep Wranglers® are expressly provided for, wherein previous designs will not fit these models. Furthermore, in another embodiment, the retractable top is configured to attach to the side of the vehicle frame as opposed to the floor or wheel wells. In another alternative, the top incorporates a bow arm having recessed apertures for receiving attachment member, such as a bolt or clamp, in order to allow attached bow arms to rotate close to the first arm without being impeded by an attachment member end. In other alternatives, the bow also includes a stop to prevent the pinching of enclosure material. Other alternatives, include an optional electric motor actuator, a powered rear bow to help lift the top material, a motor stop, a free wheeling motor to allow a wind to force the top down from a partially open position or to allow a manual operation, a secure wind-resistant closure for the vertical door brackets, a boot for the door brackets, an easy-acting windshield clamp, a tightening cable and anti-jam cable in the linkage, and rubber seals for the windshield and door joints. Other alternatives include a folding mode, which does not require an extension backward of the spare tire assembly, and a detachable rear window.

In one embodiment of a retractable top for a vehicle, the vehicle having an open top front passenger compartment and an open top rear compartment, the rear compartment having a horizontal floor and a substantially vertical wall structure on at least three horizontal sides forming the rear compartment bounded on the bottom by the floor and laterally by the vertical wall structure, the rear compartment having an open top, the rear compartment including a left and a right rear roll bar projecting vertically from the rear of the floor of the rear compartment above the height of the vertical walls, the roll bars projecting forward at a ceiling height to join a transverse roll bar and forming a roll cage, the retractable top includes a first and second support member attached to two of the three horizontal sides forming the rear compartment. The retractable top further includes a plurality of linkage arms attached to the first and second support members configured to move from a retracted position to an extended position, the plurality of linkage arms including a second bow arm, the second bow arm including a first tapered interconnection aperture, the first tapered interconnection aperture, the first tapered interconnection aperture shaped to receive a first connector and recess the first connector such that an end of the first connector is flush with a first surface of the second bow arm. The retractable top further includes an enclosure material oriented to span at least a portion of the plurality of linkage arms such that, when the plurality of linkage arms are in the extended position, the open top of the front and rear compartments is substantially covered. Optionally, the second bow arm further includes a second tapered interconnection aperture, the second tapered interconnection aperture, the second tapered interconnection aperture shaped to receive a second connector and recess the second connector such that an end of the second connector is flush with a second surface of the second bow arm and wherein the second bow bracket further includes a third tapered interconnection aperture, the third tapered interconnection aperture, the third tapered interconnection aperture shaped to receive a third connector and recess the third connector such that an end of the third connector is flush with the first surface of the second bow arm. Alternatively, the plurality of linkage arms include a first bow arm, a third bow arm, and a K-arm, the first bow arm and K-arm interconnected to the second bow arm via the first and third tapered opening respectively, the third bow arm interconnected to the second bow arm via the second tapered opening. In another alternative, the second bow arm further includes a stop, the stop configured to brace the first bow arm when the retractable top is in a folded position. In another alternative, the top includes a first and second sealing bracket connected to the plurality of linkage arms, the enclosure material further spanning the first and second sealing bracket such that, when the plurality of linkage arms are in the extended position, the first and second sealing bracket interface with a left and right side portion of the front passenger compartment. In one alternative the top includes a cable having a stiffness such that when the retractable top is folded, the stiffness of the cable prevents the enclosure material from sagging downward and becoming snagged in the plurality of linkage arms, the cable pulling the enclosure material taught against the plurality of linkage arms when the retractable top is extended and the stiffness. Optionally, the first and second support members are attached to a left and a right side of the vertical wall structure, respectively. Alternatively, the first, second, third, fourth, fifth, and sixth support member include a first and second slot, the first and second slot configured to receive a second, third, fourth, and fifth attachment member. In another alternative the top attaches without the need to drill holes in the windshield.

In another embodiment, a retractable top for a vehicle, the vehicle having an open top front passenger compartment and an open top rear compartment, the rear compartment having a horizontal floor and a substantially vertical wall structure on at least three horizontal sides forming the rear compartment bounded on the bottom by the floor and laterally by the vertical wall structure, the rear compartment having an open top, the rear compartment including a left and a right rear roll bar projecting vertically from the rear of the floor of the rear compartment above the height of the vertical walls, the roll bars projecting forward at a ceiling height to join a transverse roll bar and forming a roll cage, the retractable top includes a first and second support member attached to two of the three horizontal sides forming the rear compartment. The retractable top further includes a plurality of linkage arms attached to the first and second support members configured to move from a retracted position to an extended position. The retractable top further includes an enclosure material oriented to span at least a portion of the plurality of linkage arms such that, when the plurality of linkage arms are in the extended position, the open top of the front and rear compartments is substantially covered. The retractable top further includes a first and second sealing bracket connected to the plurality of linkage arms, the enclosure material further spanning the first and second sealing bracket such that, when the plurality of linkage arms are in the extended position, the first and second sealing bracket interface with a left and right side portion of the front passenger compartment. In another alternative, the top includes a rear bow configured to support the enclosure material when the linkage arms are in the extended position. In another alternative, the left and right side portions of the front passenger compartment are each fitted with a groove to receive the first and second sealing bracket, wherein the interface is substantially windproof, and wherein the left and right side portions of the front passenger compartment are each fitted with a groove to receive the first and second sealing bracket and wherein the plurality of linkage arms and the first and second sealing bracket are configured such that, when the plurality of linkage arms are extended, the sealing bracket is guided by the movement of the plurality of linkage arms into the groove in the left and right side portions of the front passenger compartment. Optionally, the rear compartment includes a first and second wheel well extending up from the floor of the rear compartment, and wherein the first and second support members are attached to the first and second wheel well, respectively. Alternatively, the first and second support members are attached to a left and a right side of the vertical wall structure, respectively. In another alternative, the rear compartment includes a left and a right rear roll bar projecting vertically from the rear of the floor of the rear compartment above the height of the vertical walls, the roll bars projecting forward at a ceiling height to join a transverse roll bar and forming a roll cage, the retractable top further includes a left and a right roll cage bracket mount attached to the left and right rear roll bar, the left and right roll cage bracket mount interconnected with the first and second support member. Optionally, the vehicle has a front windshield, the retractable top further includes a clamp, the clamp anchored to the front windshield, and the clamp having a cavity; and a hook configured to interface with the cavity, the hook and cavity interface securing the retractable top to the front windshield. In another alternative, the top includes a spanning bar, the spanning bar spanning the plurality of linkage arms where the retractable top, when extended, interfaces with the front windshield. Optionally, the hook includes an arm having a first pivot point at the spanning bar and a hook portion having a second pivot point along the arm, such that when the arm is pivoted about the first pivot point, the second pivot point moves radially around the first pivot point lengthening and shortening the extension of the hook portion in relation to the spanning bar. Alternatively, when the extension of the hook portion is shortened and engaged with the cavity a holding tension is provided to the retractable top in relation to the front windshield.

In one embodiment, a retractable top for a vehicle, the vehicle having a front passenger compartment and a rear compartment, the rear compartment having a horizontal floor and a substantially vertical wall structure on at least three horizontal sides forming the rear compartment bounded on the bottom by the floor and laterally by the vertical wall structure, the rear compartment having an open top, the retractable top includes a first and second support member attached to the rear compartment. The top further includes a plurality of linkage arms attached to the first and second support members configured to move from a retracted position to an extended position. Additionally, the top includes an enclosure material oriented to span at least a portion of the plurality of linkage arms such that, when the plurality of linkage arms are in the extended position, the open top of the rear compartment is substantially covered.

In one alternative, the top further includes a first and second sealing bracket connected to the plurality of linkage arms, the enclosure material further spanning the first and second sealing bracket such that, when the plurality of linkage arms are in the extended position, the first and second sealing bracket interface with a left and right side portion of the front passenger compartment. In another alternative, the interface is substantially windproof. In another alternative, the left and right side portion of the front passenger compartment are each fitted with a groove to receive the first and second sealing bracket. In yet another alternative, the plurality of linkage arms and the first and second sealing bracket are configured such that, when the plurality of linkage arms are extended, the sealing bracket is guided by the movement of the plurality of linkage arms into the groove in the left and right side portion of the front passenger compartment. In another alternative, the top further includes a left and right guide portion for guiding the first and second sealing brackets into the groove in the left and right side portion of the front passenger compartment.

In one alternative, the front passenger compartment has an open top and, when the plurality of linkage arms are in the extended position, the open top of the front passenger compartment is substantially covered. In another alternative, the first and second support members are attached to the floor of the rear compartment. Optionally, the rear compartment includes a first and second wheel well extending up from the floor of the rear compartment and wherein the first and second support members are attached to the first and second wheel well respectively. Alternatively, the first and second support members are attached to a left and right side of the vertical wall structure, respectively. Further, the rear compartment may include a left and a right rear roll bar projecting vertically from the rear of the floor of the rear compartment above the height of the vertical walls, the roll bars projecting forward at a ceiling height to join a transverse roll bar, the retractable top further comprising a left and right roll cage bracket mount attached to the left and right rear roll bar. In another alternative, a rear bow configured to support the enclosure material when the linkage arms are in the extended position is included.

In one embodiment, the retractable top is for a vehicle, the vehicle having an open top front passenger compartment and an open top rear compartment, the rear compartment having a horizontal floor and a substantially vertical wall structure on at least three horizontal sides forming the rear compartment bounded on the bottom by the floor and laterally by the vertical wall structure, the rear compartment having an open top, the rear compartment including a left and a right rear roll bar projecting vertically from the rear of the floor of the rear compartment above the height of the vertical walls, the roll bars projecting forward at a ceiling height to join a transverse roll bar. The retractable top includes a means for attaching the retractable top to the rear compartment; a means for supporting the retractable top and for allowing the retractable top to be moved to and positioned in a retracted position an extended position; a means for spanning at least a portion of the means for supporting such that, when means for supporting are in the extended position, the open top of the front and rear compartments is substantially covered; a means for securing the retractable top to the left and right rear roll bar, means for securing interconnected with the means for attaching; and a means for sealing the retractable top connected to means for supporting, means for spanning further spanning the means for sealing such that, when the means for supporting are in the extended position, the means for sealing interface with a left and right side portion of the front passenger compartment.

In another embodiment, the retractable top is for a vehicle, the vehicle having an open top front passenger compartment and an open top rear compartment, the rear compartment having a horizontal floor and a substantially vertical wall structure on at least three horizontal sides forming the rear compartment bounded on the bottom by the floor and laterally by the vertical wall structure, the rear compartment having an open top, the rear compartment including a left and a right rear roll bar projecting vertically from the rear of the floor of the rear compartment above the height of the vertical walls, the roll bars projecting forward at a ceiling height to join a transverse roll bar. The retractable top includes a first and second support member attached to two of the three horizontal sides forming the rear compartment; a plurality of linkage arms attached to the first and second support members configured to move from a retracted position to an extended position; an enclosure material oriented to span at least a portion of the plurality of linkage arms such that, when the plurality of linkage arms are in the extended position, the open top of the front and rear compartments is substantially covered; a left and a right roll cage bracket mount attached to the left and right rear roll bar, the left and right roll cage bracket mount interconnected with the first and second support member; and a first and second sealing bracket connected to the plurality of linkage arms, the enclosure material further spanning the first and second sealing bracket such that, when the plurality of linkage arms are in the extended position, the first and second sealing bracket interface with a left and right side portion of the front passenger compartment. In one alternative, the retractable top includes a rear bow configured to support the enclosure material when the linkage arms are in the extended position. In another alternative, the rear bow is motorized. In another alternative, the left and right side portions of the front passenger compartment are each fitted with a groove to receive the first and second sealing bracket. Alternatively, the interface is substantially windproof. In another alternative, the left and right side portions of the front passenger compartment are each fitted with a groove to receive the first and second sealing bracket. Additionally, the plurality of linkage arms and the first and second sealing bracket may be configured such that, when the plurality of linkage arms are extended, the sealing bracket is guided by the movement of the plurality of linkage arms into the groove in the left and right side portions of the front passenger compartment.

In one embodiment, a retractable top for a vehicle, the vehicle having a front passenger compartment and a rear compartment, the rear compartment having a horizontal floor and a substantially vertical wall structure on at least three horizontal sides forming the rear compartment bounded on the bottom by the floor and laterally by the vertical wall structure, the rear compartment having an open top, the retractable top includes a left and a right roll cage bracket mount attached to the left and right rear roll bar and a first and second support member, the left and right roll cage bracket mount interconnected with the first and second support member. The top further includes a plurality of linkage arms attached to the first and second support members configured to move from a retracted position to an extended position. Additionally, the top includes an enclosure material oriented to span at least a portion of the plurality of linkage arms, such that when the plurality of linkage arms are in the extended position, the open top of the rear compartment is substantially covered. In one alternative, where the vehicle has a front windshield, the retractable top further includes a clamp, the clamp anchored to the front windshield and the clamp having a cavity and a hook configured to interface with the cavity, the hook and cavity interface securing the retractable top to the front windshield. Additionally, the top may include a spanning bar, the spanning bar spanning the plurality of linkage arms where the retractable top, when extended, interfaces with the front windshield. Additionally, the hook may include an arm having a first pivot point at the spanning bar and a hook portion having a second pivot point along the arm such that, when the arm is pivoted about the first pivot point, the second pivot point moves radially around the first pivot point lengthening and shortening the extension of the hook portion in relation to the spanning bar. Optionally, when the extension of the hook portion is shortened and engaged with the cavity, a holding tension is provided to the retractable top in relation to the front windshield.

These and other features and advantages reside in the construction of parts and the combination thereof, and the mode of operation and use, as will become more apparent from the following description, reference being made to the accompanying drawings that form a part of this specification wherein like reference characters designate corresponding parts in the several views. The embodiments and features thereof are described and illustrated in conjunction with systems, tools, and methods that are meant to exemplify and to illustrate, not being limiting in scope.

BRIEF DESCRIPTION OF THE DRAWINGS

FIG. 22 is a plan view from inside the vehicle looking out of the left side of a closed convertible top, seeing the cable attachments;

FIG. 23 is a front perspective view showing the top halfway up and showing the seal atop the front bracket;

FIG. 36 is a top view of a horizontal bottom bar;

FIG. 37 is a side view of FIG. 36;

FIG. 38 is a detail view along the cross section cut line 8 in FIG. 37;

FIG. 51 is a partial cutaway view of the lower bow base with a bolt type adjuster;

FIG. 52 is a partial cutaway view of the top bow base with a spring type adjuster;

FIG. 53 is a partial cutaway view of the lower top bow base with a spring type adjuster;

FIG. 54 is a plan view from inside the vehicle looking out of the left side of a closed convertible top, seeing the cable attachments;

FIG. 55 is a front perspective view showing the top halfway up and showing the seal atop the front bracket;

DETAILED DESCRIPTION

Currently, Jeeps® are not designed to be fitted with a retractable top. In fact, a number of features of Jeeps, especially those made in more recent years make the fitting of a top to a Jeep more difficult. Since Jeep has moved from a roll bar to a roll cage to protect rear passengers, a retractable top must traverse the approximately right angle of the roll bar. Also, the roll cage makes the available mounting area for a retractable top extremely narrow, since the top must be on the outside of the roll cage. The location of the roll cage and configuration of the Jeep also makes attachment to the floor of the vehicle extremely difficult in recent model. Furthermore, it is difficult to form an airtight seal on the side of the Jeep. These challenges are found with other open compartment vehicles, such as the Hummer H1 and other open compartment vehicles. Embodiments of the retractable top described herein include innovations that allow for a narrow profile to the retractable top, the traverse of a sharp angle of the roll cage, the side mounting of the retractable top, the windproof fit of the side panel, and numerous other innovations. Although these innovations are described in relation to a Jeep vehicle, they can be similarly provided to open compartment vehicles.

For instance, in order to narrow the profile of the linkage arm configuration, tapered slots are used for receiving some of the attachment mechanisms (bolts) used. This is primarily in relation to the second bow arm (also referred to as the second linkage arm). Since the second bow arm attaches to multiple other arms, it would not be possible to fit the arms closely together and still provide for the proper rotation of the arms. By using a tapered receiving slot, the attachment mechanism used is set into the second bow arm and therefore does not project away from its surface. Therefore, the face of the second bow arm and other arms attached to it may be closer while still allowing for a greater degree of angular rotation needed to fold and unfold the retractable top. Also, in some embodiments the rubberized top is made of stay-fast an extremely flexible cloth-like material. This material, stay-fast, enables fluid operation of the top in some embodiments due to its high degree of flexibility. In some embodiments, extremely flexible top material is needed.

Additional detail may be found below describing various embodiment configured to fit with Jeeps that include a roll cage. The principles of these embodiments may apply to various other vehicles with such an open compartment and roll cage configuration. In some alternatives, the various metal arms are referred to linkages, in other instances bows or arms. These terms will be understandable and interchangeable to those skilled in the art and will recognize their interchangeable nature.

Figure 1:
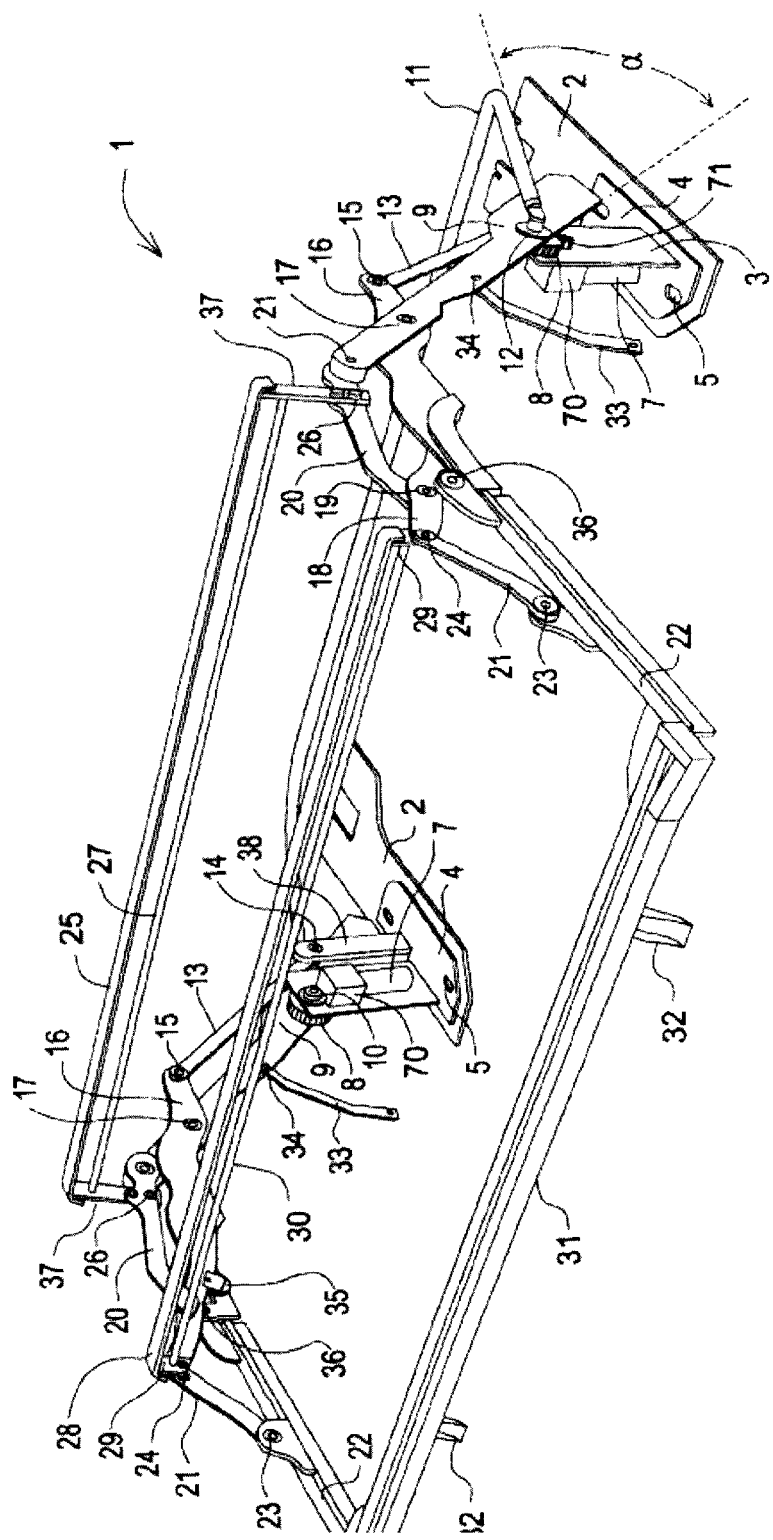
FIG. 1 is a top perspective view of a first embodiment of a retractable top in a fully deployed position, with the cover and side closure brackets removed.
Figure 2:
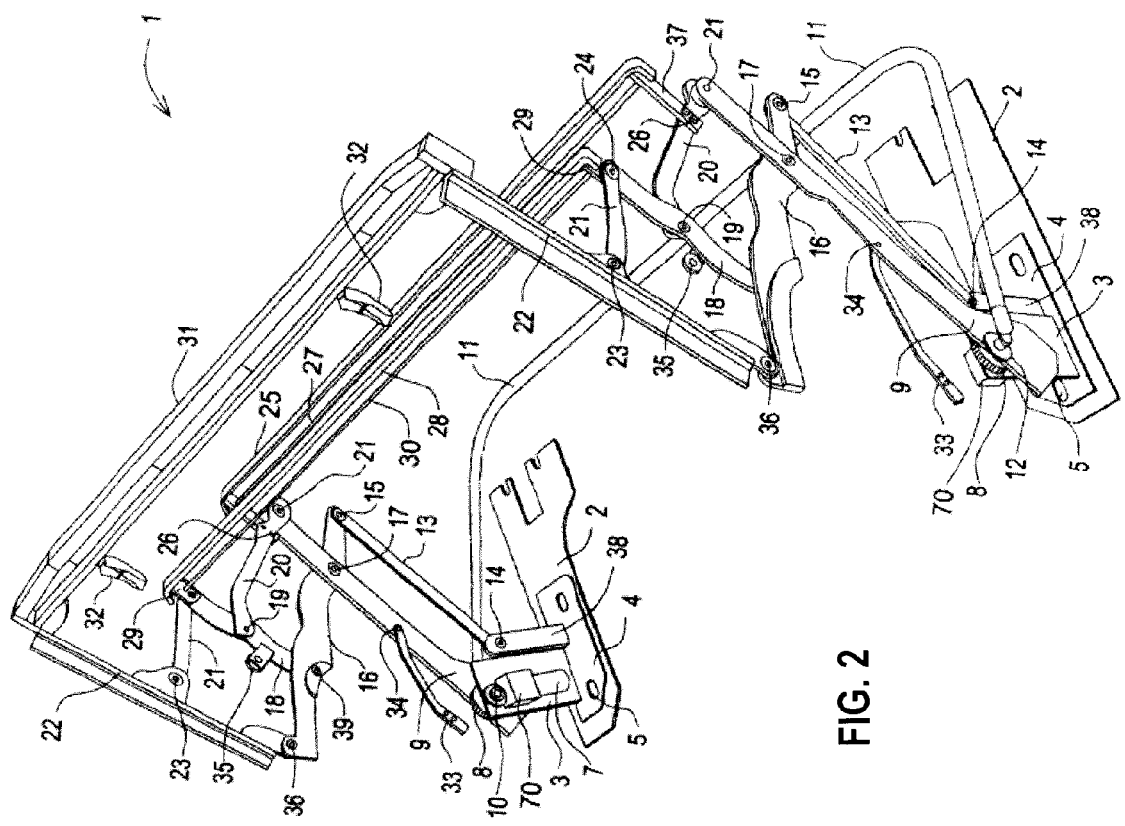
FIG. 2 is the same view as FIG. 1 showing the retractable top deployed between a fully deployed and a retracted position.

Referring first to FIGS. 1 and 2, a first embodiment retractable top 1 is seen to have a pair of horizontal support plates 2 preferably designed to mount atop a pair of rear wheel wells in the rear compartment of various Jeeps®. Although the embodiment is shown as being mounted on a Jeep®, the top may be mounted and reconfigured for a variety of vehicles having an open rear compartment or an open front and rear compartment. A pair of vertical linkage support brackets 3 each have a foot 4 attached to the support plates 2. Bolts (not shown) mounted through holes 5 secure the support plates 2 to the vehicle. A parallel vertical trailing arm motor plate 38 supports pivot mount 14. The vertical linkage support brackets form a means for attaching the top to the vehicle. The vertical linkage support brackets may also be termed "support members" and may come in various forms not limited to the embodiment shown. Various brackets, plates, and other structures may be used to attach the top to the vehicle.

Figure 8:
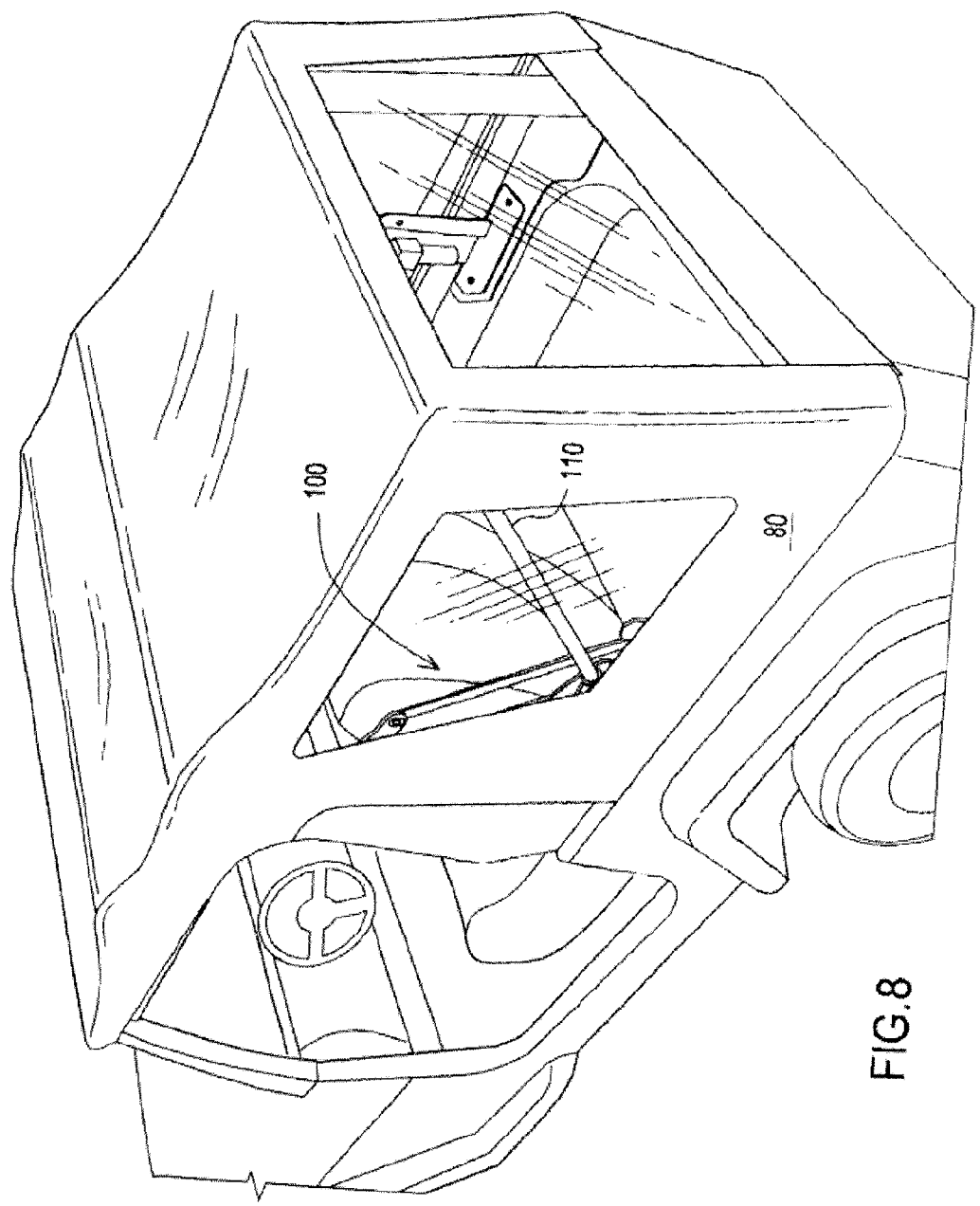
FIG. 8 is the same view as FIG. 7 with the cover shown.

A two-directional motor 7 has a drive gear 71 supported by the support bracket 3, wherein gear 71 drives a linkage gear 8 which is fastened to the first linkage arm 9. The center of linkage gear 8 has an axle 10 which supports first linkage arm 9 in a pivot mount so that first linkage arm 9 can be moved from the fully deployed position shown to the retracted position shown in FIG. 3. A rear bow 11 has a pivot mount 12 so as to fold parallel to the first linkage arm 9 in the retracted position shown in FIG. 3. However, a stop (not shown) stops the bow 11 from moving more than angle a, thereby causing bow 11 to lift and support the top 80 as shown in FIG. 8. Top 80 can be any flexible material such as canvas, cloth, or other material.

Figure 9:
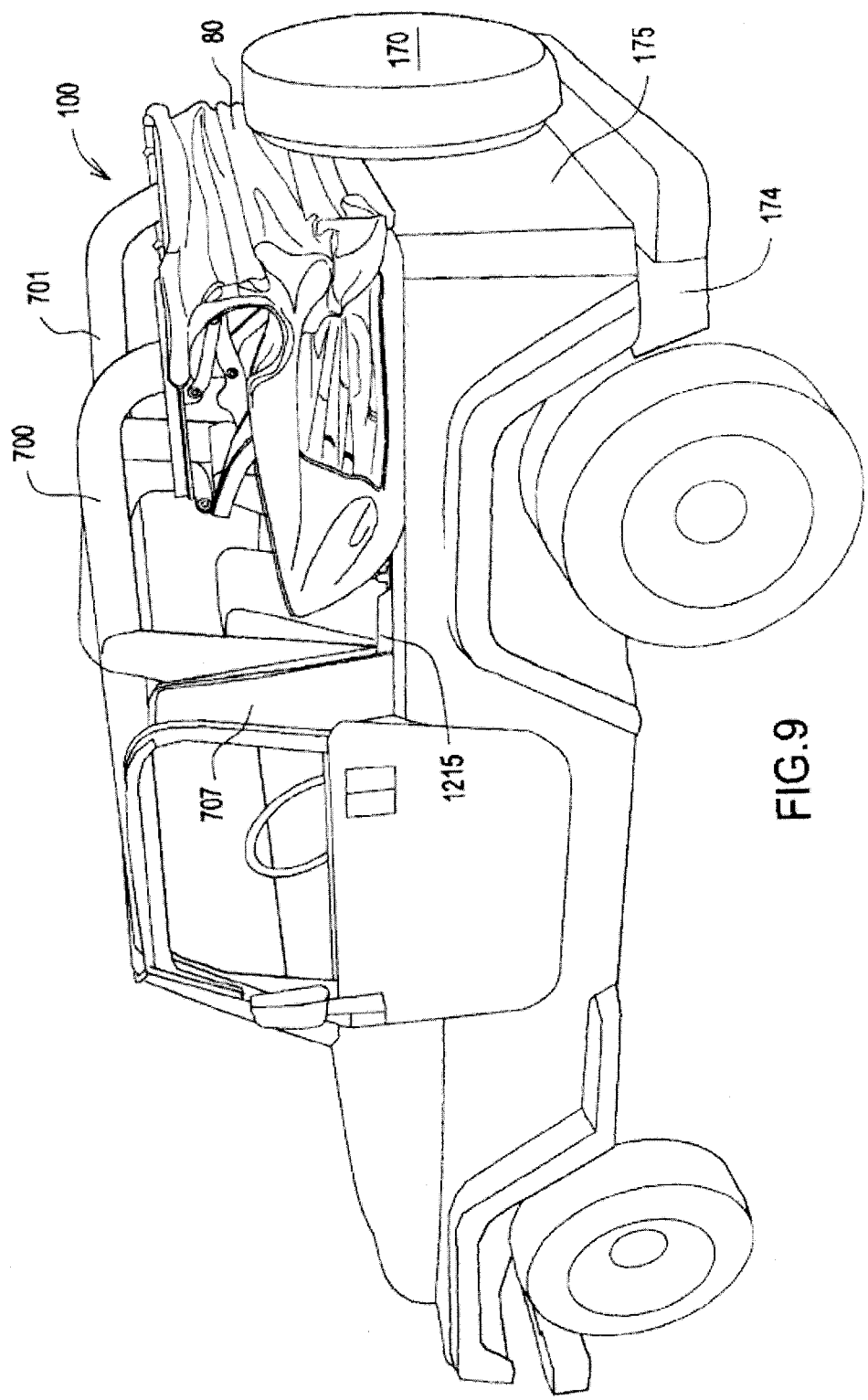
FIG. 9 is a side perspective view of the FIG. 7 vehicle with the retractable cover in the partly retracted mode, showing the spare tire in the factory standard position, wherein the top retracts below the middle of the brake light and in front of the spare tire.

A second linkage arm 13 has a pivot mount 14 on the trailing arm motor plate 38. The upper end of second linkage arm 13 has a pivot mount 15 to third linkage arm 16, which is also pivot mounted at 17 to first linkage arm 9, and has pivot mount 36 to linkage arm 20. A fourth linkage arm 18 has a pivot mount 19 to fifth linkage arm 20 which has a rear end pivot mounted to the top of the first linkage arm 9. A sixth linkage arm 21 has a pivot mount at a forward end to frame 22 at 23 and a pivot mount 24 to fourth linkage arm 18. These linkage arms form a means for supporting the retractable top of the vehicle, although other pieces shown in the figures may be included in the supporting means. Further, arrangements that depart from the embodiment shown are possible. The support means is configured to cover the top of the vehicle, while keeping the amount of overlap and protrusion at a low level. The support means is also designed to fold for storage as shown in FIG. 9.

A mid bow 25, supported by brackets 37, has a fixed mount bracket 26 to the fifth linkage arm 20. A support rod 27 adds structural rigidity between the two brackets 26. A front bow 28 has a pivoting bracket 29 mounted to pivot mount 24. A support rod 30 adds structural rigidity between the two brackets 29. The front frame member 31 has windshield clamps 32. During transition, the third linkage arm 16 continues to move essentially parallel to the ground.

In FIG. 1, the offset steel brackets 33 can be seen extending forward as they are pivot mounted at 34 to first linkage arm 9.

In FIG. 2, the stop 35 is shown midway to flange 36, which prevents the motor 7 from over deploying the top 1. The motor 7 is a free-wheel type to allow manual deployment of the top 1 as well as to allow a strong wind to retract the top 1 when the driver turns the motor 7 off. K-arm control spacer 39 supports linkage arm 18.

Figure 4:
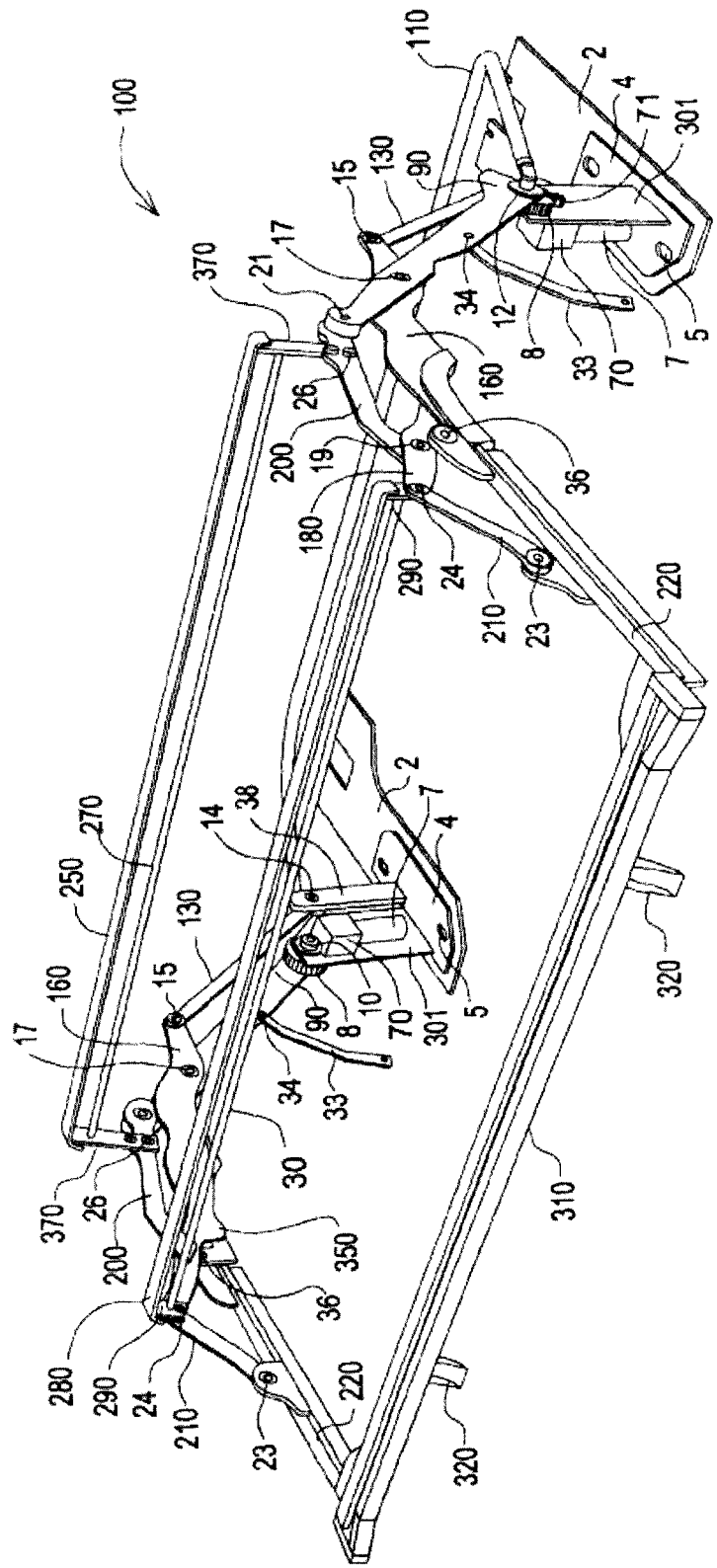
FIG. 4 is a top perspective view of an 11 vs. 110 retractable top in a fully deployed position, with the cover and side closure brackets removed.
Figure 5:
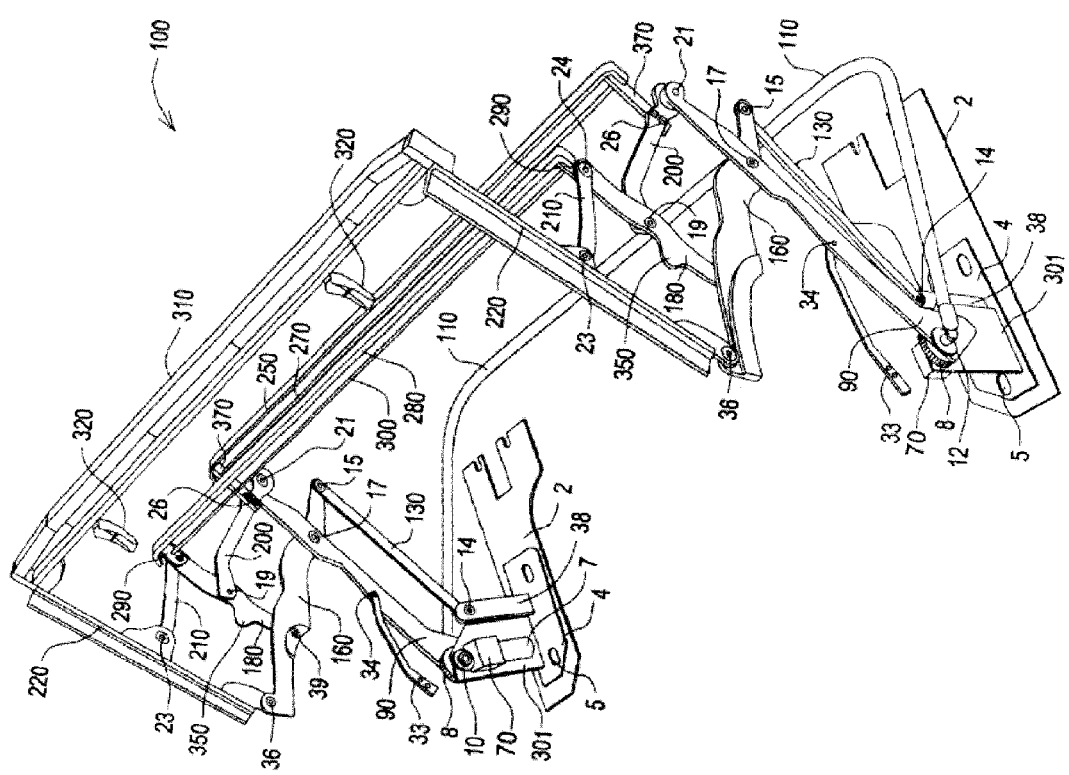
FIG. 5 is the same view as FIG. 4 showing the retractable top deployed between a fully deployed and a retracted position.
Figure 6:
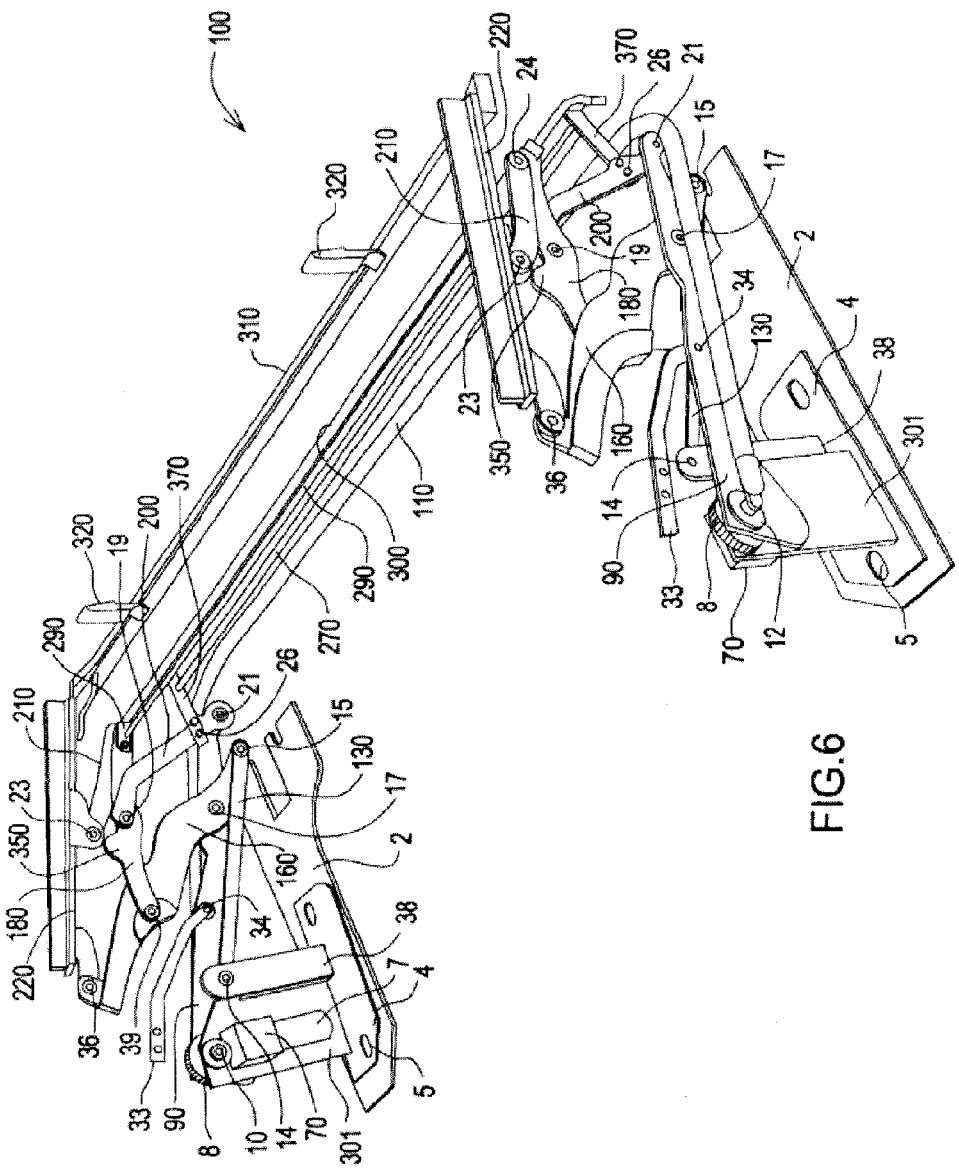
FIG. 6 is the same view as FIG. 4 showing the retractable top in the retracted position.

Referring next to FIGS. 4, 5, and 6, a second embodiment top 100 is shown in the same sequence of views as the first embodiment top 1. The operation of top 100 is the same as top 1. A zero has been added to show like parts. Some embodiments of top 100 can be folded into the storage compartment of a Jeep® model.

Figure 3:
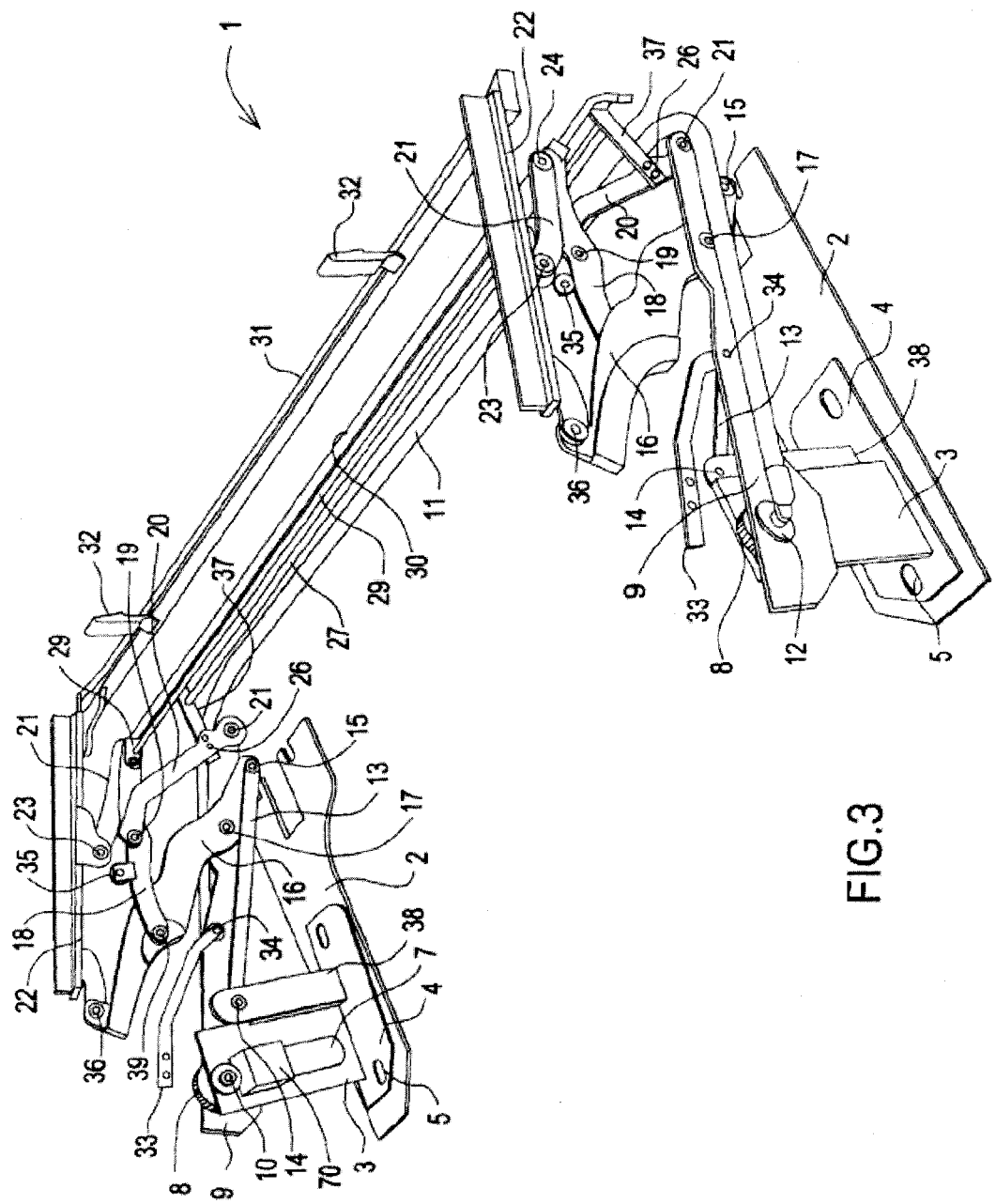
FIG. 3 is the same view as FIG. 1 showing the retractable top in the retracted position.
Figure 7:
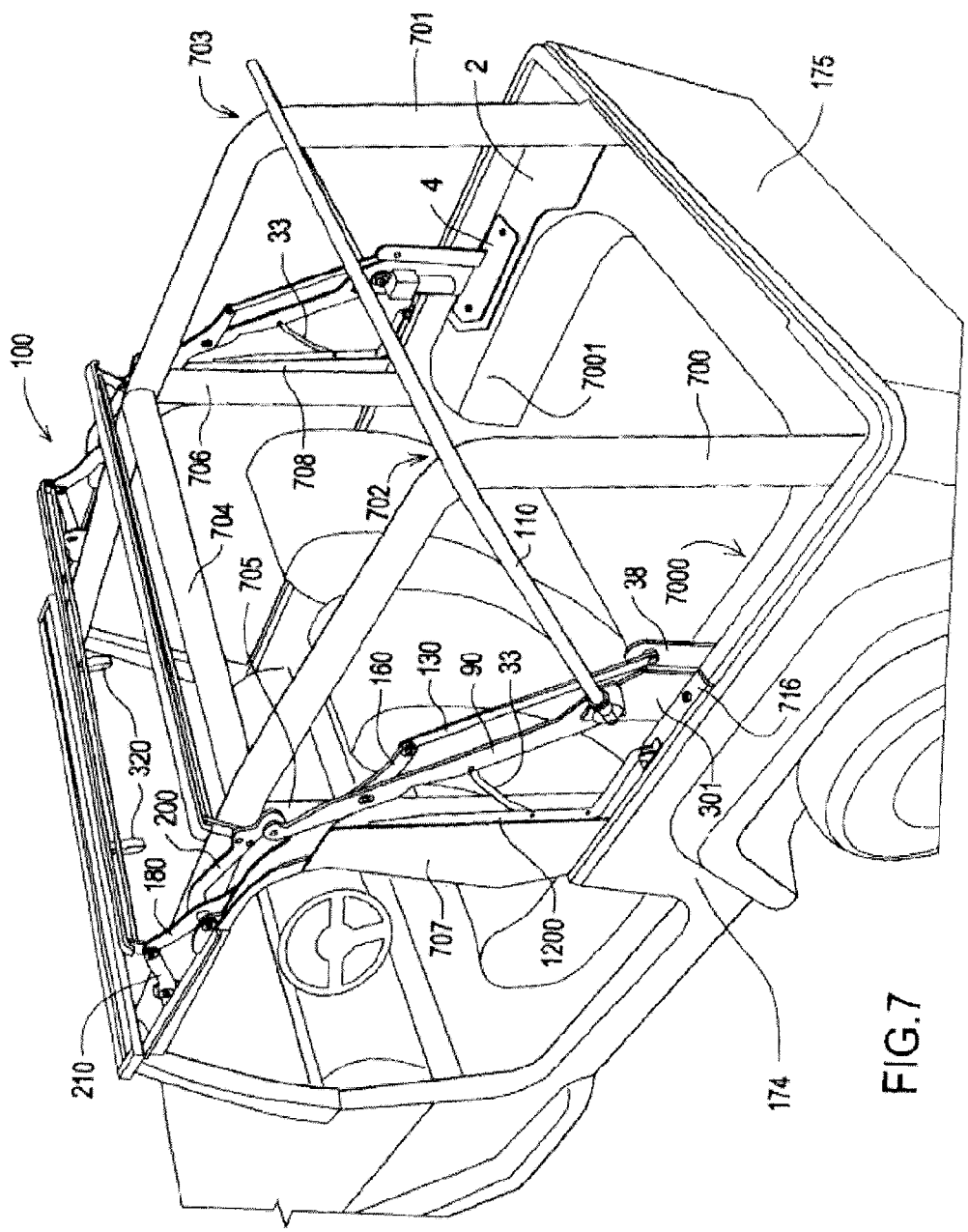
FIG. 7 is a rear perspective view of a vehicle (2005 Jeep Wrangler® T-J) having the second embodiment retractable top installed thereon in the fully deployed position, with the cover removed.

The number designations for FIGS. 4, 5, and 6 that differ from FIGS. 1, 2, and 3 are listed below:

110 rear bow
   90 first linkage arm
   130 second linkage arm
   160 K-arm
   180 second bow arm
   200 third bow arm
   210 first bow link
   220 frame
   310 front bow
   320 front clamps
   250 bow
   280 bow
   301 motor support plate flange
   350 stop
   370 bracket Referring next to FIG. 7, the vehicle 174 has a rear tailgate 175 shown without the spare tire assembly. The top 100 is shown fully deployed without the covering material. Wheel wells 7000, 7001 are shown to support brackets 2. The roll bars 700, 701 project nearly vertically from the rear of the rear compartment. They form an approximate right angle at 702, 703 before extending forward to a cross bar 704. This forms a roll cage. Vertical supports 705, 706 are used to support the top's left door bracket 707 and right door bracket 708.

Figure 13:
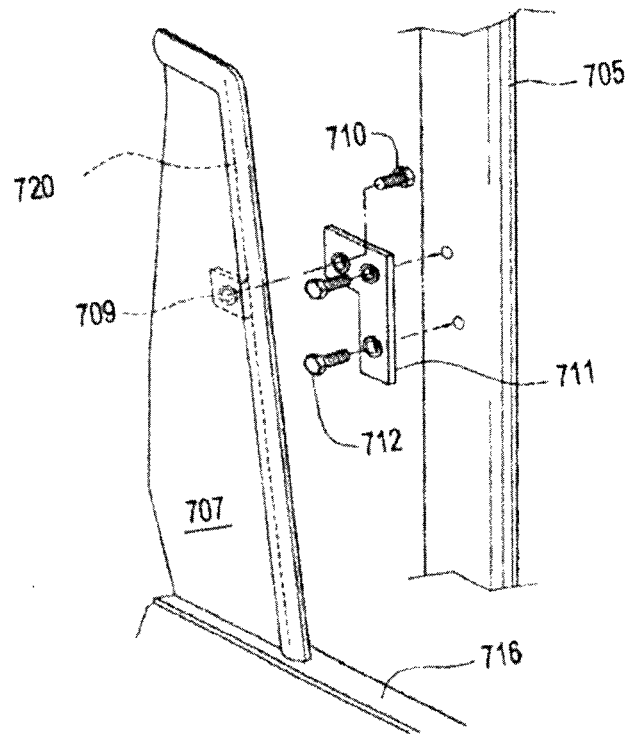
FIG. 13 is an exploded view of the door bracket assembly.

In FIG. 13, the left door bracket 707 is seen to have a side plate roll bar spacer 709 shown in dots to which a bolt 710 is fastened through roll bar mount bracket 711. Roll bar mount bracket 711 is attached to the vertical support 705 with screws 712. The base of left door bracket 707 may have bolts (not shown) fastened to the vehicle body ledge 716. Brackets 707, 708 preferably are made of aluminum and can have mounting flanges readily attached thereto. A rubber gasket 720 seals the air space to the L-arm 1200.

Figure 11:
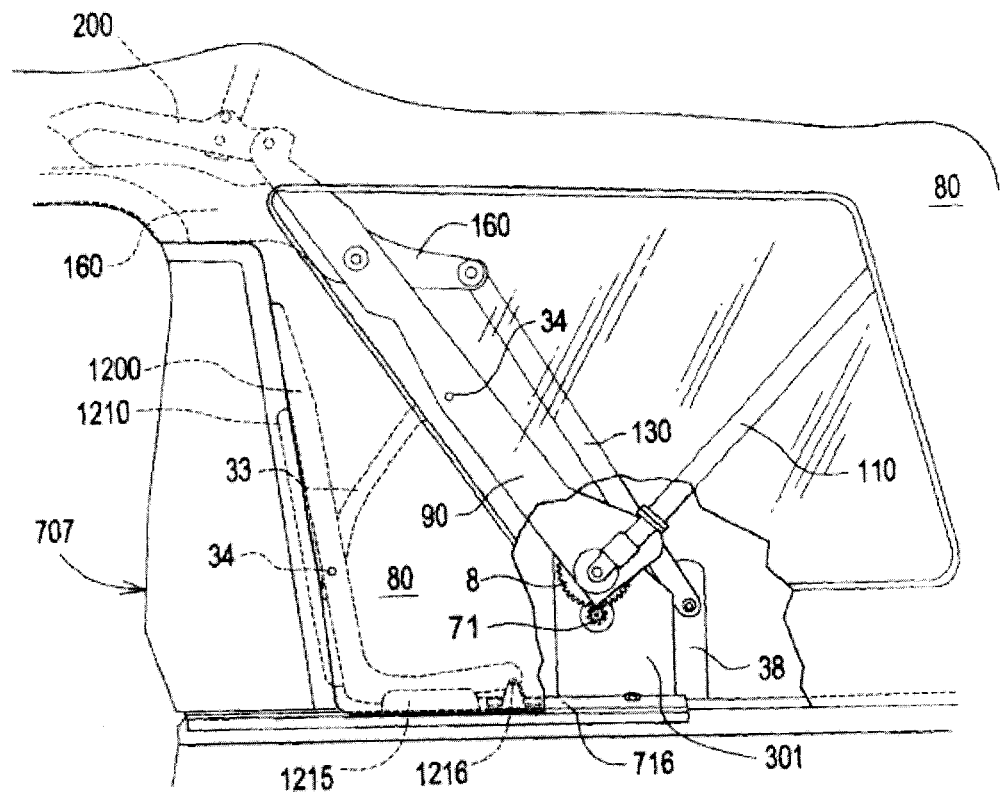
FIG. 11 is a side plan view of the door bracket closure assembly in the deployed mode.
Figure 12:
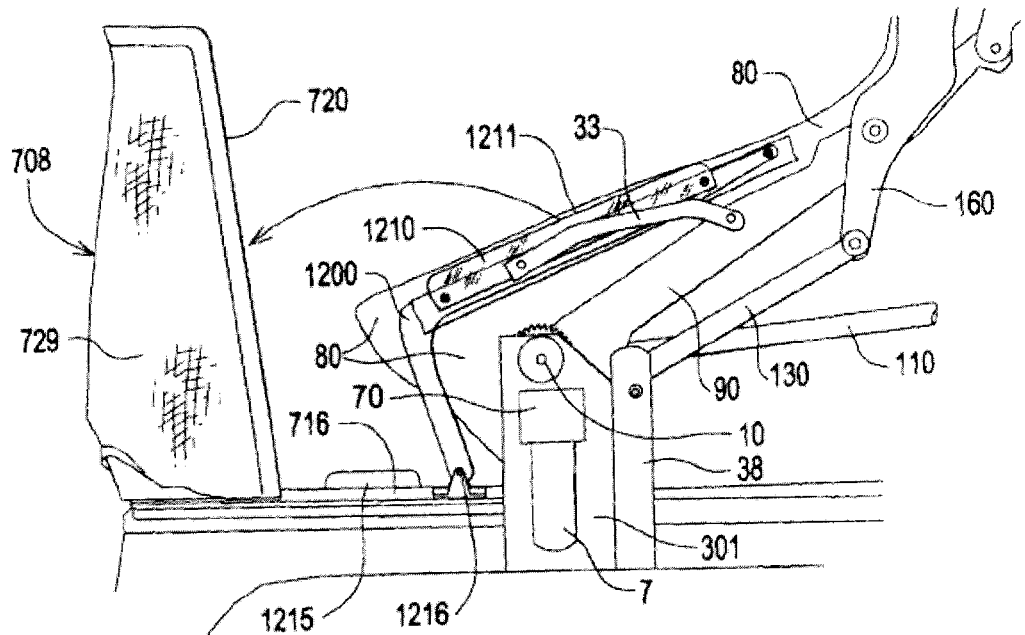
FIG. 12 is the same view as FIG. 11 with the assembly in a partially retracted mode.

In FIGS. 11 and 12, the L-arm 1200 is shown to have a guide 1210, preferably made of plastic, which forms a groove 1211 to receive the rubber gasket 720 and bracket 707. FIG. 11 shows the left lower bracket 707, and FIG. 12 shows the right door bracket 708 with the top 100 partially closed. The L-arm 1200 pivots at 2 piece T-plate 1216, and a side panel outer guide 1217 helps keep it aligned with the bracket 707. A soft boot 729 slides over door bracket 708. The boot 729 is fitted with a wind sealing rubber gasket 720. These brackets form means for sealing when engaged with the side of the vehicle.

Figure 10:
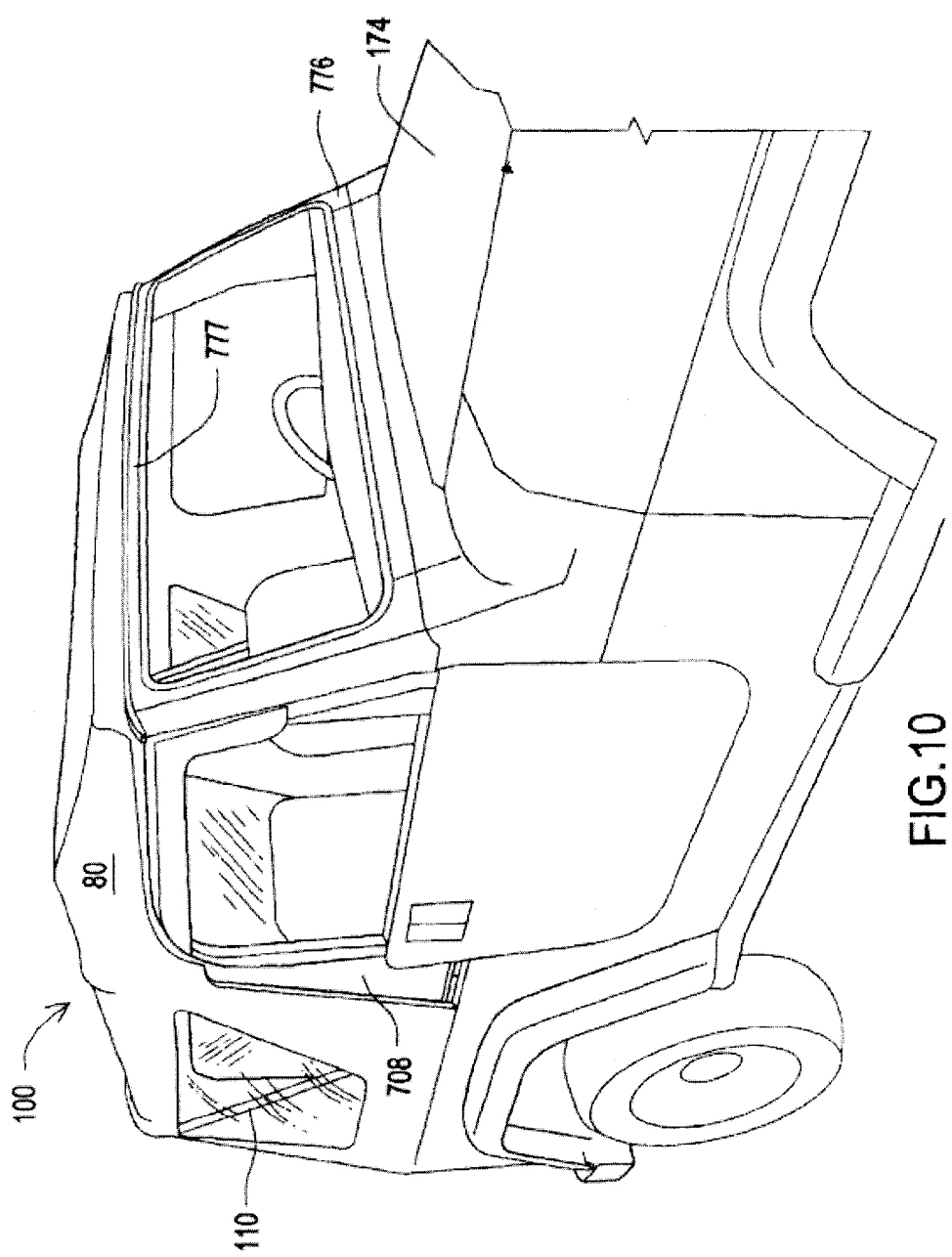
FIG. 10 is a front perspective view of the FIG. 7 vehicle.

In FIG. 11, the offset steel bracket 33 is pressed against the L-arm 1200 via the first linkage arm 90. FIGS. 8, 9, and 10 show perspective views of the top 100. The windshield 776 has a top rim 777.

Figure 14:
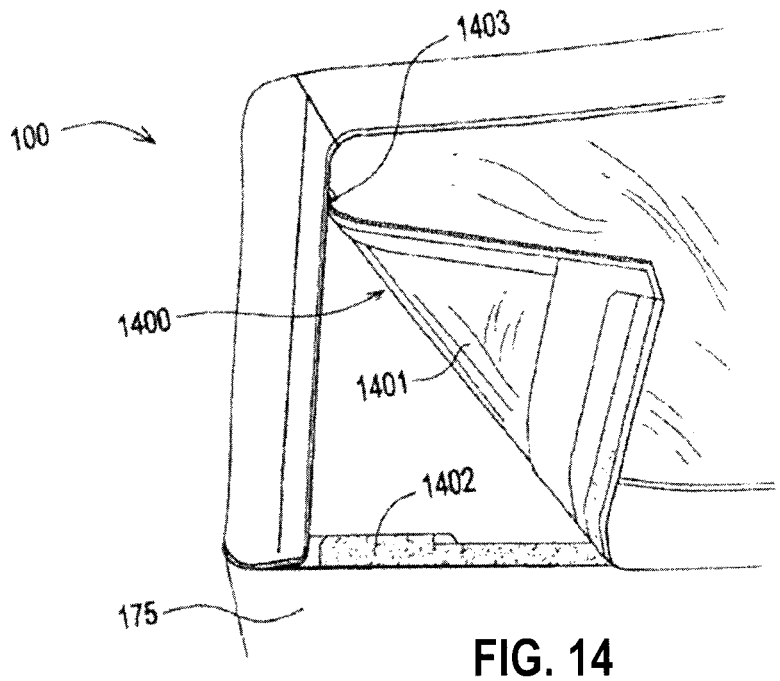
FIG. 14 is a rear perspective view of the removable rear window.

Referring next to FIG. 14, the top 100 has a removable rear window 1400. The removable panel 1401 is secured by a zipper 1403 and a hook and loop seam 1402.

Figure 15:
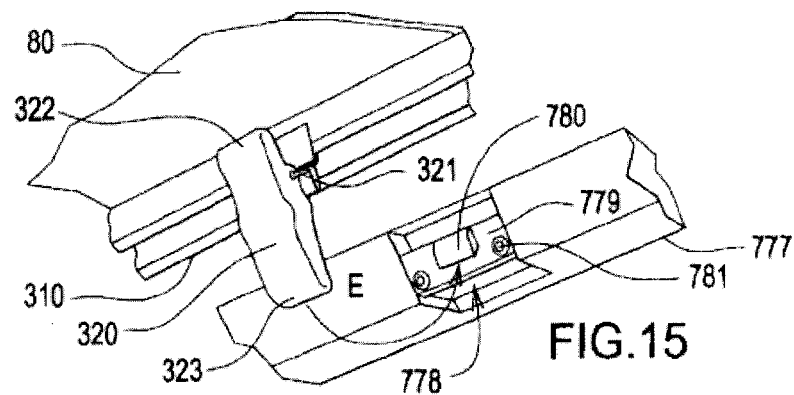
FIG. 15 is a close-up view of the windshield clamp.

Referring next to FIG. 15, the top rim 777 has an inside cutout 778 into which is mounted a custom catch 780 having a base plate 779 with bolts 781. The front clamp 320 is hinged at 321, wherein the user can push upper clip 322 to lock the catch assembly 1500, or pull upper 20 to clip 322 to release the catch assembly 1500. Lower clip 323 engages the catch 780 as shown by arrow E.

Figure 16:
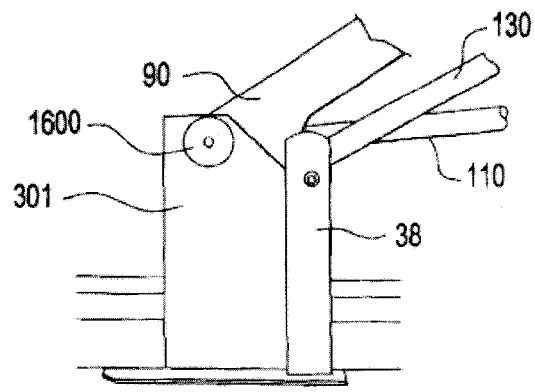
FIG. 16 is a side plan view of a motorless embodiment showing the vertical support brace.

Referring next to FIG. 16, a motorless embodiment of top 100 is shown to be identical to the motorized version except that motor support plate flange 3 has no motor. A nut 1600 has replaced gear 8.

Figure 17:
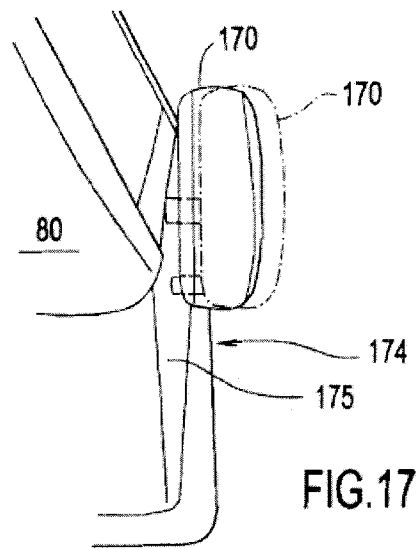
FIG. 17 is a side perspective view showing how embodiment number one requires an extension rearward of the spare tire assembly shown in dots.

Referring next to FIG. 17, the spare tire 170 is shown in solid lines in the factory standard position. In order to accommodate the top 1 shown in FIG. 1, the spare tire must be moved to the position shown by 170 in dots. The rear panel of the vehicle is labeled 175, and the bumper is labeled 174.

Figure 18:
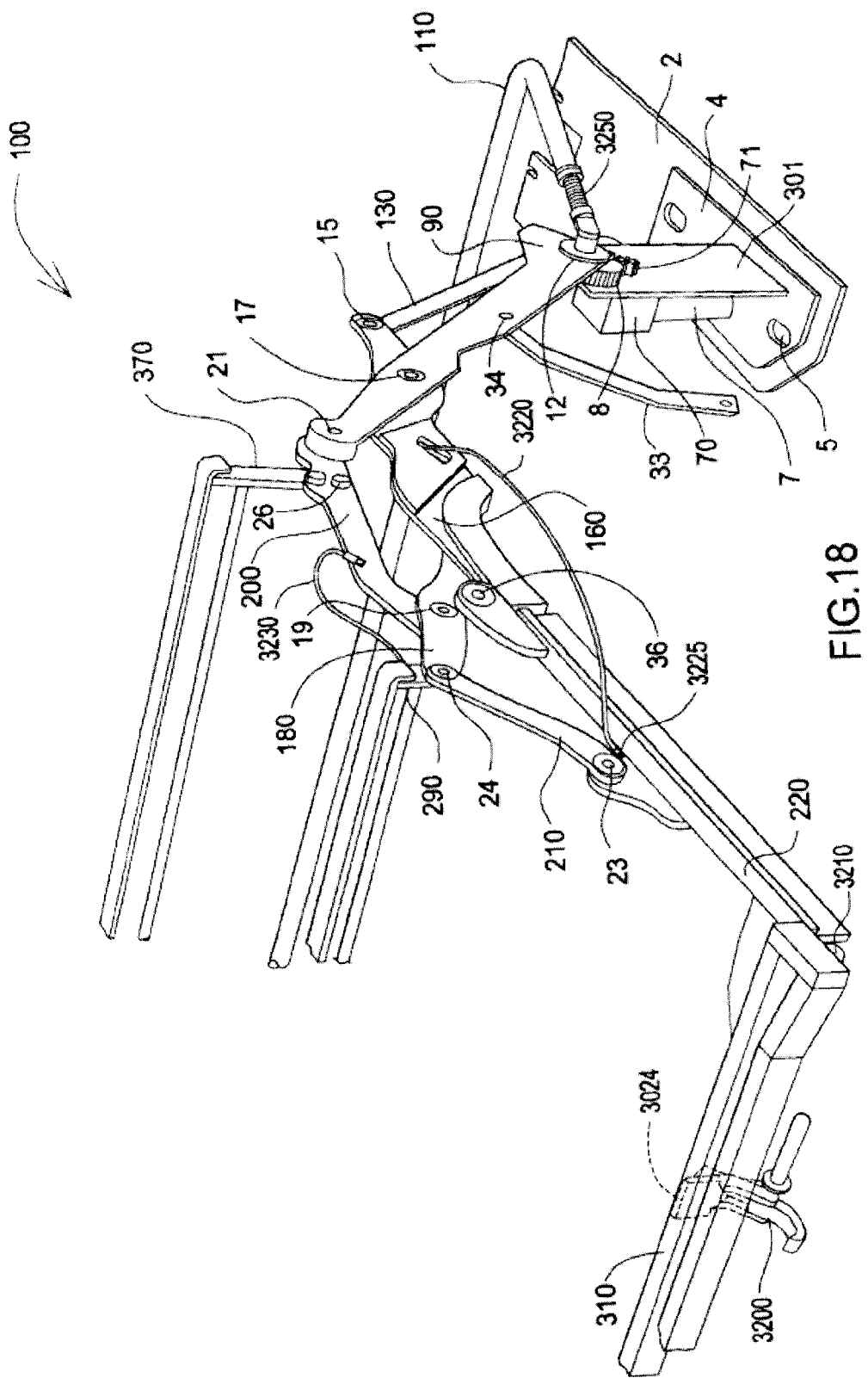
FIG. 18 is a top perspective view of the left side of the embodiment numbered 100 shown in FIG. 4.

Referring next to FIG. 18, features of the top are shown to the top 100 shown in FIG. 4. These features of the top include a rubber seal 3210 attached to the inside lower edge of the front bow 310. A heavy-duty clamp 3206 has been added. Tightening cable 3220 connects to the top 80 by means of a tunnel sewn into the inside of the top. In one alternative, the cable is replaced with a bungee. Cable 3220 pulls the top 80 tight against the linkage members 220, 160. When the top 100 is folded down, the cable 3230 helps prevent the top 80 from wearing against linkage members 200, 290, and 370. A bolt type bow base adjuster 3250 allows adjustment of the bow 110 against the canvas 80. The canvas 80 is one possible means for spanning the supports (linkage arms, etc.). Although canvas is a working solution for the spanning, various other materials, including interlocking substantially rigid panels and other cloth-like materials, may be used.

Figure 19:
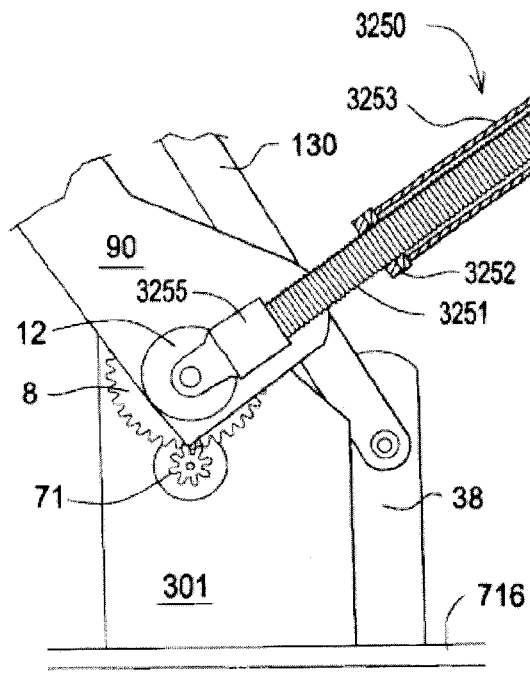
FIG. 19 is a partial cutaway view of the lower bow base with a bolt type adjuster.

Referring next to FIG. 19, rear bow adjuster 3255 connects to threaded rod 3251. A sealing gasket 3254 keeps moisture out of the hollow bow tubing 3253. A nut 3252 is connected to the tubing 3253. Turning nut 3252 moves tubing 3253 towards or away from canvas 80.

Figure 20:
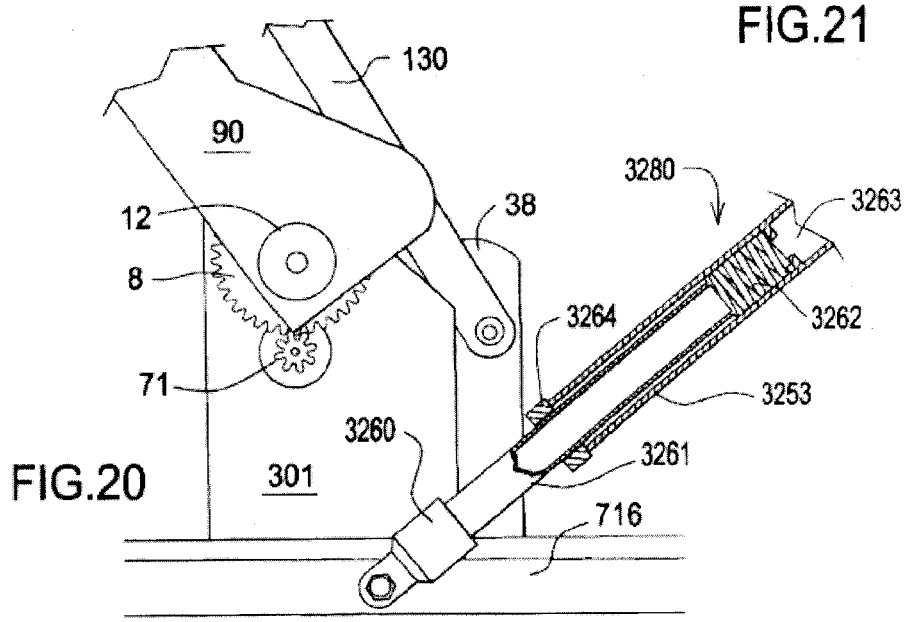
FIG. 20 is a partial cutaway view of the lower bow base with a spring type adjuster.

FIG. 20 shows the vehicle body ledge 716 supporting the anchor 3260. The bow assembly 3280 consists of an anchor 3260 supporting a rod 3261. The tubing 3253 extends over the rod 3261 and ends in a fixed collar 3264. Inside tubing 3253, a spring 3262 is compressed against a stop 3263 as the canvas 80 presses against the bow 110. Thus, assembly 3280 provides a self-adjusting tension mount for bow 110, when the bow is mounted to the vehicle.

Figure 21:
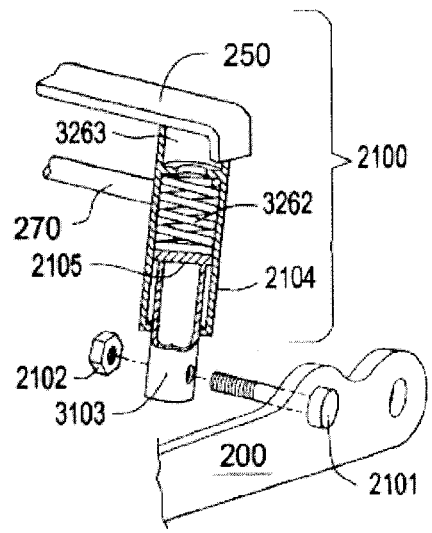
FIG. 21 is a partial cutaway view of the top bow base with a spring type adjuster.

Referring next to FIG. 21, a self-adjusting tension mount for bow 250 is labeled assembly 2100. Assembly 2100 consists of a bolt 2101 securing a rod 2103 to linkage 200 by means of a nut 2102. The rod 2103 has a solid end 2105 to compress spring 3262 against stop 3263 when the canvas 80 pushes against bow 250.

Referring next to FIG. 22, the view is taken from inside the vehicle looking out of the left window and seeing canvas 80. The canvas 80 has a tunnel 3290 sewn into the inside left roof line. The cable 3220 is threaded through the tunnel 3290 and anchored at 3225 in tab 2310 of linkage 220 and anchor 3226 at K-arm 160. The cable 3220 tightens the canvas inbound as shown when the top 100 is closed. The cable 3230 keeps the canvas 80 from pinching between linkages 200, 180 in the open position. Anchor 3227 fastens to linkage 200, and anchor 3228 fastens to linkage 290.

Referring next to FIG. 23, the seal 3210 is preferably a rubber gasket glued to the front bow 310 of top 100. The seal 3210 stops air from entering above the windshield top frame 4010, seen in FIG. 24.

Referring next to FIGS. 24-29, the clamp 3200 consists of an anchor 3201 having mounting holes 3202 to enable screws 3203 to secure it in cavity 3204 along the windshield ceiling 3205. Ledge 3206 captures hook 3207 in the locked mode shown in FIGS. 26 and 29. Base 3024 is secured to front bow 310. It has a pivot mount 3023 for handle arm 3022. Handle H is designed to be grabbed by the user's hand.

The handle arm 3022 has a pivot mount 3021 for the hook arm 3020.

Figure 24:
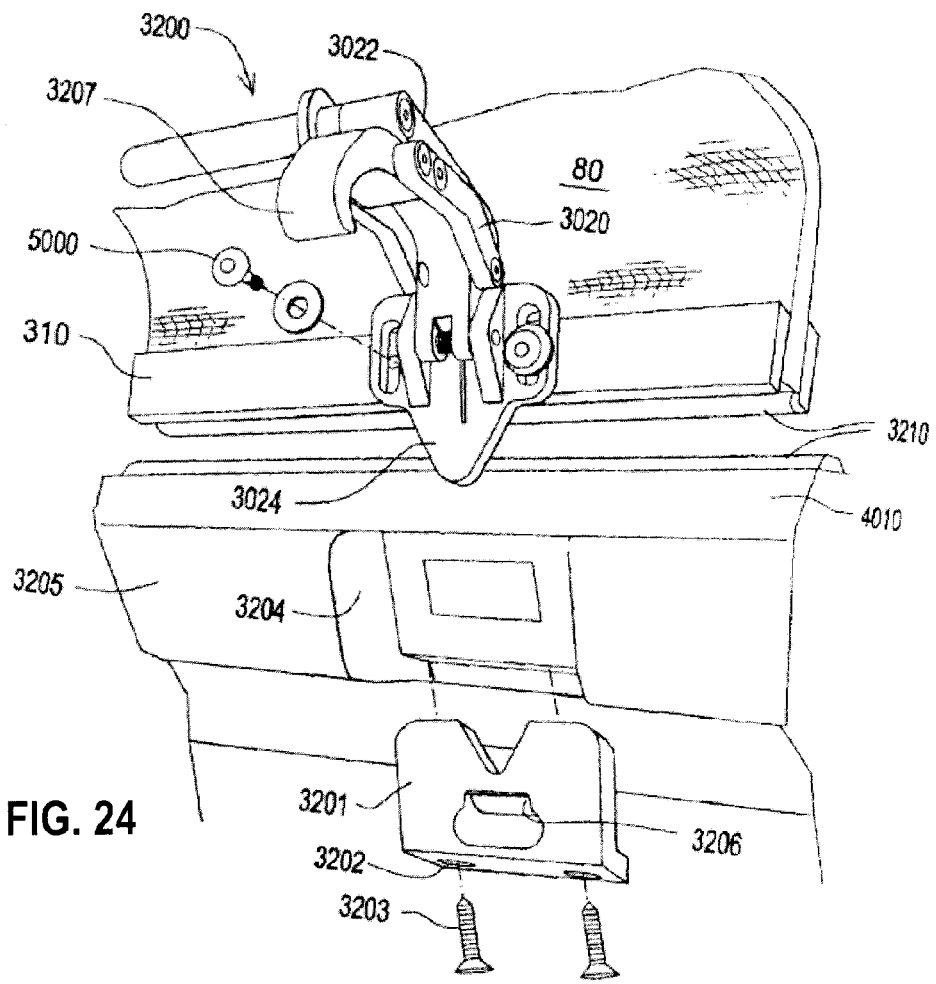
FIG. 24 is a close-up view of the heavy duty windshield clamp.

FIG. 24 shows the base 3024 having a fastener bolt or rivet 5000 to front bow 310.

Figure 25:
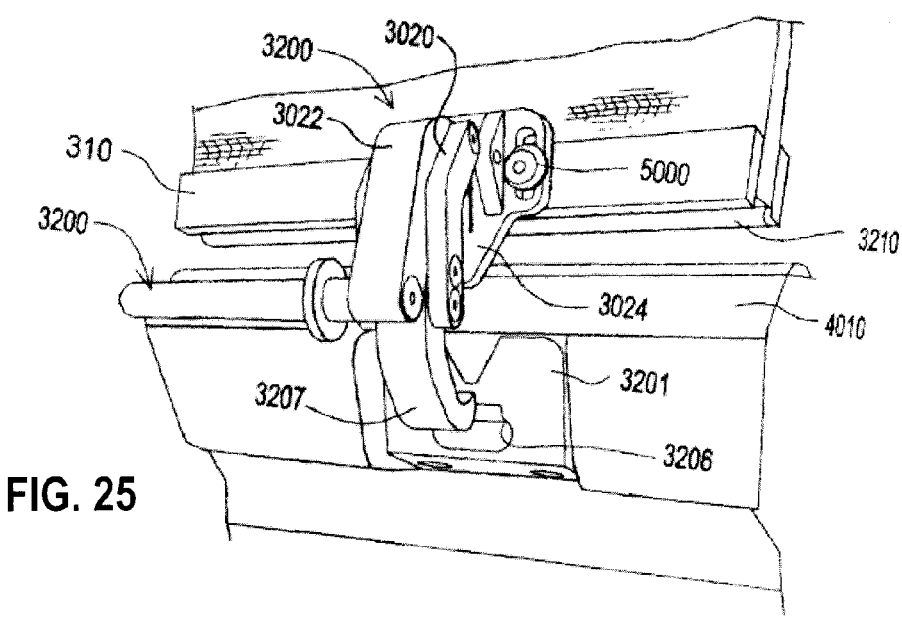
FIG. 25 is the same view as FIG. 24 with the clamp about to engage the windshield anchor.

FIG. 25 shows the handle H lowered so as to almost engage hook 3207 with ledge 3206.

Figure 26:
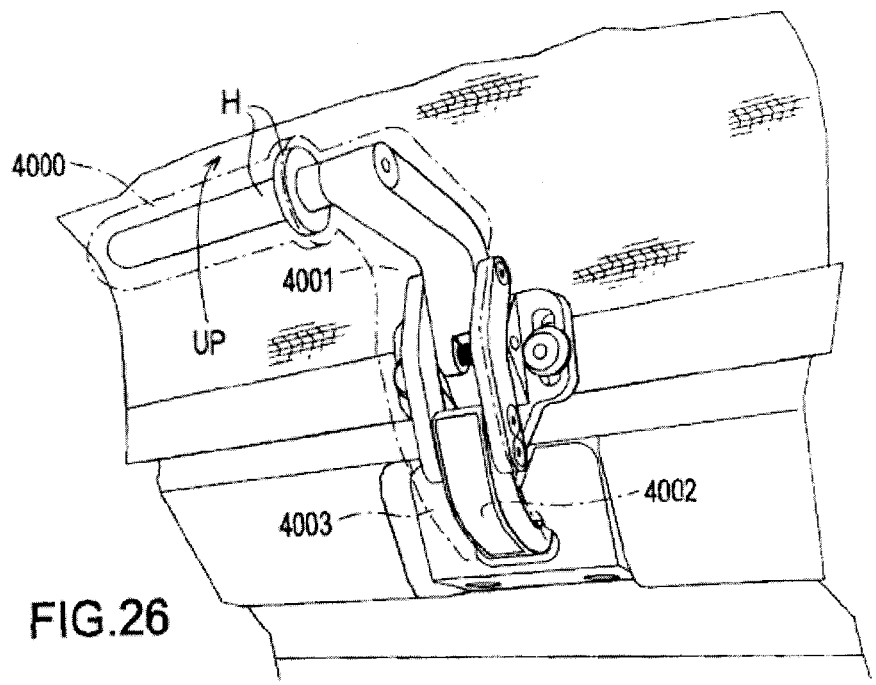
FIG. 26 is the same view as FIG. 25 with the locking handle pushed upward to the lock position.

FIG. 26 shows the hook 3207 engaged with ledge 3206. The user is moving handle H up as shown by arrow UP, thereby locking the clamp. The soft protective cover 4000 is shown in dotted lines. It has a hollow core to fit over the handle H. It has a flap section 4001 which bends with the varying positions of the hook 3207. The back of hook 3207 has a hook and loop member 4002 which removably attaches to hook and loop member 4003 fitted to the forward side of flap section 4001.

Figure 27:
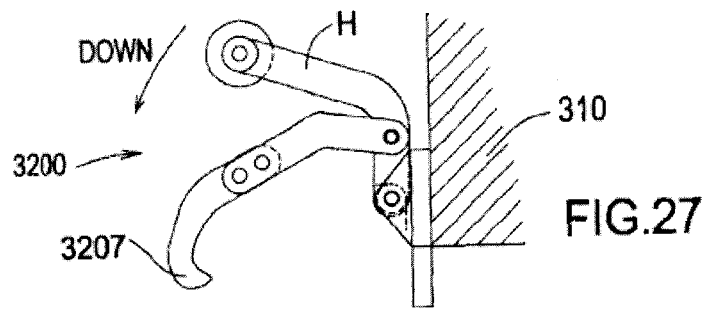
FIG. 27 is a plan view from inside the vehicle looking at the right side to view the clamp in the unattended mode.

FIG. 27 shows the clamp 3200 totally disengaged as if ready for the top to be folded down.

Figure 28:
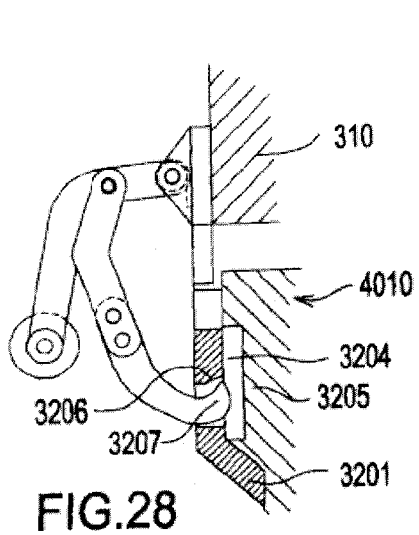
FIG. 28 is the same view as FIG. 27 with the clamp engaged with the windshield anchor.

In FIG. 28, the hook 3207 is engaged with the ledge 3206, and the handle H is down, shown by arrow DOWN, so the front bow 310 is not secured against the windshield top frame 4010.

Figure 29:
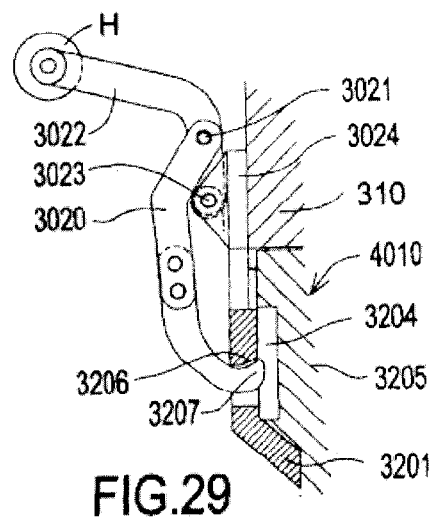
FIG. 29 is the same view as FIG. 28 with the clamp in the locked mode.

In FIG. 29, the top 100 front bow 310 is locked against the windshield top frame 4010.

Figure 30:
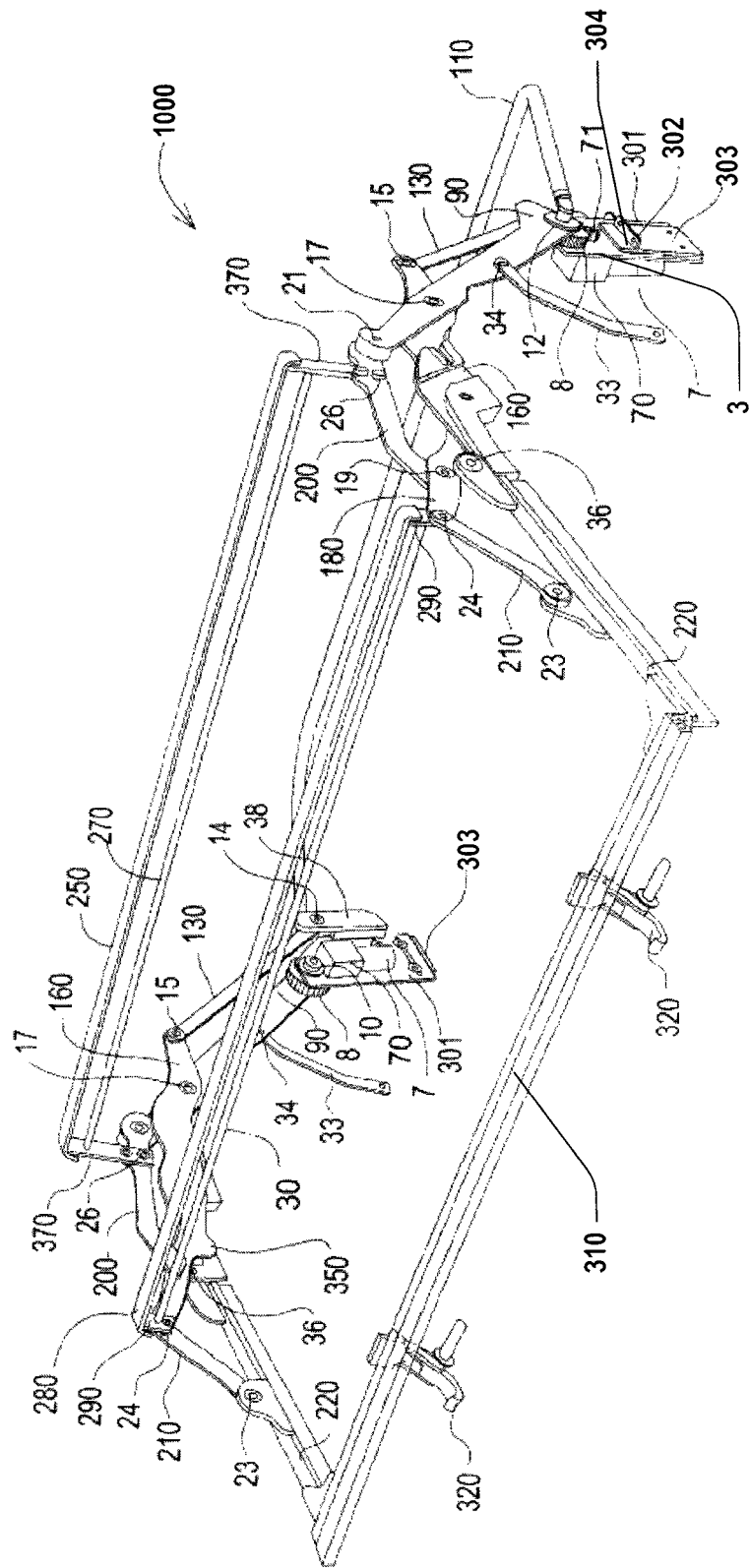
FIG. 30 is a perspective view of one embodiment of a retractable top.
Figure 31:
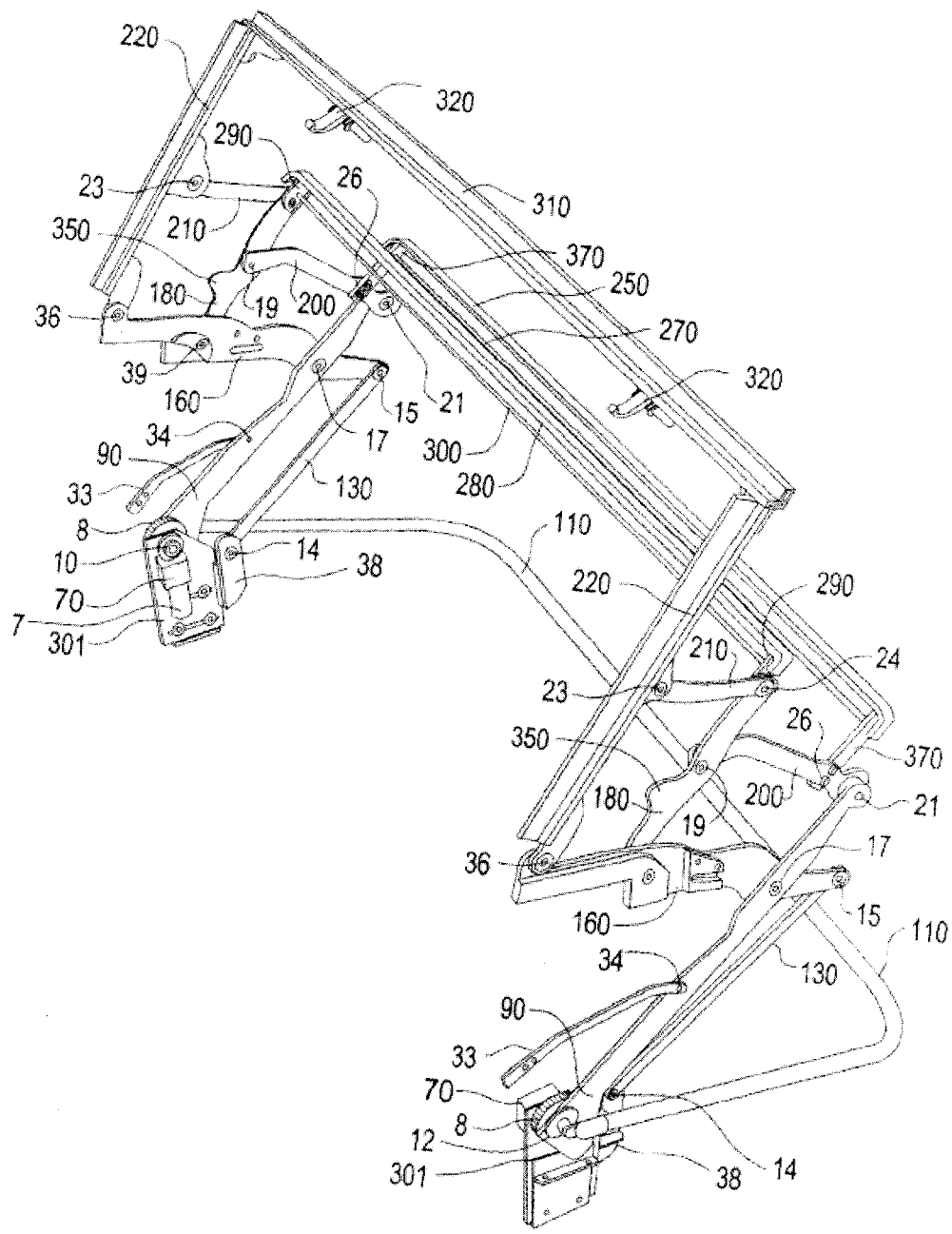
FIG. 31 is a perspective view of the retractable top of FIG. 30 showing the retractable top deployed between a fully deployed and a retracted position.

Referring to FIGS. 30 and 31, another embodiment retractable top 1000 is seen to have a pair of side mount support plates 301 preferably designed to mount on the side body panel and structural support in the rear compartment of various Jeeps®. A pair of vertical linkage support brackets 3 has a side mount support plate welded or otherwise attached to each of them. These vertical linkage support brackets 3 are one example of a means for attaching the retractable top to the rear compartment. Bolts (not shown) mounted through mounting points 302 and 303 secure the support plates 301 to the vehicle. A parallel vertical trailing arm motor plate 38 supports pivot mount 14. As can be seen in FIG. 31, side mount support plate 301 has holes 302 and 303 for mounting. Support plate 301 includes horizontal plate 304 which contains holes 302. Since support plates 301 are bolted in two planes of motion, additional support and stability is given to the retractable top 1000.

Figure 41:
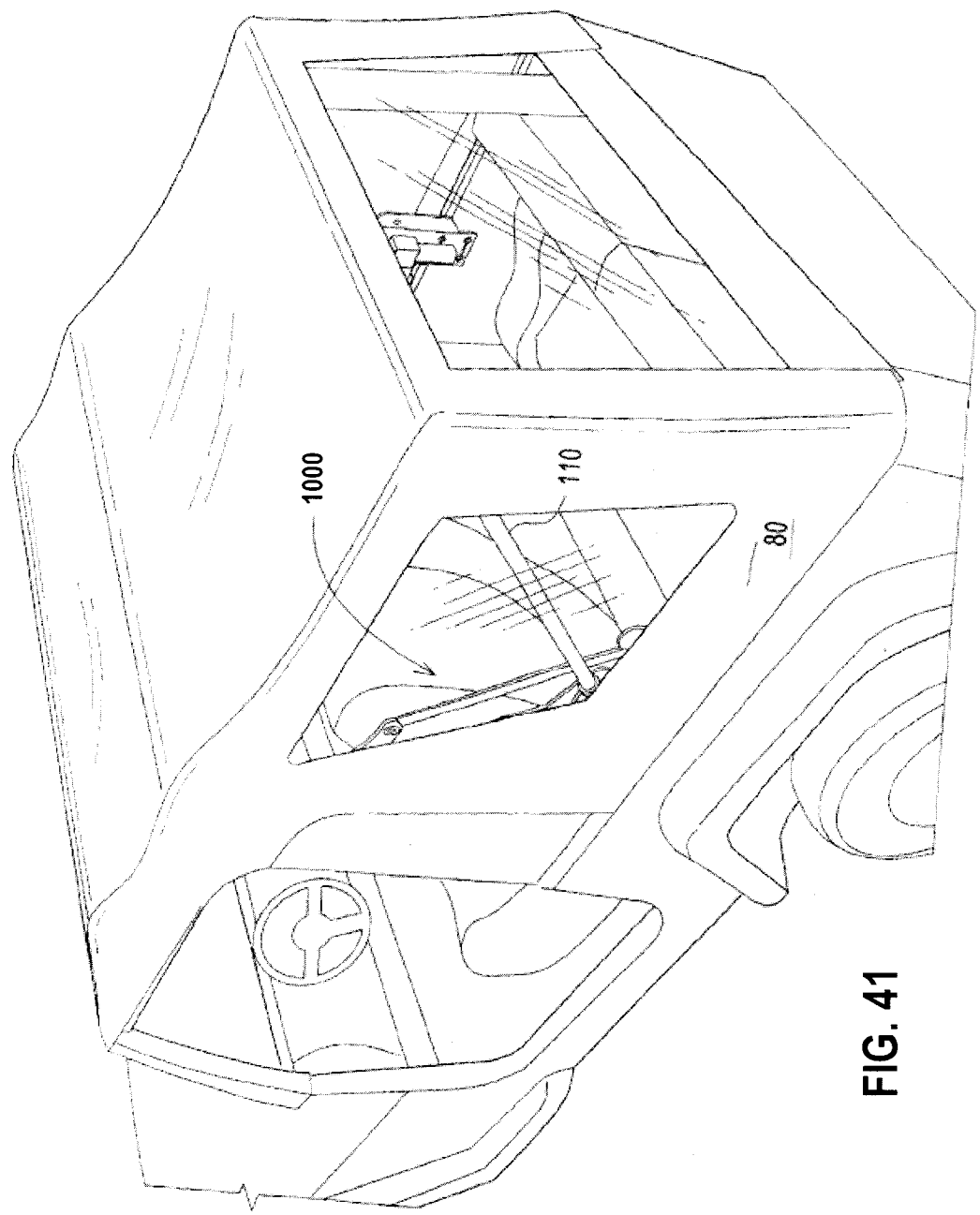
FIG. 41 is a perspective view of the retractable top of FIG. 30 installed in a vehicle with a cover on the retractable top.

A two-directional motor 7 has a drive gear 71 supported by the support bracket 3, wherein gear 71 drives a linkage gear 8, which is fastened to the first linkage arm 90. The center of linkage gear 8 has an axle 10 which supports first linkage arm 90 in a pivot mount so that first linkage arm 9 can be moved from the fully deployed position shown to the retracted position shown in FIG. 32. A rear bow 110 has a pivot mount 12 so as to fold parallel to the first linkage arm 90 in the retracted position shown in FIG. 3. However, a stop (not shown) stops the bow 110 from moving more than angle a, thereby causing bow 110 to lift and support the canvas top 80 as shown in FIG. 41. Canvas top 80 can be any flexible material. The canvas top is one example of a means for spanning as described above.

A second linkage arm 130 has a pivot mount 14 on the trailing arm motor plate 38. The upper end of second linkage arm 130 has a pivot mount 15 to K-arm 160, which is also pivot mounted at 17 to first linkage arm 90, and has K-arm pistol grip 36 to linkage arm 180. A second bow arm 180 has a pivot mount 19 to third bow arm 200 which has a rear end pivot mounted at 21 to the top of the first linkage arm 90. A first bow link 210 has a pivot mount at a forward end to frame 220 at 23 and a pivot mount 24 to fourth linkage arm 18.

A third bow 250, supported by brackets 370, has a fixed mount bracket 26 to the third bow arm 200. A support rod 270 adds structural rigidity between the two brackets 26. A front bow 280 has a second bow bracket 290 mounted to pivot mount 24. A support rod 30 adds structural rigidity between the two brackets 290. The front bow 310 has windshield clamps 320. During transition, the K-arm 160 continues to move essentially parallel to the ground.

In FIG. 30, the offset steel brackets 33 can be seen extending forward as they are pivot mounted at 34 to first linkage arm 90.

Figure 32:
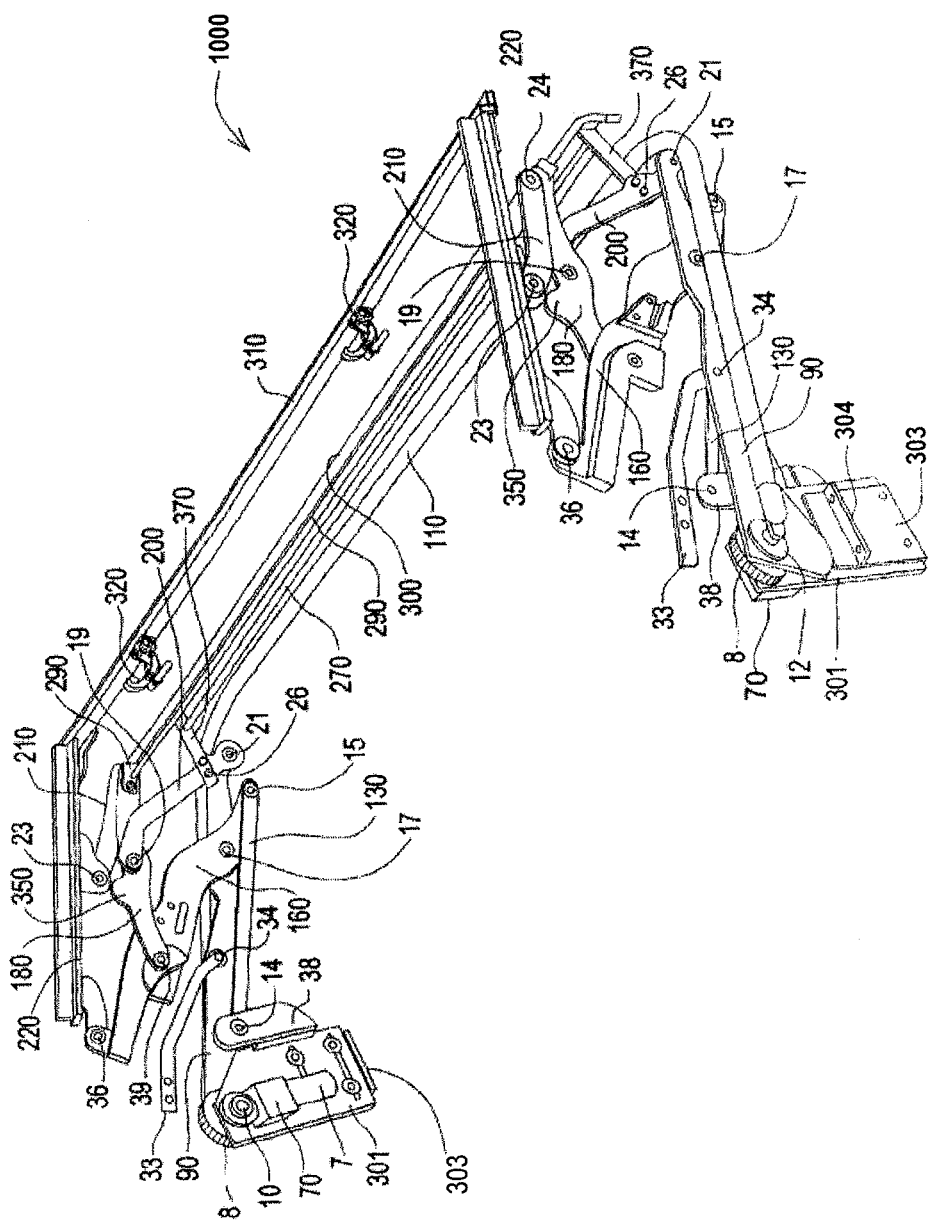
FIG. 32 is a perspective view of the retractable top of FIG. 30 showing the retractable top in the refracted position.

In FIG. 31, the stop 350 is shown midway to flange 36, which prevents the motor 7 from over deploying the top 1000. The motor 7 is a free-wheel type to allow manual deployment of the top 1000, as well as to allow a strong wind to retract the top 1000 when the driver turns the motor 7 off. K-arm control spacer 39 supports linkage arm 18. In FIG. 32, the top 1000 is shown in a further retracted position as compared to FIG. 31 showing how the joints of the top 1000 move in unison.

As described in the previous embodiments, (1, 100) the top 1000 can be completely retracted without changing the spare tire assembly as shown in FIG. 17. Top 1 requires spare tire 170 to be moved to the position shown by dotted lines. Like top 100, top 1000 keeps the spare tire 170 in a factory standard mount shown by solid lines. The rear of the vehicle 174 is numbered 175.

Figure 33:
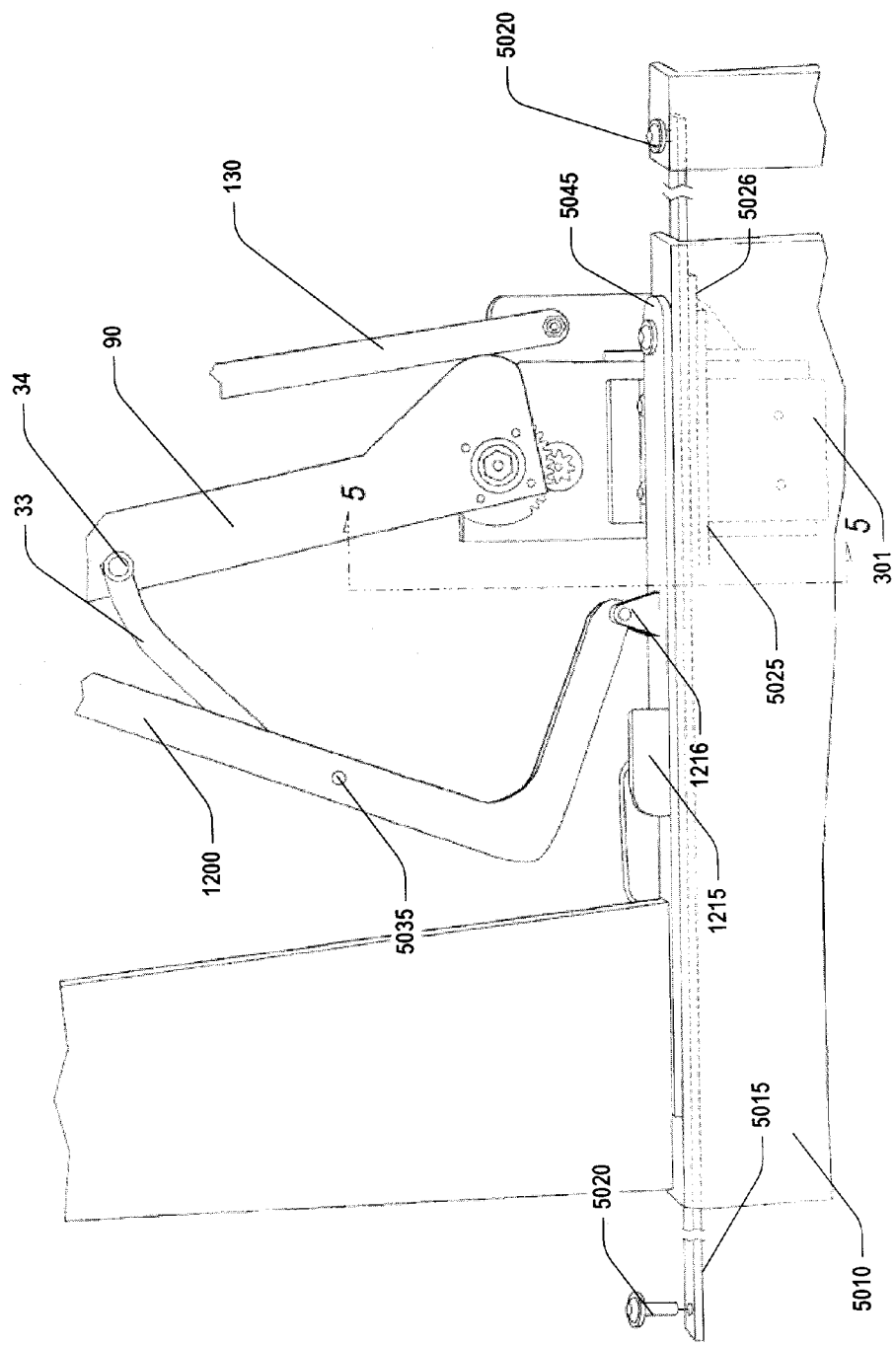
FIG. 33 is a detail view of the attachment area of the retractable top of FIG. 30.

FIG. 33 shows a detail view of one example of how side attachment plate 301 may attach to a vehicle side 5010. This side attachment plate 301 is an example of a means for attaching the top to the rear compartment. Under the lip of vehicle side 5010, a horizontal bottom bar 5015 is bolted to the length of the vehicle side 5015 with bolts 5020. Shims 5025 may be included to distribute the pressure of the attached side attachment plate 301 at the point of attachment and arrange the side attachment plate 301 at the proper height. Further, bottom support bar flange 5026 is configured to provide an attachment point for horizontal plate 304. The side attachment plate 301 extends up to linkage arm 90. Linkage arm 90 connects to offset steel bracket 33 and linkage 5030.

Figure 34:
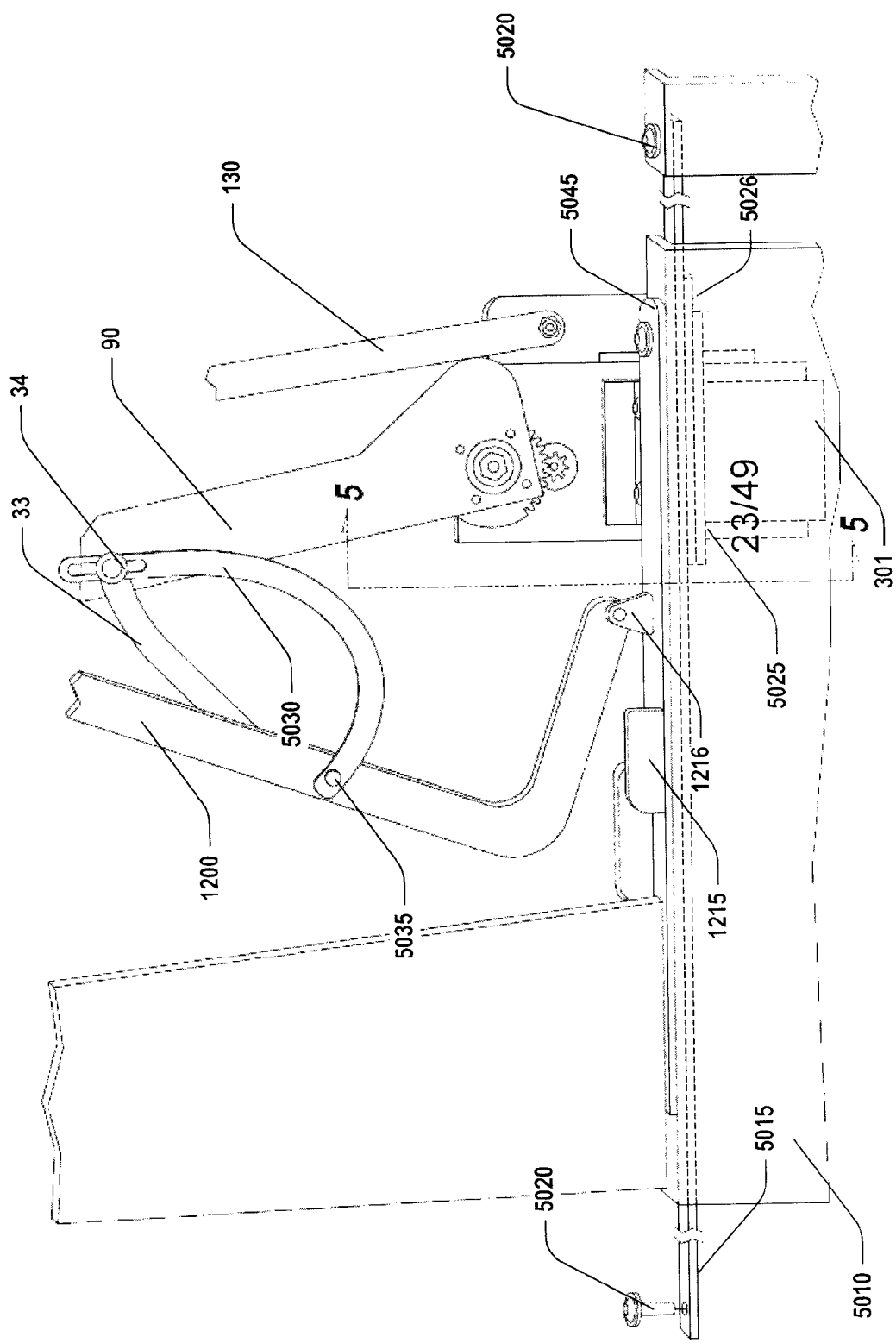
FIG. 34 is a detail view of an alternative embodiment of the attachment area.

FIG. 34 shows an alternative embodiment that includes linkage 5030. Linkage 5030 is configured to allow for a smooth folding process such that, during folding, L-arm 1200 moves smoothly. Linkage 5030 connects to linkage arm 90 at pivot 34 and to folding L-arm 1200 at pivot 5035. At pivot 34, the connection made by linkage 5025 is a sliding guide. In some alternatives, a protective cover or shroud is included to protect passengers from catching items and skin in the linkages. This protective cover may be made of plastic or other material.

Figure 35:
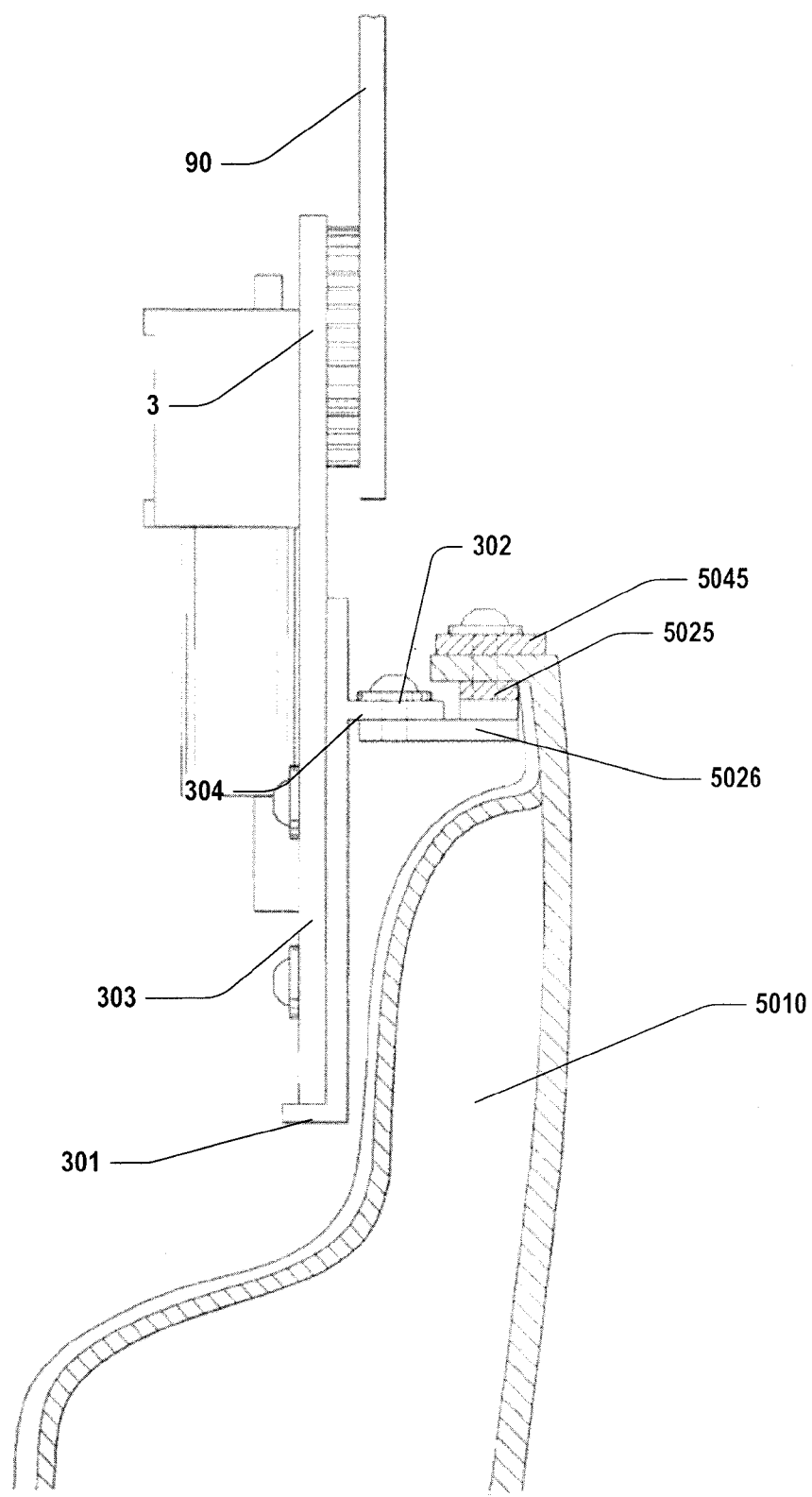
FIG. 35 is a detail view along the cross section 5 shown in FIG. 33.

FIG. 35 shows a cross section taken along the cut line shown in FIG. 4. This cross section shows how the top 1000 is attached to vehicle side 5010. As is clear from FIG. 35, bottom support bar flange 5026 extends away from the vehicle side 5010 toward the interior of the vehicle to allow for an attachment point for horizontal plate 301. Shims 5025 allow for the horizontal plate 301 to be mounted at the proper height so that the vehicle side does not interfere with the mounting. Side attachment plate 301 is attached using bolts to bottom support bar flange 5026 through holes 302. Vertical linkage support brackets 3 are connected to horizontal plate 301 using bolts through holes 303.

FIG. 36 shows horizontal bottom bar 5015 and bottom support bar flange 5026 from a top view. FIG. 37 shows the arrangement of horizontal bottom bar 5015 and bottom support bar flange 5026 from a top view and includes shims 5025. FIG. 38 is a cross section taken according to the cut in FIG. 37 and shows the arrangement of the horizontal bottom bar 5015, bottom support bar flange 5026, and shims 5025 from a profile view.

Figure 39:
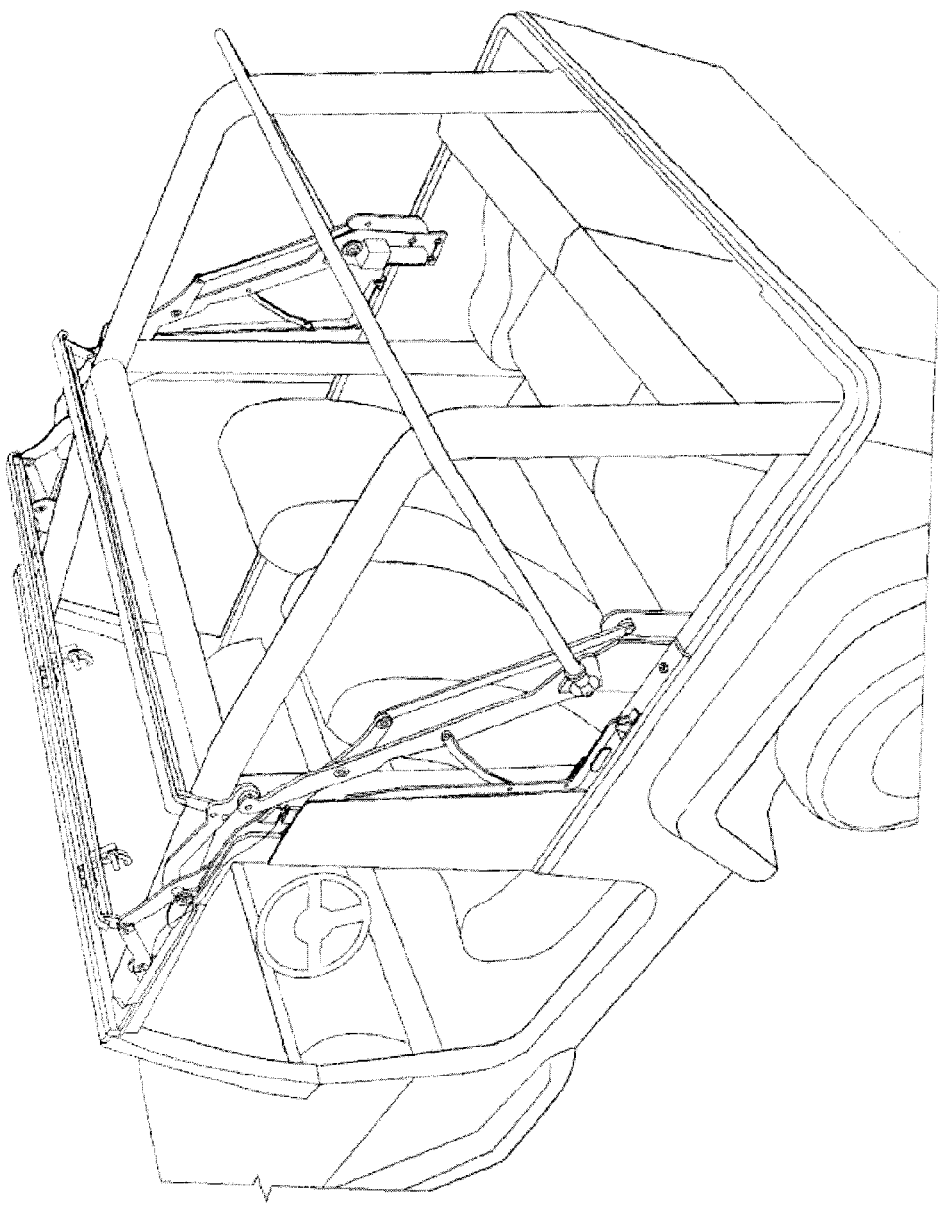
FIG. 39 is a perspective view of the retractable top of FIG. 30 installed in a vehicle.

FIG. 39 shows the top 1000 installed without a canvas cover. As is clear, the top 1000 is side mounted (also may be referred to as quarter panel mounted) as opposed to as in FIG. 7 where the top is mounted on the wheel wells. The side mounting allows the top to be configured for usage in vehicles such as the one shown in FIG. 39, where the wheel wells are not flat or where the floor or other flat surface for mounting is not available. In FIG. 39, the floor or wheel well is not available for mounting and, therefore, the side mounting configuration is needed.

Figure 40:
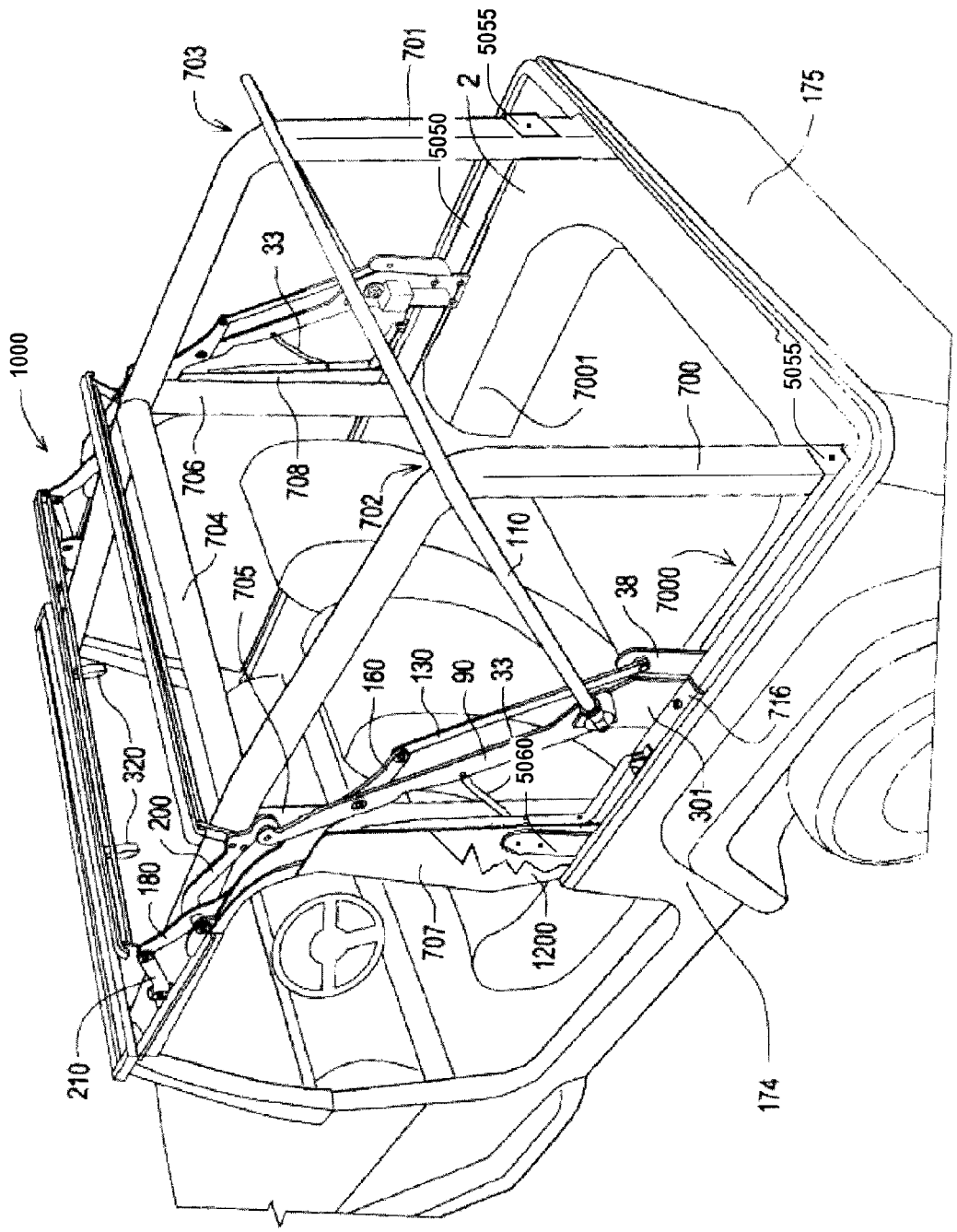
FIG. 40 is a perspective view of the retractable top of FIG. 30 installed in a vehicle.
Figure 62:
FIG. 62 is a top view of the roll bar mount support.
Figure 63:
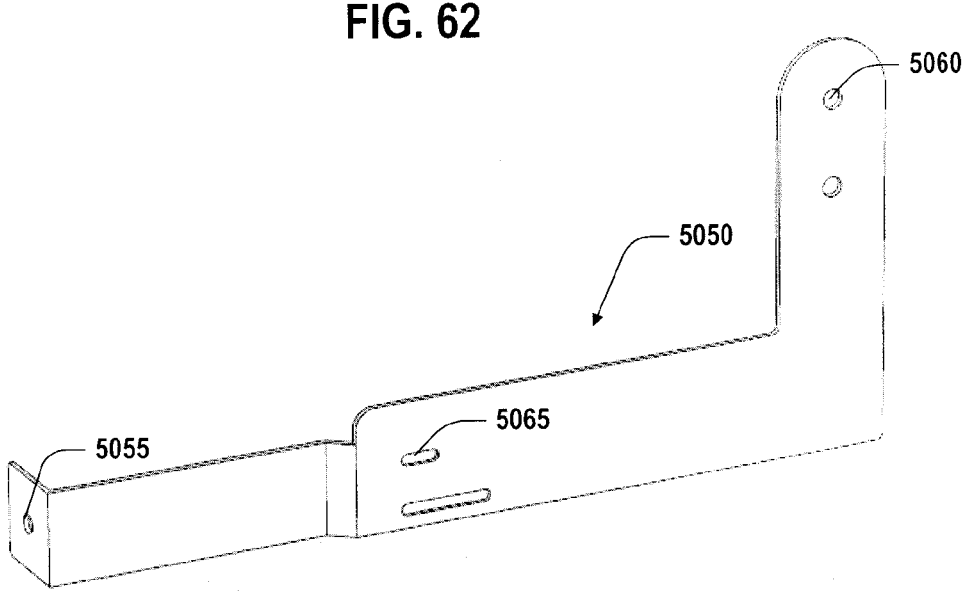
FIG. 63 is a perspective view of the roll bar mount support.

As shown in FIG. 40, the side mount may be used in any vehicle, not just those where floor or wheel well access is unavailable. FIG. 40 shares many similar parts as described in relation to FIG. 7, and like numbers represent similar parts. In addition, roll cage bracket mount 5050 is shown. Roll cage bracket mount 5050 includes two cage bar attachment points, rear attachment point 5055, and front attachment point 5060. Additional detail related to roll cage bracket mount 5050 is shown below in relation to FIGS. 62 and 63. Roll cage bracket mount 5050 can eliminate the need for side attachment to the vehicle.

Referring next to FIG. 40, the vehicle 174 has a rear tailgate 175 shown without the spare tire assembly. The top 1000 is shown fully deployed without the canvas. Instead of the top 1000 being attached to wheel wells 7000 and 7001, the top 1000 is attached to the side of vehicle 174 using the roll cage bracket mount 5050 and the vehicle 174 side. The roll bars 700, 701 project nearly vertically from the rear of the rear compartment. They form an approximate right angle at 702, 703 before extending forward to a cross bar 704. Vertical supports 705, 706 are used to support the top's left door bracket 707 and right door bracket 708.

Figure 42:
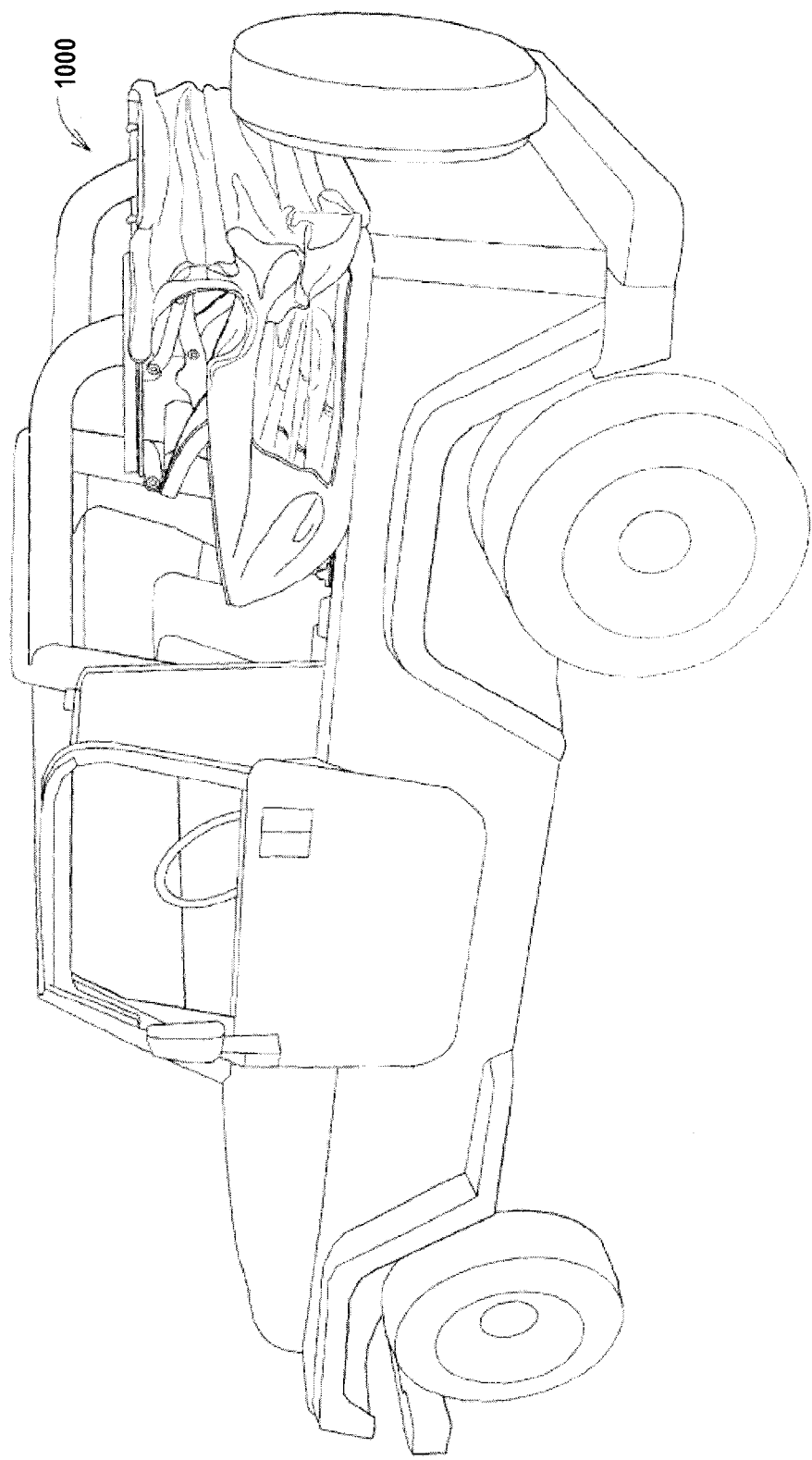
FIG. 42 is a perspective view of the retractable top of FIG. 30 installed in a vehicle with a cover on the retractable top showing the top retracted.
Figure 43:
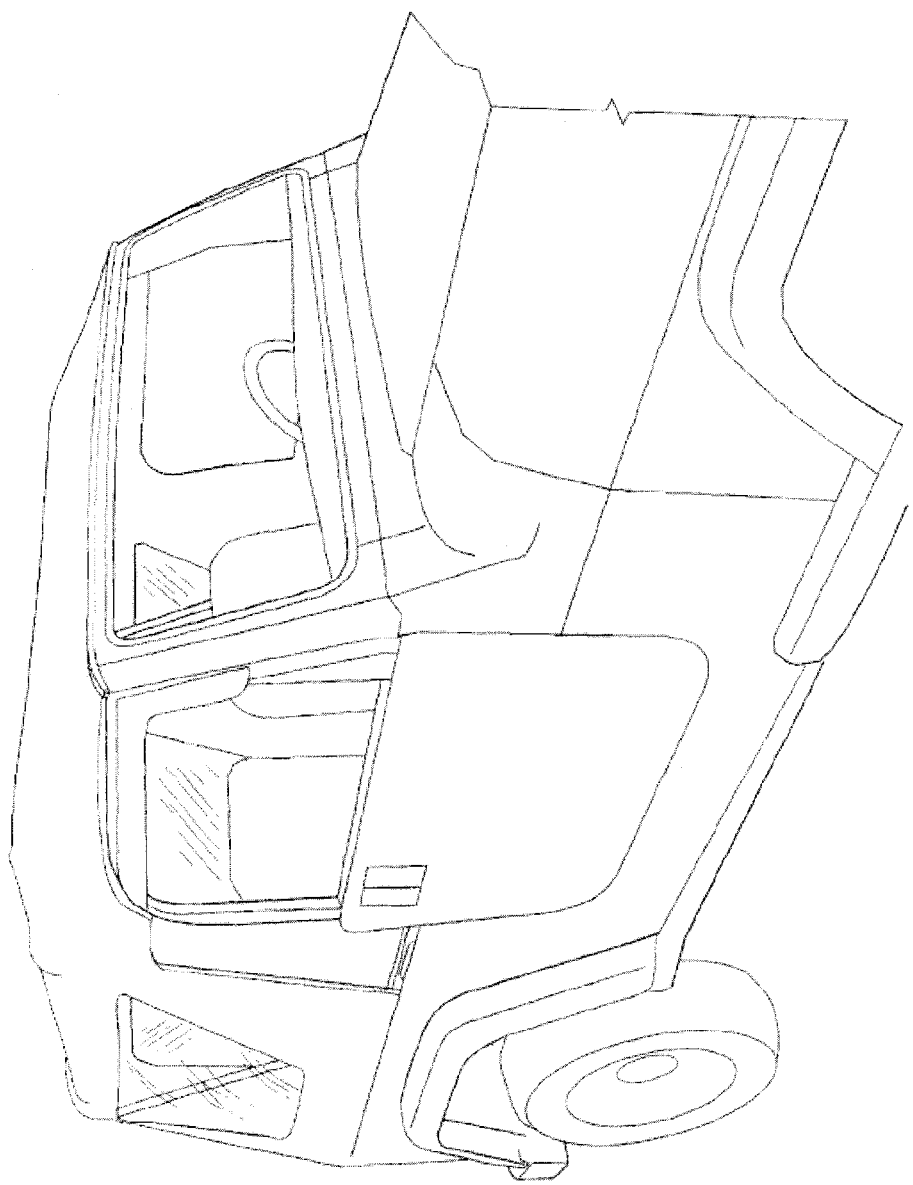
FIG. 43 is a perspective view of the retractable top of FIG. 30 installed in a vehicle with a cover on the retractable top.
Figure 44:
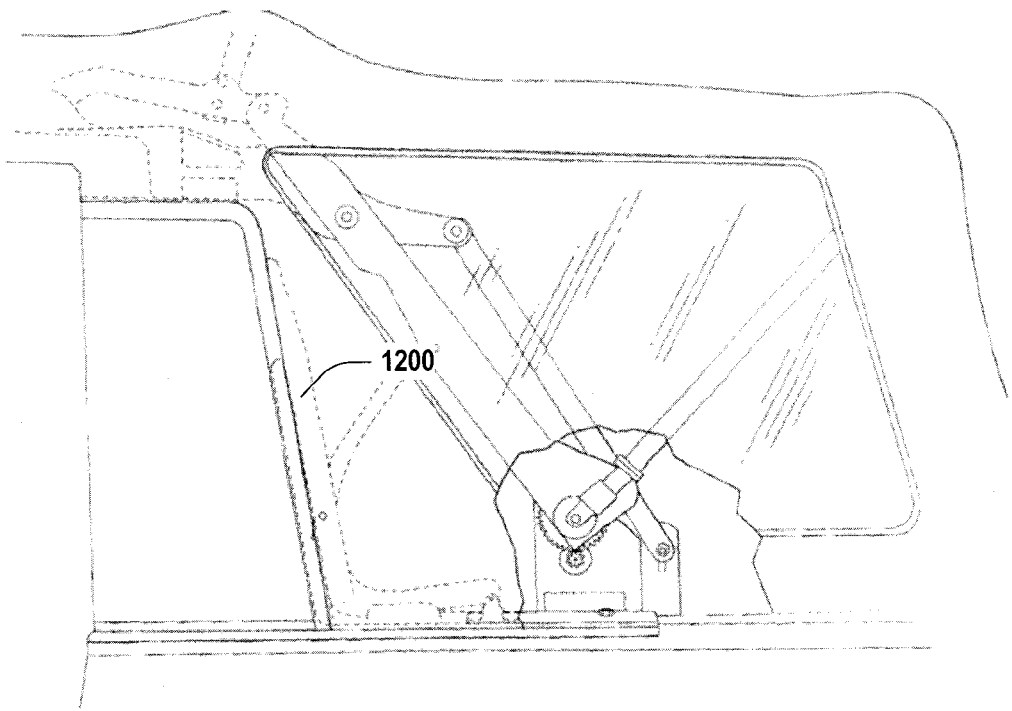
FIG. 44 is a side plan view of the door bracket closure assembly in the deployed mode.
Figure 45:
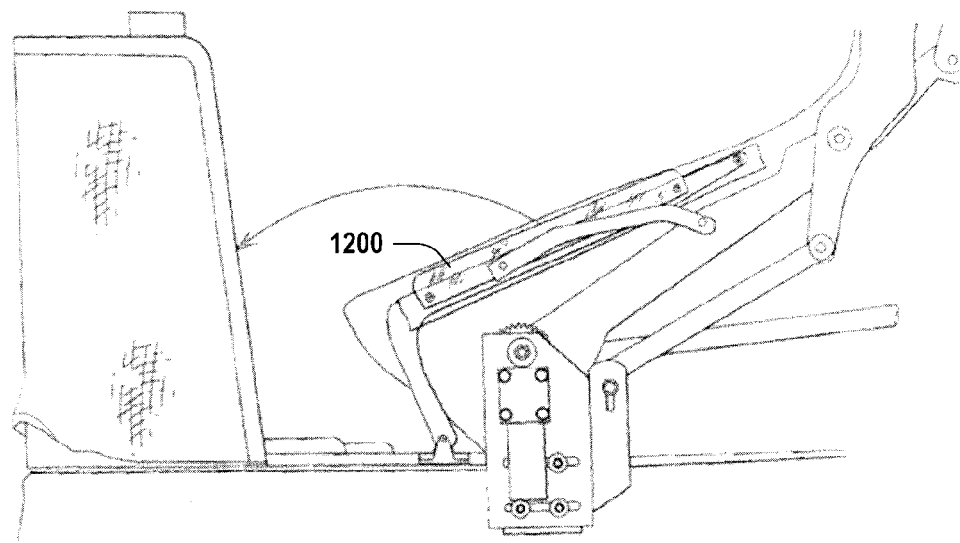
FIG. 45 is the same view as FIG. 44 with the assembly in a partially retracted mode.

FIGS. 41, 42, and 43 show perspective views of the top 1000: a rear perspective, a front perspective, and with the top refracted. FIGS. 44 and 45 further show detailed views of the arrangement of the L-arm 1200 and its position in retracted and up positions. FIGS. 44 and 45 generally correspond to FIGS. 11 and 12.

Figure 46:
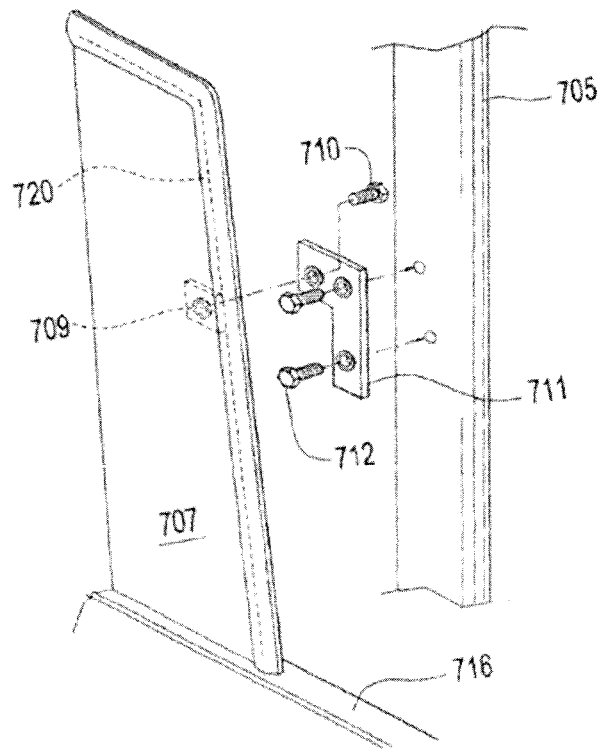
FIG. 46 is an exploded view of the door bracket assembly.

In FIG. 46, the left door bracket 707 is seen to have a side plate roll bar spacer 709 shown in dots to which a bolt 710 is fastened through roll bar mount bracket 711. Roll bar mount bracket 711 is attached to the vertical support 705 with screws 712. The base of left door bracket 707 may have bolts (not shown) fastened to the vehicle body ledge 716. Brackets 707, 708 are preferably made of aluminum and can have mounting flanges readily attached thereto. A rubber gasket 720 seals the air space to the L-arm 1200. The L-arm 1200 is configured to function in conjunction with side panel outer side panel outer guide 1217, side panel inner guide 1215 and sealing bracket base bar 5045 to support and position top 1000 when it is in an up position.

Figure 47:
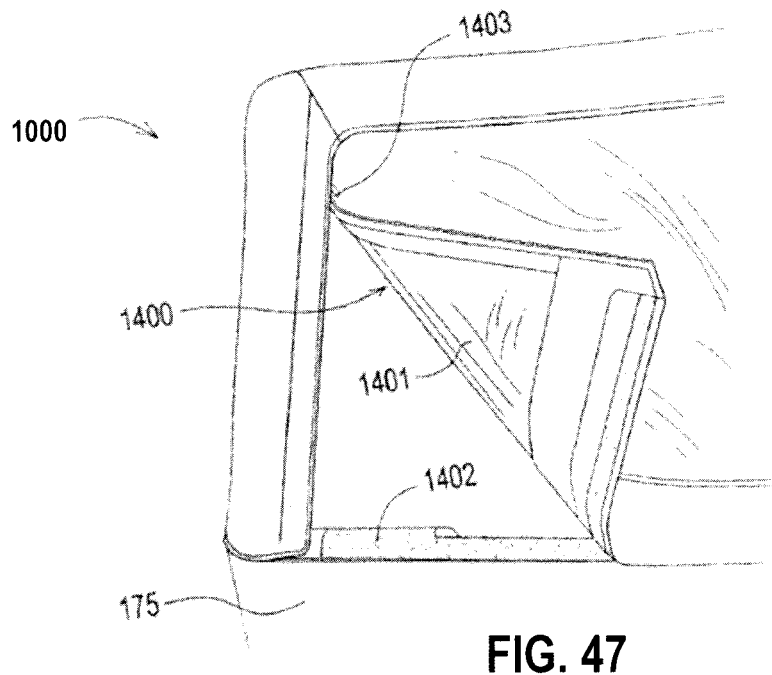
FIG. 47 is a rear perspective view of the removable rear window.

Referring next to FIG. 47, the top 1000 has a removable rear window 1400. The removable panel 1401 is secured by a zipper 1403 and a hook and loop seam 1402.

Figure 48:
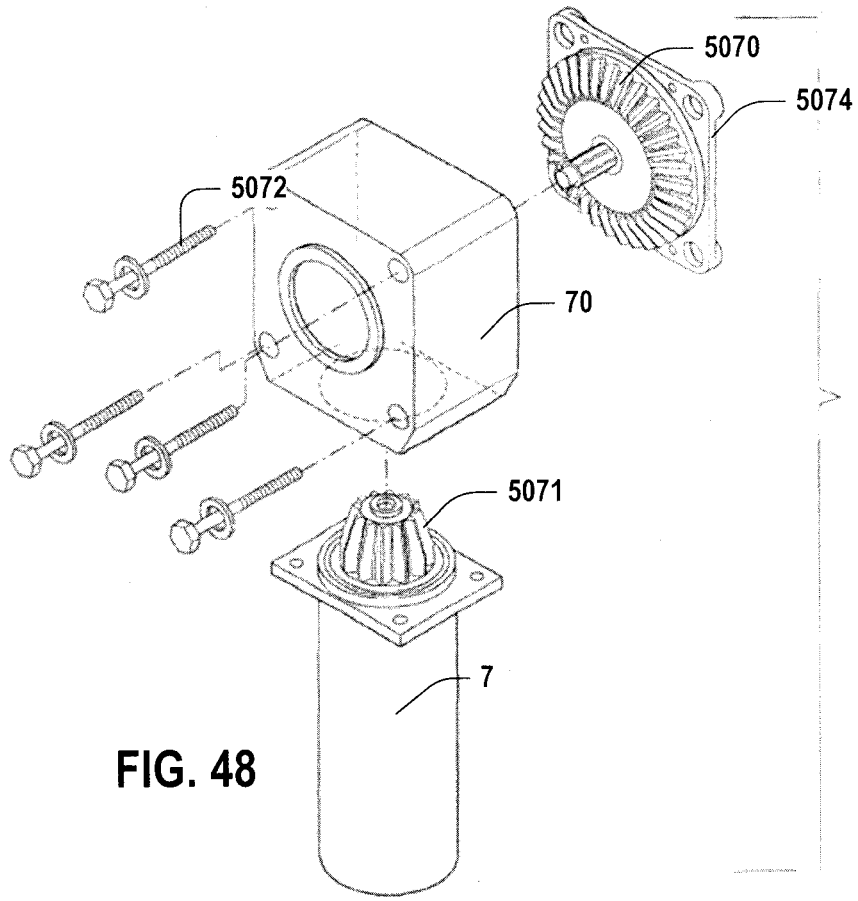
FIG. 48 is an exploded view of a gearing and motor assembly.

FIG. 48 shows the gear arrangement for a motorized version of top 1000. Top 1000 may be configured to be manually raised and lowered, such as shown in FIG. 16 in relation to previous embodiments. As shown in the embodiments depicted, top 1000 may include a motor 7. Attached to motor 7 is bevel gear 5071 which is configured to interface with bevel gear 5070. A variety of gearing may alternatively be used including worm gears, etc. Motor 7 and bevel gear 5071 are mounted into gear box 70. Gear plate 5074, which includes bevel gear 5070, is also mounted into gear box 70 using bolts 5072.

Figure 49:
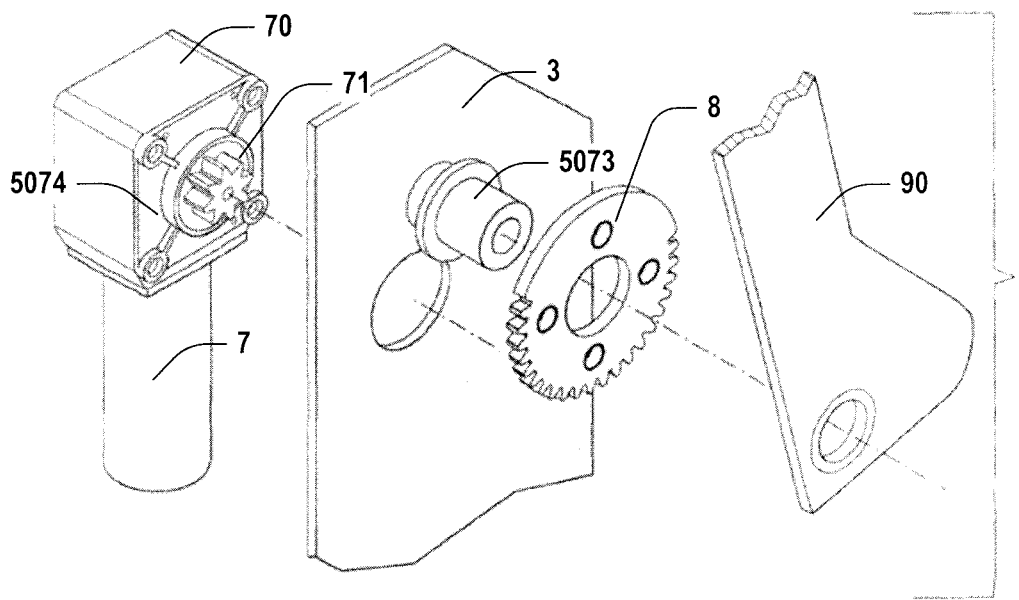
FIG. 49 is an exploded view of a gearing and motor assembly and connection to a lever arm.

FIG. 49 shows the arrangement of gear box 70 and motor 7 with axle 5073 and linkage arm 90. Gear 71 is interconnected with gear 5070 and mounted in gear plate 5074. Gear 71 is oriented in motor support plate flange 3 such that it interfaces with gear 8. Gear 8 is mounted on axle 5073 and turns in response to the movement of gear 71 causing top 1000 (or when implemented in other embodiments, top 1 or top 100) to extend or retract. Gear 8 is bolted to linkage arm 90 such that, when it pivots, linkage arm 90 similarly pivots.

Figure 50:
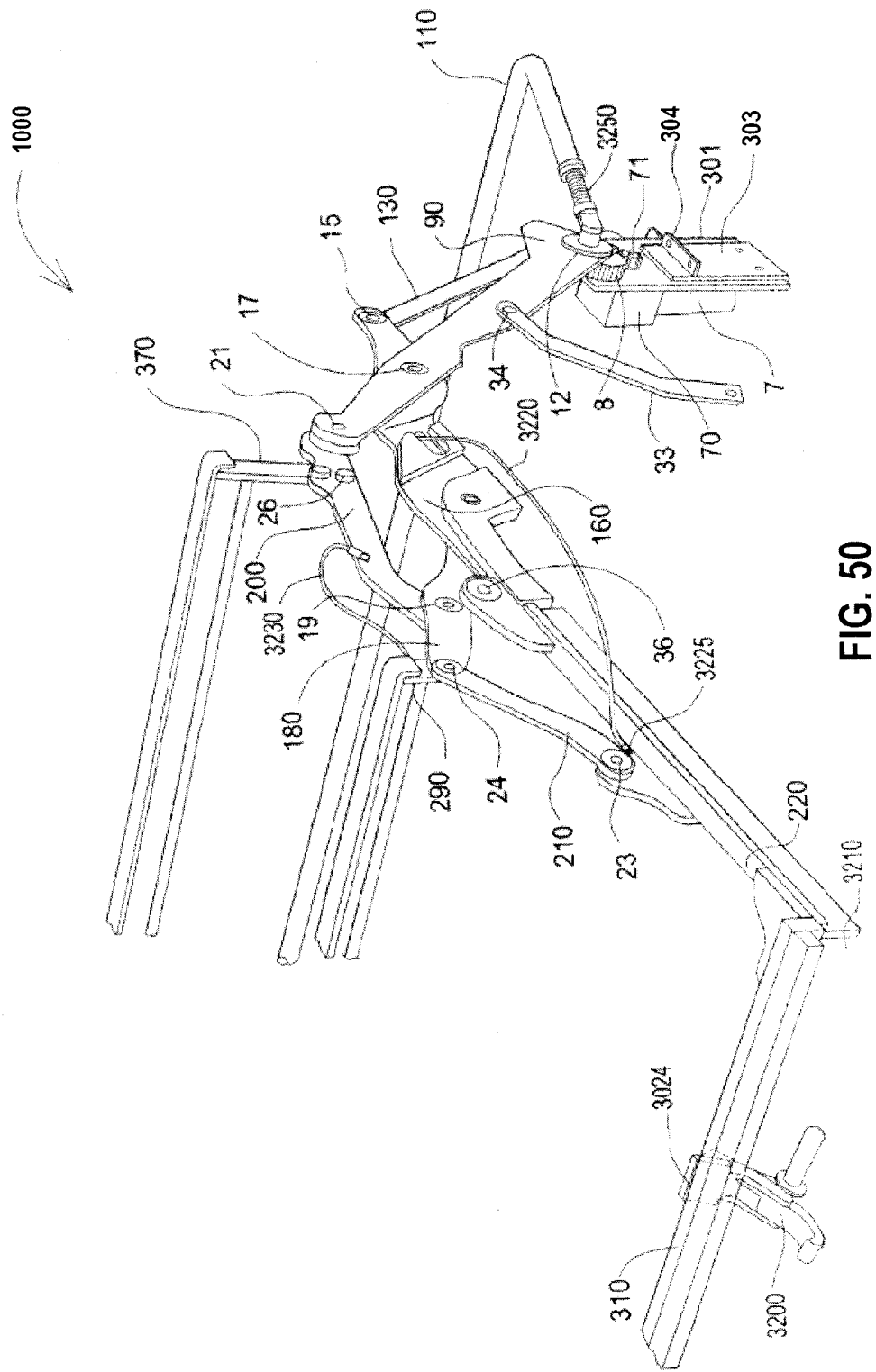
FIG. 50 is a top perspective view of the left side of the retractable top of FIG. 30.

Referring next to FIG. 50, features of the top are shown to the top 1000. These features of the top include a rubber seal 3210 attached to the inside lower edge of the front bow 310. A heavy-duty clamp 3206 has been added. Tightening cable 3220 connects to the canvas top 80 by means of a tunnel sewn into the inside of the canvas. Cable 3220 pulls the canvas 80 tight against the linkage members 220, 160. When the top 1000 is folded down, the cable 3230 helps prevent the canvas 80 from wearing against linkage members 200, 290, and 370. A bolt type bow base adjuster 3250 allows adjustment of the bow 110 against the canvas 80.

Referring next to FIG. 51, rear bow adjuster 3255 connects to threaded rod 3251. A sealing gasket 3254 keeps moisture out of the hollow bow tubing 3253. A nut 3252 is connected to the tubing 3253. Turning nut 3252 moves tubing 3253 towards or away from canvas 80.

Referring next to FIG. 52, a self-adjusting tension mount for bow 250 is labeled assembly 2100. Assembly 2100 consists of a bolt 2101 securing a rod 2103 to third bow arm 200 by means of a nut 2102. The rod 2103 has a solid end 2105 to compress spring 3262 against stop 3263 when the canvas 80 pushes against bow 250.

FIG. 53 shows the vehicle body ledge 716 supporting the anchor 3260. The bow assembly 3280 consists of an anchor 3260 supporting a rod 3261. The tubing 3253 extends over the rod 3261 and ends in a fixed collar 3264. Inside the tubing 3253, a spring 3262 is compressed against a stop 3263 as the canvas 80 presses against the bow 110. Thus, assembly 3280 provides a self-adjusting tension mount for bow 110 when the bow is mounted to the vehicle.

Referring next to FIG. 54, the view is taken from inside the vehicle looking out of the left window and seeing canvas 80. The canvas 80 has a tunnel 3290 sewn into the inside left roof line. The cable 3220 is threaded through the tunnel 3290 and anchored at 3225 in tab 2310 of linkage 220 and anchor 3226 at K-arm 160. The cable 3220 tightens the canvas inbound as shown when the top 1000 is closed. The cable 3230 keeps the canvas 80 from pinching between linkages 200, 180 in the open position. Anchor 3227 fastens to third bow arm 200, and anchor 3228 fastens to linkage 290. In one alternative, the rigidity of the cable is such that when the top folds down the cable tends to bow out away from the linkage bows and arms. This tends to prevent the pinching and tearing of the enclosure material.

Referring next to FIG. 55, the seal 3210 is preferably a rubber gasket glued to the front bow 310 of top 1000. The seal 3210 stops air from entering above the windshield top frame 4010, seen in FIG. 24.

Figure 56:
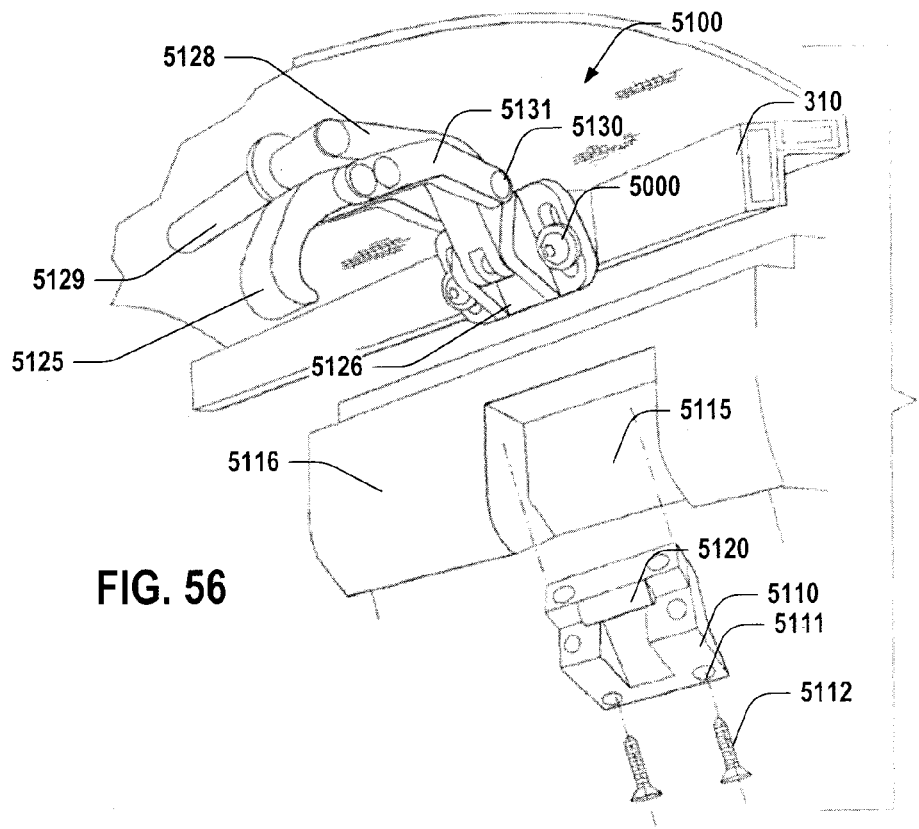
FIG. 56 is a close-up view of one embodiment of a heavy duty windshield clamp.
Figure 57:
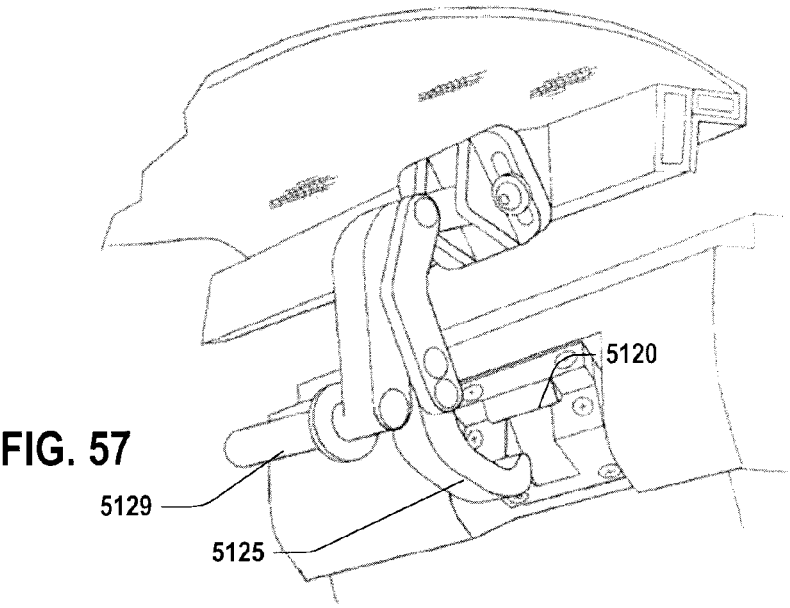
FIG. 57 is the same view as FIG. 56 with the clamp about to engage the windshield anchor.

Referring next to FIGS. 56-61, a similar clamp to that shown in FIGS. 24-29 is shown. The clamp 5100 consists of an anchor 5110 having mounting holes 5111 to enable screws 5112 to secure it in cavity 5115 along the windshield ceiling 5116. Ledge 5120 captures hook 5125 in the locked mode shown in FIGS. 58 and 61. Base 5126 is secured to front bow 310. It has a pivot mount 5127 for handle arm 5128. Handle 5129 is designed to be grabbed by the user's hand. The handle arm 5128 has a pivot mount 5130 for the hook arm 5131 which is attached to hook 5125. FIG. 56 shows the base 5126 having a fastener bolt or rivet 5000 attached to front bow 310. FIG. 57 shows the handle 5129 lowered so as to almost engage hook 5125 with ledge 5120.

Figure 58:
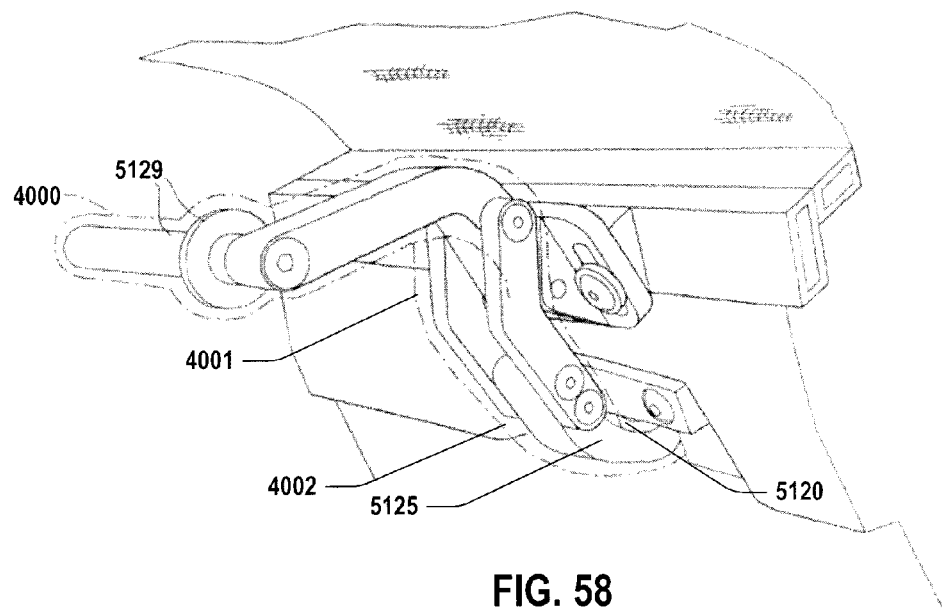
FIG. 58 is the same view as FIG. 56 with the locking handle pushed upward to the lock position.

FIG. 58 shows the hook 5125 engaged with ledge 5120. The user is moving handle 5129 up as shown by arrow UP, thereby locking the clamp. The soft protective cover 4000 is shown in dotted lines. It has a hollow core to fit over the handle 5129. It has a flap section 4001 which bends with the varying positions of the hook 5125. The back of hook 5125 has a hook and loop member 4002 which removably attaches to hook and loop member 4003 fitted to the forward side of flap section 4001.

Figure 59:
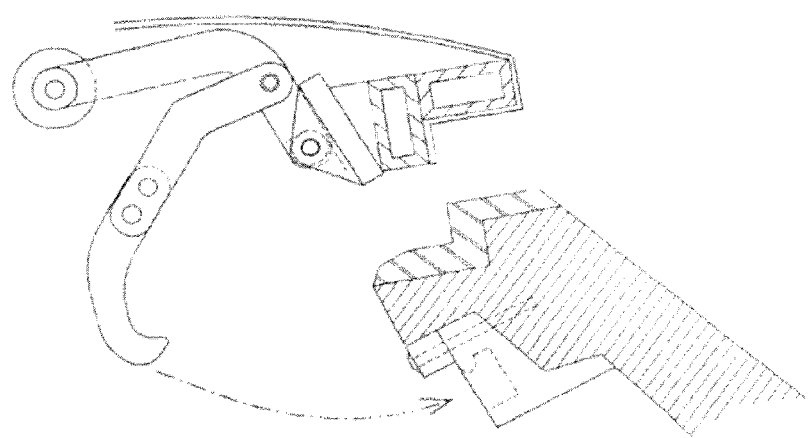
FIG. 59 is a cross section view of the clamp and windshield configuration prior to engagement.
Figure 60:
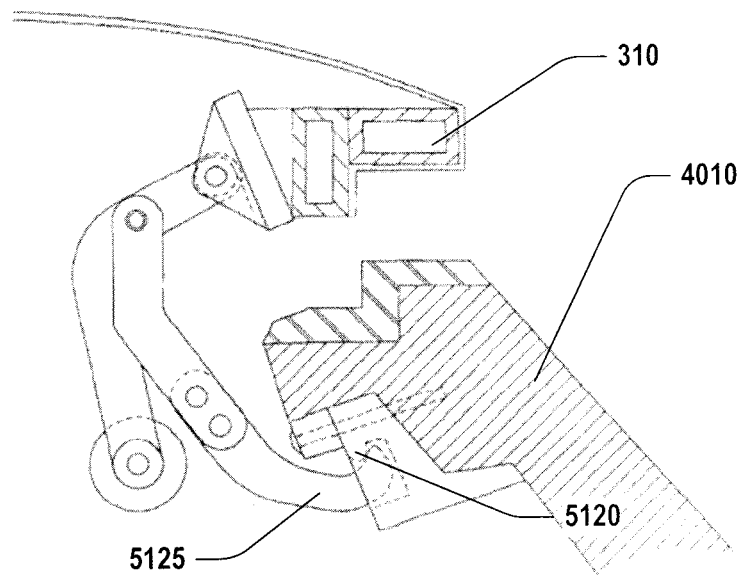
FIG. 60 is a cross section view of the clamp and windshield configuration with the clamp partially engaged.
Figure 61:
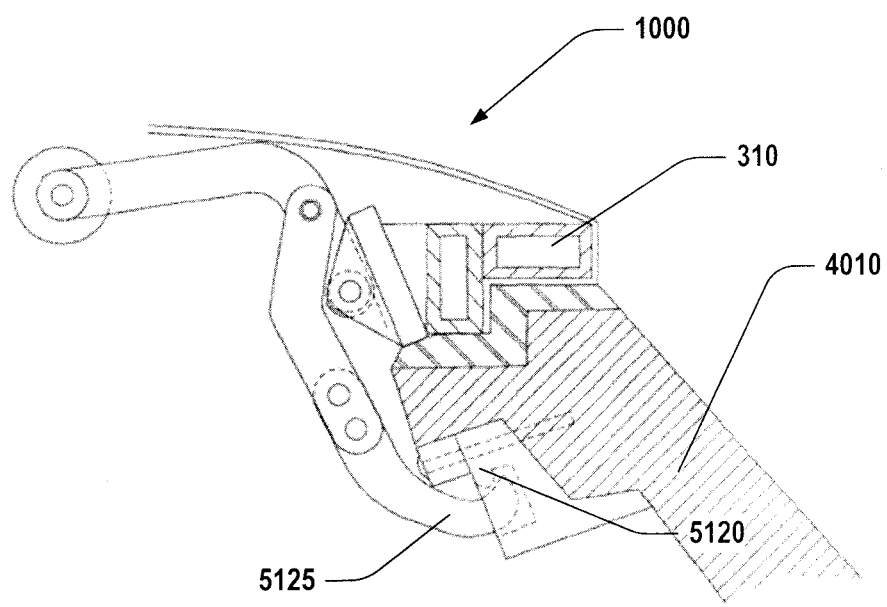
FIG. 61 is a cross section view of the clamp and windshield configuration with the clamp engaged.

FIG. 59 shows the clamp 5100 totally disengaged as if ready for the top to be folded down. In FIG. 60, the hook 5125 is engaged with the ledge 5120, and the handle 5129 is down, so the front bow 310 is not secured against the windshield top frame 4010. In FIG. 61, the top 1000 front bow 310 is locked against the windshield top frame 4010.

Figure 64:
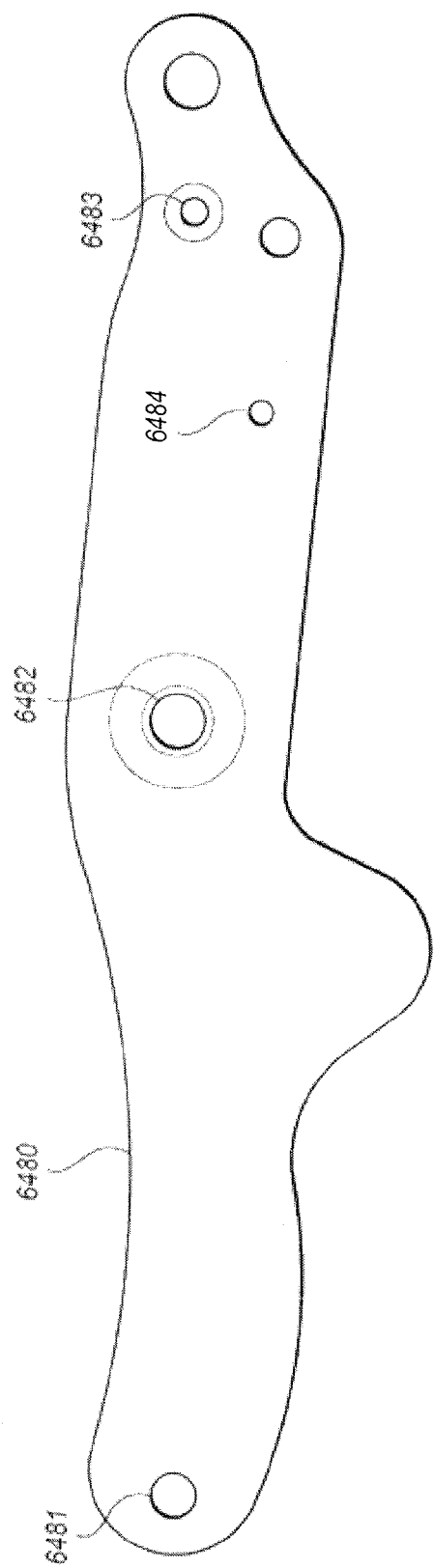
FIG. 64 is a side view of an alternative embodiment of a second bow arm.
Figure 65:
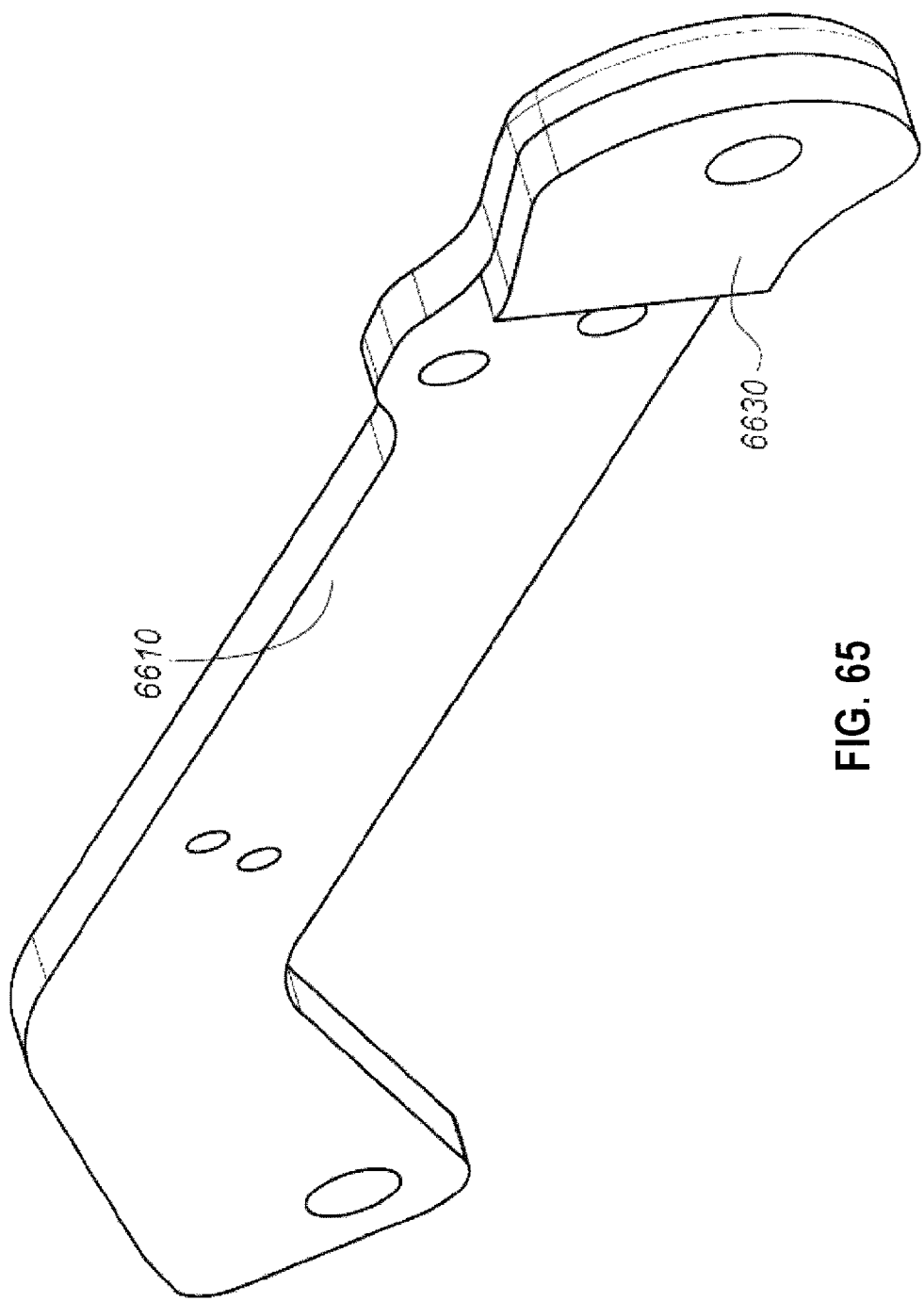
FIG. 65 is a perspective view of an alternative embodiment of third bow arm.
Figure 66:
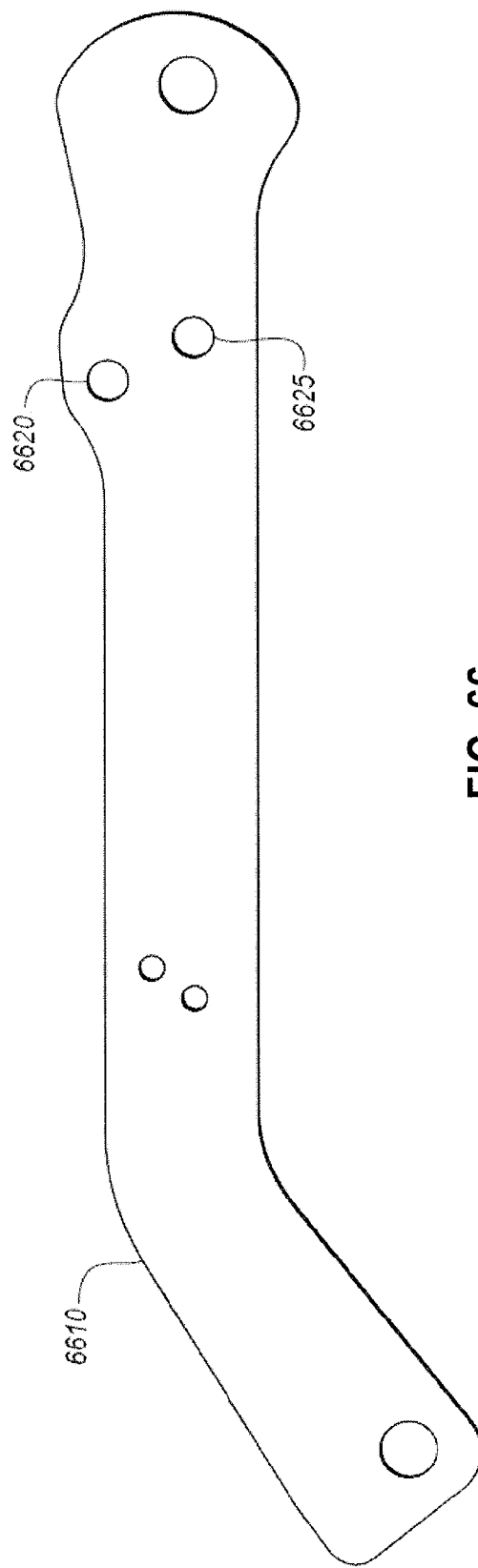
FIG. 66 is a side view of the third bow arm of FIG. 65.

Referring back to FIGS. 30 and 31 in one embodiment linkages 180, 200 are configured slightly differently to provide increased performance. In FIG. 64 an alternative to linkage 180 is shown, referred to here as second bow arm 6480. Second bow arm 6480 includes tapered interconnection apertures 6481, 6482, 6483. These apertures are tapered in order to recess the attachment mechanism used, in this case a bolt. As is clear from FIG. 30 the second bow arm 6480 (replacing linkage 180) must interface with first bow arm 210, a third bow arm 200, and a K-arm 160. The tapering of the holes to recess the bolt allows the third bow arm 200 to pass the linkage point for the first bow arm 210 without catching on a linkage that protrudes. Furthermore, since the tapered interconnection aperture 6483 is located in a position so that first bow arm 210 will sit higher than the connector to the pivot connector 290, the retractable top will tend to have a flatter profile when extended. Third bow arm 200 has also been adjusted accordingly. Aperture 6484 provides for a different placement of the cable shown in FIG. 54. In FIG. 54, the cable terminates at connection point 3228. If the second bow arm 6480 is used, the cable terminates at aperture 6484. In FIG. 65 an alternative to a third bow arm 6610 is shown with spacer 6630. Shown in FIG. 66, by adjusting third bow arm 6610 to have a diagonal arrangement of connection apertures 6620, 6625 for second bow bracket 290, the retractable top also tends to have a lower profile.

Figure 67:
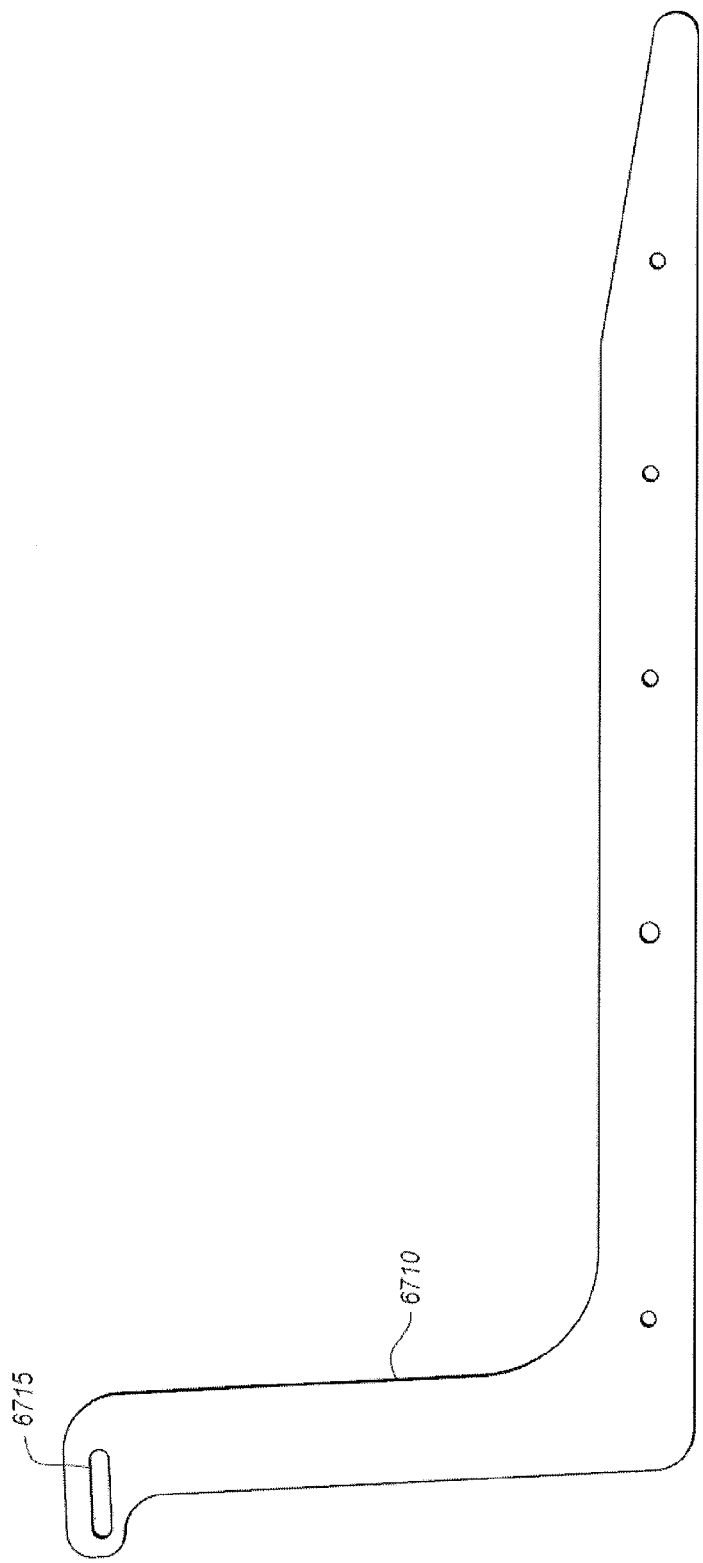
FIG. 67 shows one embodiment of an L-arm.

Additionally, FIG. 67 shows an additional embodiment of a L-arm 1200. Sealing bracket 6710 is similar to L-arm 1200 but additionally includes slot 6715 which allows the sealing bracket 6710 to slide into place by allowing for vertical movement.

Figure 68:
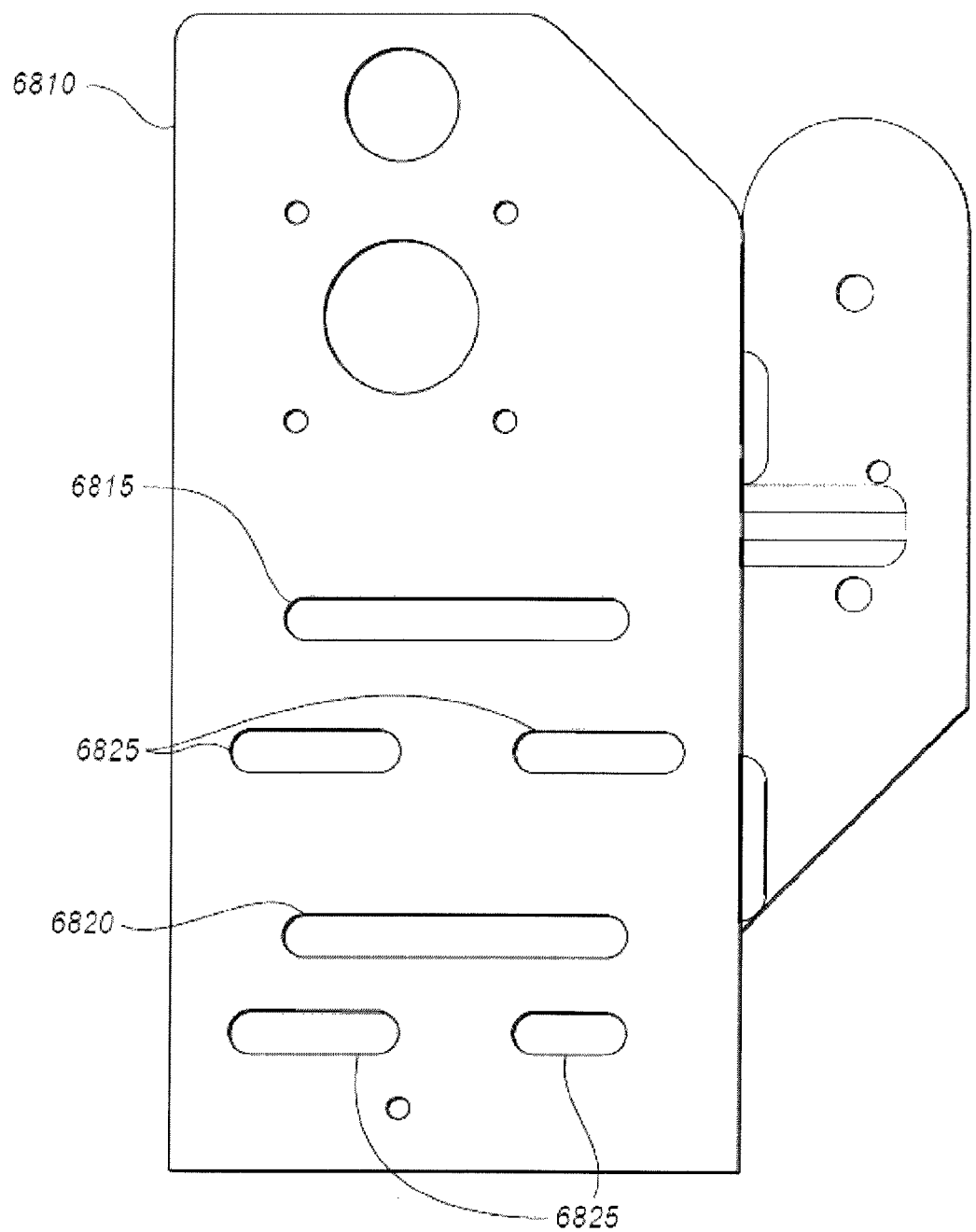
FIG. 68 shows an alternative embodiment of a inner motor support plate.
Figure 69B:
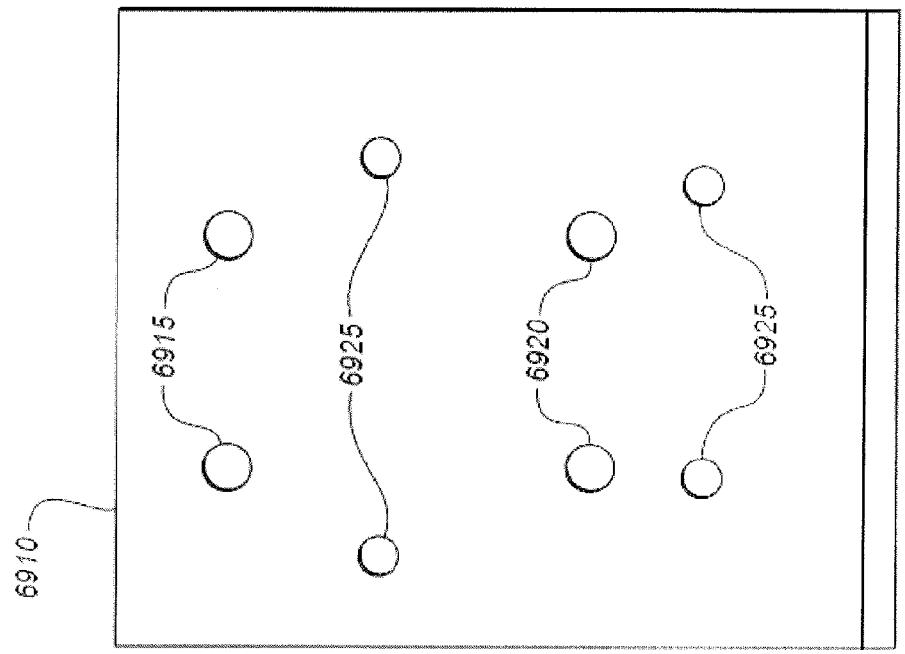
FIGS. 69a and 69b show an alternative embodiment of a motor support plate.
Figure 69A:
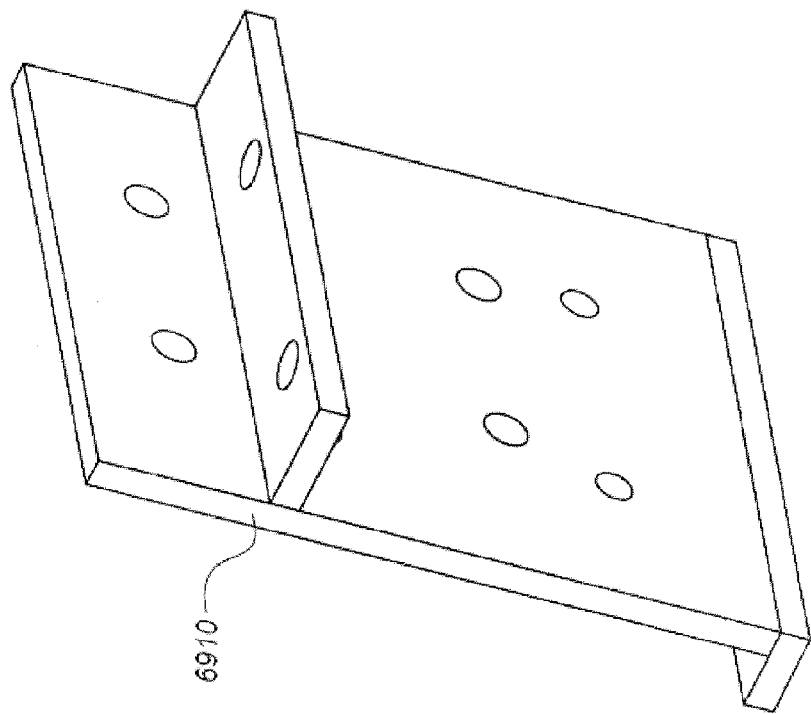

In FIGS. 68 and 69a and 69b an alternative mounting arrangement is shown. In some embodiments, if the mounting plates for the retractable top have any angular movement, the interface of the retractable top will be significantly off. In order to combat the movement of the mounting plates, vertical linkage support plate 3 and motor support plate flange 301 may be replaced with the inner motor support plate 6810 shown in FIG. 68 and the outer motor support plate 6910 shown in FIGS. 69*a* and 69*b*. The inner motor support plate 6810 includes six slots providing for rotational stabilization of the support plate 6810 while allowing for forward and backward adjustment of the spacing of the support plate 6810. The four peg slots 6825 receive a circular peg which is the width of the slot 6825. The bolt slots 6815, 6820 receive bolts for tightening the support plate in place. The combination of the pegs in the four peg slots 6825 significantly lessens any possible angular movement of the support plate. The support plate interfaces with outer motor support plate 6910. Outer motor support plate 6910 includes 4 bolts holes 6915, 6920 and four pegs 6925. The pegs 6925 interface with the peg slots 6825 and the bolts (not shown) that run through the 4 bolts holes 6915, 6920, interface with the two bolts slots 6815, 6820.

Figure 70:
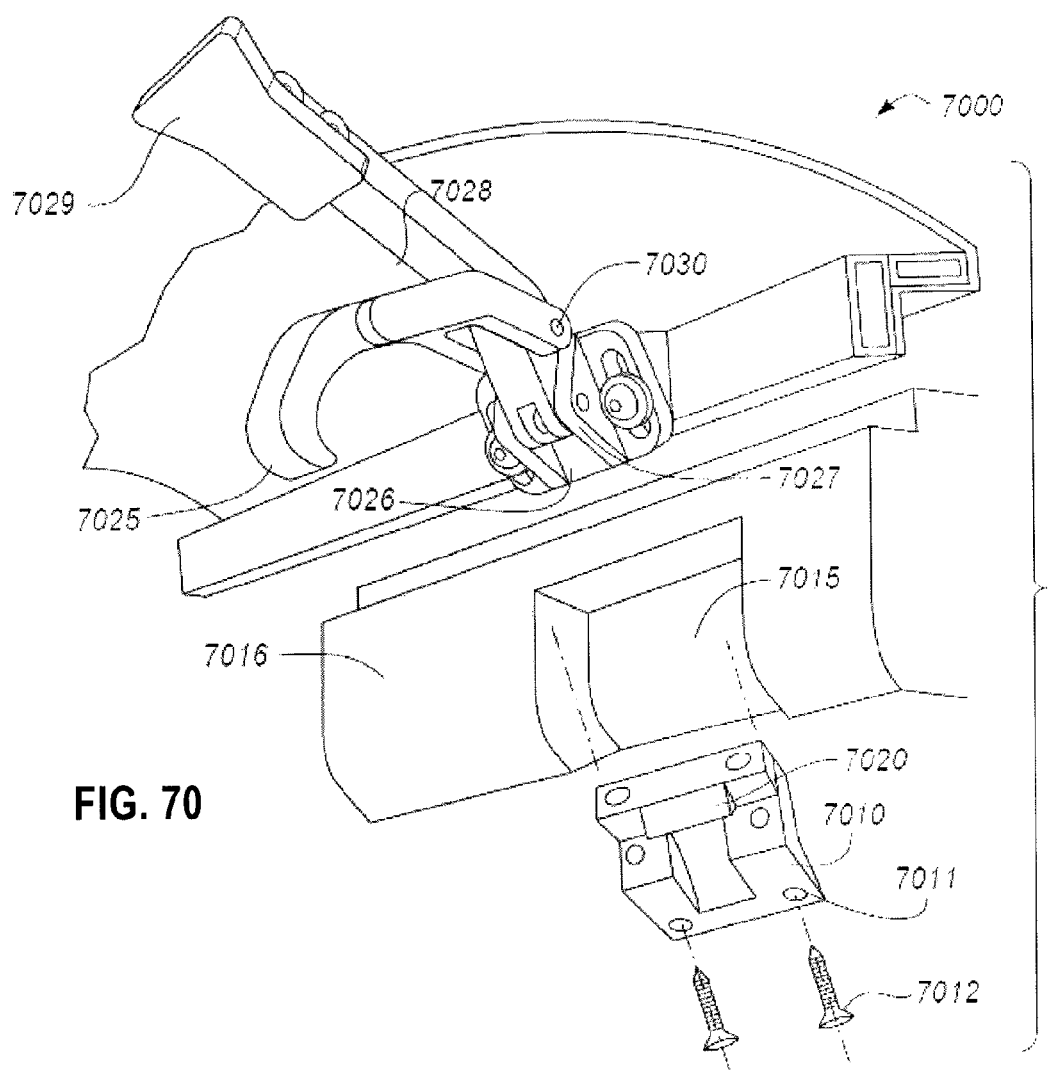
FIGS. 70-72 show an alternative embodiment of a clamp.
Figure 71:
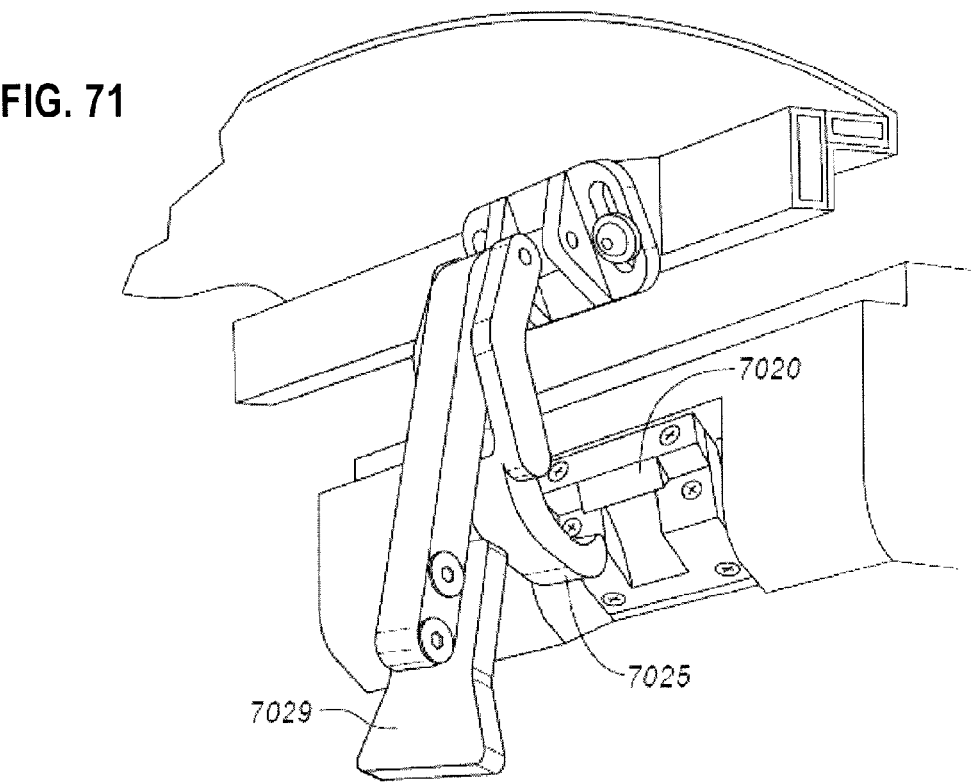
Figure 72:
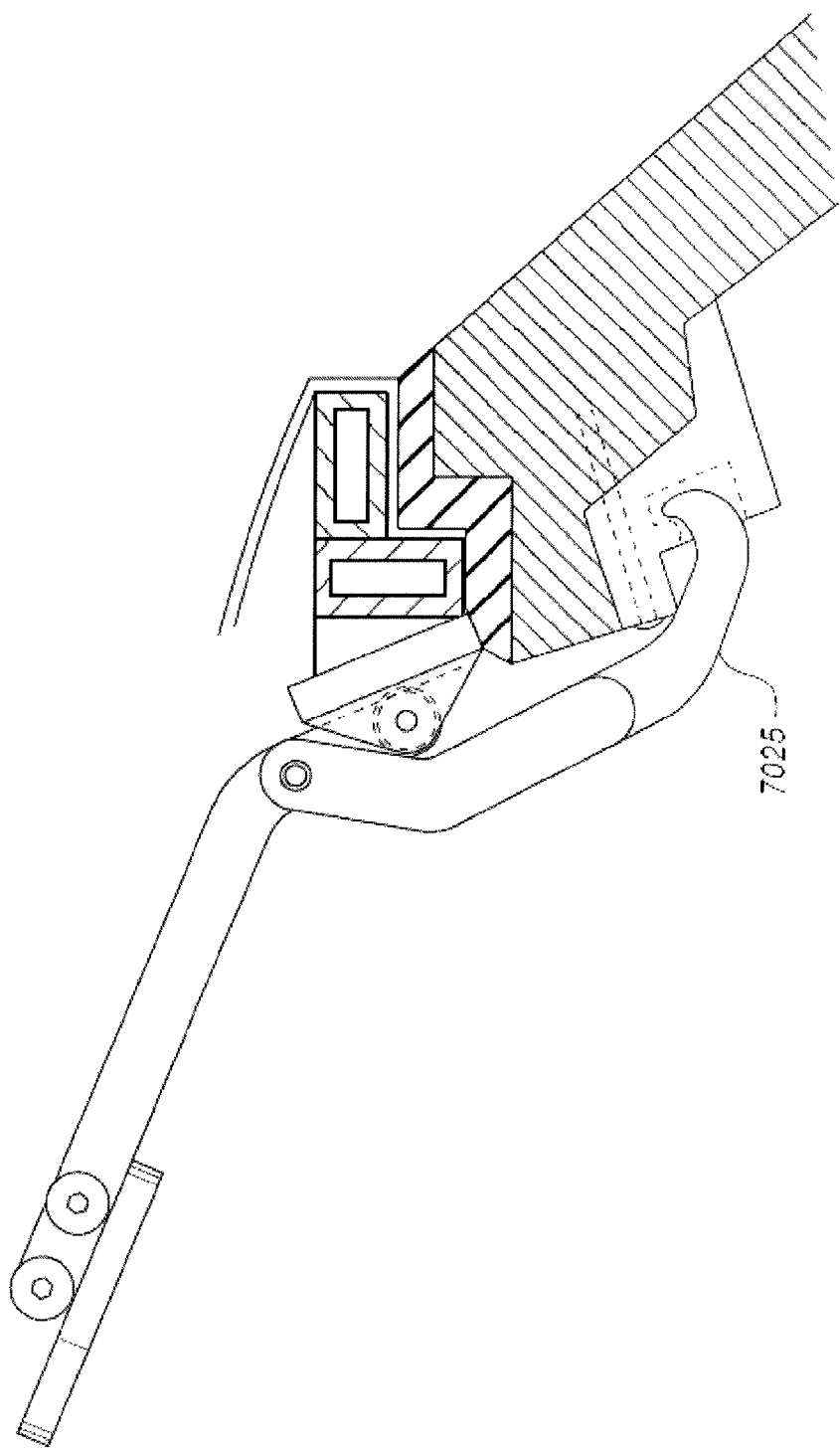

Referring next to FIGS. 70-72, a similar clamp to that shown in FIGS. 56-61 is shown. The clamp 7000 consists of an anchor 7010 having mounting holes 7011 to enable screws 7012 to secure it in cavity 7015 along the windshield ceiling 7016. Ledge 7020 captures hook 7025 in the locked mode shown in FIG. 72. Ledge 7020 is angled down and towards the front of the vehicle in order to provide locking leverage. Base 7026 is secured to front bow 310. It has a pivot mount 7027 for handle arm 7028. Handle 7029 is designed to be grabbed by the user's hand and is lengthened as compared to handle 5926. The handle arm 7028 has a pivot mount 7030 for hook 7025. Compared to the clamp of FIG. 58 the number of elements has been reduced by combining the hook and hook arm. FIG. 72 shows the hook 7025 engaged with ledge 7020.

The foregoing description of the embodiments of the retractable top systems and methods has been presented only for the purpose of illustration and description and is not intended to be exhaustive or to limited to the precise forms disclosed. Numerous modifications and adaptations are apparent to those skilled in the art without departing from the spirit and scope of this disclosure.

I claim:

1. A retractable top for a vehicle, the vehicle having an open top front passenger compartment and an open top rear compartment, the rear compartment having a horizontal floor and a substantially vertical wall structure on at least three horizontal sides forming the rear compartment bounded on the bottom by the floor and laterally by the vertical wall structure, the rear compartment having an open top, the rear compartment including a left and a right rear roll bar projecting vertically from the rear of the floor of the rear compartment above the height of the vertical walls, the roll bars projecting forward at a ceiling height to join a transverse roll bar and forming a roll cage, the retractable top comprising:
   (a) a first and second support member attached to two of the three horizontal sides forming the rear compartment;
   (b) a plurality of linkage arms attached to the first and second support members configured to move from a retracted position to an extended position, the plurality of linkage arms including a second bow arm, the second bow arm including a first tapered interconnection aperture, the first tapered interconnection aperture shaped to receive a first connector and recess the first connector such that an end of the first connector is flush with a first surface of the second bow arm; and
   (c) an enclosure material oriented to span at least a portion of the plurality of linkage arms such that, when the plurality of linkage arms are in the extended position, the open top of the front and rear compartments is substantially covered.

2. The retractable top of claim 1 wherein the second bow arm further includes a second tapered interconnection aperture, the second tapered interconnection aperture shaped to receive a second connector and recess the second connector such that an end of the second connector is flush with a second surface of the second bow arm and wherein a second bow bracket further includes a third tapered interconnection aperture, the third tapered interconnection aperture shaped to receive a third connector and recess the third connector such that an end of the third connector is flush with the first surface of the second bow arm.

3. The retractable top of claim 2 wherein the plurality of linkage arms include a first bow arm, a third bow arm, and a K-arm, the first bow arm and K-arm interconnected to the second bow arm via a first and third tapered opening respectively, the third bow arm interconnected to the second bow arm via a second tapered opening.

4. The retractable top of claim 3 wherein the second bow arm further includes a stop, the stop configured to brace the first bow arm when the retractable top is in a folded position.

5. The retractable top of claim 1, further comprising:
   (d) a first and second sealing bracket connected to the plurality of linkage arms, the enclosure material further spanning the first and second sealing brackets such that, when the plurality of linkage arms are in the extended position, the first and second sealing brackets interface with a left and right side portion of the front passenger compartment.

6. The retractable top of claim 1, further comprising a cable having a stiffness such that when the retractable top is folded, the stiffness of the cable prevents the enclosure material from sagging downward and becoming snagged in the plurality of linkage arms, the cable pulling the enclosure material taught against the plurality of linkage arms when the retractable top is extended.

7. The retractable top of claim 1 wherein a first and second support members are attached to a left and a right side of the vertical wall structure, respectively.

8. The retractable top of claim 1 wherein a first, second, third, fourth, fifth, and sixth support member includes a first and second slot, the first and second slots configured to receive a second, third, fourth, and fifth attachment member.

9. A retractable top for a vehicle, the vehicle having an open top front passenger compartment and an open top rear compartment, the rear compartment having a horizontal floor and a substantially vertical wall structure on at least three horizontal sides forming the rear compartment bounded on the bottom by the floor and laterally by the vertical wall structure, the rear compartment having an open top, the rear compartment including a left and a right rear roll bar projecting vertically from the rear of the floor of the rear compartment above the height of the vertical walls, the roll bars projecting forward at a ceiling height to join a transverse roll bar and forming a roll cage, the retractable top comprising:
   (a) a first and second support member attached to two of the three horizontal sides forming the rear compartment;
   (b) a plurality of linkage arms attached to the first and second support members configured to move from a retracted position to an extended position;
   (c) an enclosure material oriented to span at least a portion of the plurality of linkage arms such that, when the plurality of linkage arms are in the extended position, the open top of the front and rear compartments is substantially covered; and (d) a first and second sealing bracket connected to the plurality of linkage arms, the enclosure material further spanning the first and second sealing brackets such that, when the plurality of linkage arms are in the extended position, the first and second sealing brackets interface with a left and right side portion of the front passenger compartment.

10. The retractable top of claim 9, further comprising:
(e) a rear bow configured to support the enclosure material when the linkage arms are in the extended position.

11. The retractable top of claim 9 wherein the left and right side portions of the front passenger compartment are each fitted with a groove to receive the first and second sealing brackets, wherein the interface is substantially windproof, and wherein the plurality of linkage arms and the first and second sealing brackets are configured such that, when the plurality of linkage arms are extended, the sealing bracket is guided by the movement of the plurality of linkage arms into the grooves in the left and right side portions of the front passenger compartment.

12. The retractable top of claim 9 wherein the rear compartment includes a first and second wheel well extending up from the floor of the rear compartment, and wherein the first and second support members are attached to the first and second wheel wells, respectively.

13. The retractable top of claim 9 wherein the first and second support members are attached to a left and a right side of the vertical wall structure, respectively.

14. The retractable top of claim 9, further comprising:
(e) a left and a right roll cage bracket mount attached to the left and right rear roll bars, the left and right roll cage bracket mounts interconnected with the first and second support members.

15. The retractable top of claim 9, further comprising:
(e) a spanning bar, the spanning bar spanning the plurality of linkage arms where the retractable top, when extended, interfaces with the front windshield.

16. The retractable top of claim 15 wherein the hook includes an arm having a first pivot point at the spanning bar and a hook portion having a second pivot point along the arm, such that when the arm is pivoted about the first pivot point, the second pivot point moves radially around the first pivot point lengthening and shortening the extension of the hook portion in relation to the spanning bar.

17. The retractable top of claim 16 wherein, when the extension of the hook portion is shortened and engaged with the cavity, a holding tension is provided to the retractable top in relation to the front windshield.

18. A retractable top for a vehicle, the vehicle having an open top front passenger compartment and an open top rear compartment, the rear compartment having a horizontal floor and a substantially vertical wall structure on at least three horizontal sides forming the rear compartment bounded on the bottom by the floor and laterally by the vertical wall structure, the rear compartment having an open top, the rear compartment including a left and a right rear roll bar projecting vertically from the rear of the floor of the rear compartment above the height of the vertical walls, the roll bars projecting forward at a ceiling height to join a transverse roll bar and forming a roll cage, the retractable top comprising:
(a) a means for attaching the retractable top to the rear compartment;
(b) a means for supporting the retractable top and for allowing the retractable top to be moved to and positioned in an extended position;
(c) a means for spanning at least a portion of the means for supporting such that, when the means for supporting are in the extended position, the open top of the front and rear compartments is substantially covered;
(d) a means for securing the retractable top to the left and right rear roll bar, the means for securing interconnected with the means for attaching; and
(e) a means for sealing the retractable top connected to the means for supporting, and the means for spanning further spanning the means for sealing such that, when the means for supporting are in the extended position, the means for sealing interface with a left and right side portion of the front passenger compartment.

19. A retractable top for a vehicle, the vehicle having an open top front passenger compartment and an open top rear compartment, the rear compartment having a horizontal floor and a substantially vertical wall structure on at least three horizontal sides forming the rear compartment bounded on the bottom by the floor and laterally by the vertical wall structure, the rear compartment having an open top, the rear compartment including a left and a right rear roll bar projecting vertically from the rear of the floor of the rear compartment above the height of the vertical walls, the roll bars projecting forward at a ceiling height to join a transverse roll bar, the retractable top comprising:
(a) a left and a right roll cage bracket mount attached to the left and right rear roll bar;
(b) a first and second support member, the left and right roll cage bracket mounts interconnected with the first and second support members;
(c) a plurality of linkage arms attached to the first and second support members configured to move from a retracted position to an extended position;
(d) an enclosure material oriented to span at least a portion of the plurality of linkage arms such that, when the plurality of linkage arms are in the extended position, the open top of the front and rear compartments is substantially covered; and
(e) a first and second sealing bracket connected to the plurality of linkage arms, the enclosure material further spanning the first and second sealing brackets such that, when the plurality of linkage arms are in the extended position, the first and second sealing brackets interface with a left and right side portion of the front passenger compartment.

\* \* \* \* \*